United States Patent
Morioka et al.

(10) Patent No.: US 7,228,422 B2
(45) Date of Patent: Jun. 5, 2007

(54) PACKET TRANSMISSION/RECEPTION DEVICE

(75) Inventors: Yoshihiro Morioka, Nara (JP); Yasushi Ayaki, Osaka (JP); Hiroshi Mitani, Osaka (JP); Naoshi Usuki, Kyoto (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/531,713

(22) PCT Filed: Oct. 15, 2003

(86) PCT No.: PCT/JP03/13218

§ 371 (c)(1),
(2), (4) Date: Nov. 14, 2005

(87) PCT Pub. No.: WO2004/036840

PCT Pub. Date: Apr. 29, 2004

(65) Prior Publication Data

US 2006/0112272 A1    May 25, 2006

(30) Foreign Application Priority Data

Oct. 17, 2002  (JP) ............... 2002-302924
Nov. 25, 2002  (JP) ............... 2002-340582

(51) Int. Cl.
*H04L 9/00*  (2006.01)
(52) U.S. Cl. ............... 713/171; 713/153; 713/163; 713/169; 380/210

(58) Field of Classification Search ............... 713/153, 713/63, 169, 171; 380/210
See application file for complete search history.

(56) References Cited

U.S. PATENT DOCUMENTS

| 6,826,699 B1* | 11/2004 | Sun .............................. 726/5 |
| 7,107,458 B2* | 9/2006 | Oishi et al. ................. 713/189 |
| 2002/0025042 A1* | 2/2002 | Saito .......................... 380/258 |
| 2002/0027991 A1* | 3/2002 | Kuroda et al. ............. 380/210 |

FOREIGN PATENT DOCUMENTS

| JP | 07-297831 | 11/1995 |
| JP | 11-196081 | 7/1999 |
| JP | 2000-299686 | 10/2000 |

(Continued)

OTHER PUBLICATIONS

Integration of 5C with a 1394 Audio/Video Link Chip, Technical White Paper, 2000 (retrieved from Internet Nov. 14, 2006), http://www.nxp.com/acrobat_download/other/1394/l41wpv2.pdf.*

(Continued)

*Primary Examiner*—Taghi T. Arani
(74) *Attorney, Agent, or Firm*—Snell & Wilmer L.L.P.

(57) ABSTRACT

A packets sending/receiving apparatus, comprising: authentication and key exchange means; encryption means for producing an encryption sending data; sending condition setting management means for producing sending condition setting information for setting sending condition of the sending packets; packetization means for producing the sending packets using the encryption sending data; receiving condition setting management means for producing receiving condition setting information for setting receiving condition of the receiving packets; packets reception means for receiving the reception packets; and decoding means for decoding the reception data using the decoding key.

47 Claims, 38 Drawing Sheets

FOREIGN PATENT DOCUMENTS

| | | |
|---|---|---|
| JP | 2000-341324 | 12/2000 |
| JP | 2001-86110 | 3/2001 |
| JP | 2001-186173 | 7/2001 |
| JP | 2002-026906 | 1/2002 |
| JP | 2002-202720 | 7/2002 |
| JP | 2002-217961 | 8/2002 |
| JP | 2002-232955 | 8/2002 |

OTHER PUBLICATIONS

Tokushu 2 Internet no Kiban "IP o shiru," Nikkei Network, Nikkei Business Publications, Inc., No. 30, Sep. 22, 2002 p. 132, with translation of pertinent part.

Interop Magazine article dated Oct. 1, 1999, p. 48, with translation of pertinent part.

* cited by examiner

Fig. 28 Example where error correction addition means is Reed-Solomon code

PACKET TRANSMISSION/RECEPTION DEVICE

TECHNICAL FIELD

The present invention relates to a packets sending/receiving apparatus. More specifically, the present invention relates to a packets sending/receiving apparatus for generating packets by using encrypted data (fox example AV data) and sending/receiving the generated packets by using Ethernet™ which conforms to standards such as IEEE 802.3 standard, a wireless LAN which conforms to standards such as IEEE 802.11 standard, or the like.

BACKGROUND OF THE INVENTION

Conventionally, MPEG-TS has been encrypted and transmitted based on a scheme defined by IEC 61883-4 using IEEE 1394 standard even in general household. As an example of a scheme for encrypting and transmitting AV data such as MPEG-TS, Digital Transmission Content protection (DTCP) scheme is defined.

The DTCP scheme is a scheme regarding protection of the contents on transmission media such as IEEE 1394 standard, USB and the like. The DTCP scheme is standardized by Digital Transmission Licensing Administrator (DTLA). The DTCP scheme is described in more detail in, for example, the DTCP website at www.dtcp.com, and a book "IEEE1394, AV kikiheno ouyou (IEEE1394, Application to AV equipment)" edited by Shinji Takada, The Nikkan Kogyo Shimbun Ltd., "Chapter 8, Copy Protection", pp. 133–149.

FIG. 38 is a schematic view illustrating a transmission of MPEG-TS via transmission media which conforms to IEEE 1394 standard by using the DTCP scheme.

In the DTCP scheme, a sending apparatus is referred to as a source 2001 and a receiving apparatus is referred to as a sink 2002. Data such as encrypted MEPG-TS is transmitted from the source 2001 to the sink 2002 via a network 2003.

In FIG. 38, the source 2001 is, for example, DVHS, DVD recorder, 1394 loaded set top box (STB), or 1394 loaded digital Television (TV). The sink 2002 is, for example, DVHS, DVD recorder, 1394 loaded set top box (STB), or 1394 loaded digital Television (TV).

AV data transmission such as MPEG-TS via transmission media which conforms to IEEE 1394 standard by using DTCP scheme is known.

However, implementing the DTCP scheme on an IP protocol, which is a standard protocol for Internet, has not been known until to date. Thus, AV data cannot be transmitted via transmission media which can transmit IP packets of IEEE 802.3 standard, which is a standard for Ethernet™ IEEE 802.11 standard, which is a standard for a wireless LAN, and others, by using the DTCP scheme. In other words, conventionally, AV data such as MPEG-TS cannot be transmitted between a sending apparatus and a receiving apparatus which are logically connected via IP protocol with the confidentiality and copyright of the data being protected using encryption.

SUMMARY OF THE INVENTION

According to the present invention, a packets sending/receiving apparatus for sending a sending packets and receiving a receiving packets, comprises: authentification and key exchange means for producing an encryption key and a decoding key; encryption means for producing an encryption sending data by encrypting sending data using the encryption key; ending condition setting management means for producing sending condition setting information for setting sending condition of the sending packets using at least one of sending condition related information, sending/reception management information, receiving condition setting information; packetization means for producing the sending packets using the encryption sending data; receiving condition setting management means for producing receiving condition setting information for setting receiving condition of the receiving packets using at least one of receiving condition related information and packets reception information; packets reception means for receiving the reception packets, which extracts reception data included in the reception packets from the reception packets using the reception condition setting information and produced the packets reception information from the reception packets, and outputs the packets reception information to the authentification and key exchange means or the received condition setting management means; and decoding means for decoding the reception data using the decoding key.

The packetization means includes packets addition information production means for producing packets addition information using at least one of the sending condition setting information and authentification and key exchange related information related to the authentification and key exchange means, the packetization means produces the sending packets by adding packets addition information to the encryption sending data; and the packets receiving means includes a packets addition information extraction means for extracting the packets addition information included in the sending packets.

Framing means for receiving the sending packets-to produce a sending frame; and frame reception means for receiving a reception frame and extracting the reception packets from the reception frame are further included.

First queue means for temporarily stores a first packets group produced at the packetization means; second queue means for temporarily stores a second packets group produced at the packetization means; sending queue control means for controlling which of the first packets group stored in the first queue means and a second packets group stored in the second queue means is to be sent based on the sending condition setting information; framing means for producing a sending frame by framing the first packets group output from the first queue means and the second packets group output from the second queue means; and a frame reception means for extracting the reception packets from a reception frame are further included.

The sending queue control means controls which of the first packets group stored in the first queue means and a second packets group stored in the second queue means is to be sent using at least one of information regarding a sending path of the first packets or the second packets, information regarding a bandwidth required for sending the first packets or the second packets, information regarding delay from sending to arrival of the sending packets, and information regarding priority of the first packets or the second packets.

The sending queue control means uses one of control schemes of RSVP scheme described with IETF RFC2205, RFC2208, RFC2209, Intserv scheme described with IETF RFC2210, RFC2211, RFC2212, RFC2215, and Diffserv scheme described with IETF RFC2474, RFC2475, RFC2597, RFC2598.

The sending queue control means controls the first queue means and the second queue means so as to select one of the first packets stored in the first queue means and the second packets stored in the second queue means is to be sent and preferentially outputs the selected packets. The sending queue control means controls the first queue means and the second queue means such that, when an amount the first packets stored in the second queue means does not exceeds a predetermined amount, the first packets stored in the first queue means is preferentially output, and when an amount of the second packets stored in the second queue means exceeds a predetermined amount, the second packets stored in the second queue means is output preferentially.

The sending queue control means controls the first queue means and the second queue means so as to average intervals between the first packets sent from the first queue means and the second packets from the second queue means.

The receiving condition setting management means and the receiving condition setting management means detect the maximum transmission packets size in a path from a sending destination of the sending packets and a receiving address between sending and arrival of the sending frame, and produces the sending condition setting information and receiving condition setting information using the maximum transmission packets size information.

The framing means adds a frame header of IEEE 802.3 standard to sending packets produced in the packetization frame.

The framing means adds a frame header of IEEE 802.1Q standard to sending packets produced in the packetization frame.

The packetization means converts the encryption sending data to a predetermined size and adds Internet Protocol (IP) header defined as IPv4 or IPv6 in IETF.

The packetization means adds information indicating that it is preferred packets to a service type field of IPv4 header or a type of service (TQS) field in the service type field.

The packetization means adds information indicating that it is preferred packets to a priority field of IPv6 header.

The packetization means includes first packetization means and second packetization means; the first packetization means produces first packets using at least one of the sending condition setting information, and the authentication and key exchange related information; the second packetization means produces second packets using at least one of the sending condition setting information, authentification and key exchange related information, and the encryption sending data.

The packetization means converts the encryption sending data into a predetermined size and adds an IP header defined as IPv4 or IPv6 in IETF; the first packetization means is formed of a software, and the second packetization means is formed of a hardware.

Data separation means for separating the reception data into preferred data and general data; the encryption means encrypts the preferred data; and the first packetization means produces first packets group using the general data are further included.

The first packetization means adds at least one header of RTCP, RTSP, HTTP, TCP, UDP, IP, which are data process protocols defined in the IETF document.

The second packetization means adds a sequence number to data, or adds at least one header of RTP, UDP, HTTP, TCP, IP, which are data process protocols defined in the IETF document.

The preferred data is in an uncompressed SD format signal defined by SMPTE 259M standard, an uncompressed HD format defined by SMPTE 292 standard, a transmission stream format of DV or MPEG-TS by IEEE 1394 defined by IEC 61883, MPEG-TS format by DVB-ASI defined by DVB standard A010, MPEG-PS format, MPEG-ES format, and MPEG-PES format.

The second packetization means includes error correction code addition means.

A scheme of the error correction code used in the error correction code addition means is Reed-Solomon scheme or parity scheme.

Information indicating the encryption key outputs decoding information of the encryption key before the encrypted sending packets encrypted with the encryption key is output in the framing means.

Information indicating the encryption key sent before the time of reception of a reception frame which corresponds to the sending frame from sending of the sending frame with respect to the time when the receiving packets including the encryption sending data produced using the encryption key to sent.

The authentification and key change means permits authentification when location information of the packets sending/receiving apparatus, and location information of the destination of the sending packets or location information of the source of the receiving packets match predetermined condition.

The sending/receiving management information includes at least one of the location information of the packets sending/receiving apparatus, and the location information of the destination of the sending packets or the location information of the source of the receiving packets match predetermined condition.

The location information is information with area specified by a region code, address, postal code, or longitude and latitude.

The authentification and key exchange means permits authentification when a propagation time of one-way or a round trip from the packets sending/receiving apparatus to the destination of the sending packets or sending source of the reception packets is shorter than a predetermined limit time between the packets vending/receiving apparatus to the destination of the sending packets or sending source of the reception packets.

The authentification and key exchange means permits authentification, in the case where there is a wireless transmission zone between a sending/reception zone between the packets sending/receiving apparatus to the destination of the sending packets or sending source of the reception packets, when it is confirmed that it is in a mode for scrambling and transmitting data in the wireless transfer zone.

The authentification and key exchange means includes: storage means for temporarily stores information regarding the destination of the sending packets or sending source of the reception packets when authentification is performed between the packets sending/receiving apparatus to the destination of the sending packets or sending source of the reception packets; verifying means for verifying the information stored in the storage means and the information regarding the destination of the sending packets or the information regarding the sending source of the reception packets when authentification is not confirmed since the packets sanding/receiving apparatus and the destination of the sending packets or sending source of the reception packets do not match the predetermined conditions, and performing authentification between the packets sending/receiving apparatus and the destination of the sending packets or sending source of the reception packets.

The information regarding the destination of the sending packets and the information regarding the sending address of the reception packets includes at least one of a certificate, MAC address and biometric information.

The authentification and key exchange means performs predefined authentification and key exchange and updates encryption key or decoding key in a predetermined period.

Timing information for indicating timing for the authentification and key exchange means to update the decoding key is added to the sending packets.

The timing for the authentification and key exchange means to update the decoding key is notified by changing a TCP port number, or UDP port number of the sending packets.

The timing for the authentification and key exchange means to update the decoding key is updated for every HTTP request when the sending packets uses HTTP.

The timing for the authentification and key exchange means to update the decoding key is changed for every certain amount of data when the sending packets uses HTTP.

The receiving source of the reception packets is updated within a predetermined period when the sending packets uses RTP.

Copy control information of DTCP scheme in the authentification and key exchange means is transmitted by adding encryption mode information to the reception packets.

The sending queue control means controls the first queue means and the second queue means such that data rate of the preferred data does not become smaller than a predetermined value.

The sending queue control means controls the first queue means and the second queue means such that the time for the preferred data to be stored in the second queue means is always smaller than a predetermined value.

The second packetization means includes a buffer means for temporarily storing data, a counter means for counting a length of the data, a packet header production means for producing packets header of the second packets, and a packets synchronization means for synchronizing packets by combining the packet header and a payload output from the buffer; and the packet header production means specifies a payload length of the second packets group, reads out the data stored in the buffer means, and input to the packets synchronization means.

The second packetization means includes a buffer means for temporarily storing data extracted from the preferred data, a counter means for counting a length of the data, a packet header production means for producing packets headers using packetization information, and a packets production means for producing packets by combining the packet header and a payload; and the counter means outputs control data for reading out data which corresponds to a payload length from the buffer means.

The second packetization means includes a buffer means for temporarily stores data, a counter means for counting the data, a packet header production means for producing packets header using packetization information, error correction addition means for adding error correction to the data, and a packets synchronization means for synchronizing the packet header and the data with the error correction added; and the counter means outputs control data for reading out data which corresponds to a payload length from the buffer means.

In a layer for processing a reception frame of a layer lower than layers on which the preferred data and the general data are processed, the preferred data and the general data rare selected from the communication protocol header of the reception packets included in the reception frame, and a process for the preferred data and a process for the general data are independently performed.

The second packetization means includes encryption switching means, and input an encryption key input to the encryption key switching means while switching the encryption key in the encryption means at a specified timing.

Timing used for the encryption key switching is timing generated in synchronization with a predetermined sequence number in packets header, which is an output for the packets header production means.

The timing for the authentification and key exchange means to update the decoding key is updated for every HTTP request when the sending packets uses HTTP.

The timing for the authentification and key exchange means to update the decoding key is changed for every certain amount of data when the sending packets uses HTTP.

Timing for the authentification and key exchange means to update the decoding key is within a predetermined period when the sending packets uses RTP.

Timing used for the encryption key switching is timing generated in synchronization with an endpoint and a start point of an error correction matrix.

According to the present invention, in order to solve the above-described problem, a packets sending/receiving apparatus logically connected via a network includes authentification and key exchange means (AKE means) for realizing protection of confidentiality and copyright of the sending data such as MPEG-TS, encryption means for encrypting the sending data, packetization means for producing sending packets using sending data, decoding means for decoding the encrypted sending data, sending condition setting management means for setting appropriate packets sending condition based on packets reception state fed back from a sending destination of the sending packets, packets reception means, and setting management means of the reception condition.

In this way, the DTCP scheme may be implemented to an IF protocol, which is a standard protocol of the Internet.

Further, it Is possible to transmit packets (for example, IP packets) via a transmittable network and to decode data encrypted in the receiving apparatus.

According to one embodiment of the present invention, in the packetization means, the sending packets are classified into general packets and preferred packets which has a high real-time property and should be preferentially sent. The general packets are input to first data queue means and the preferred packets are input to second data queue means. Then, sending queue control means controls the sending order of the packets temporarily stored in the first data queue means and the second data queue means. In this way, data with higher real-time property can be preferentially sent while the confidentiality and the copyright of the data is being tried to be protected.

When the input stream is a plurality of streams of two channels or more, signals regarding the respective streams may be classified into the preferred data and the general data.

According to one embodiment of the present invention, the packetization means include first packetization means and second packetization means. In this embodiment, general data such as AKE related information is input to the first packetization means. Encryption sending data produced in the encryption means and the AKE related information is input to the second packetization means. In the second packetization means, packets are generated by a hardware.

The AKE related information is update information of copy control information and encryption key updated information.

Packets produced at the first packetization means are input to and temporarily stored in the first data queue means, and packets produced at the second packetization means are input to and temporarily stored in the second data queue means.

When the sending condition setting management means orders the sending queue control means to preferentially outputting a signal temporarily stored in the second data queue means is output from, the encrypted data is preferentially output.

In such a control, if the second data queue means is controlled to avoid an overflow and there is a buffer of an appropriate size in the receiving apparatus, real time transmission of data contents can be realized between a sending apparatus and a receiving apparatus.

As described above, when data is encrypted and transmitted in a real-time manner between the sending apparatus and the receiving apparatus, there is no trouble such as un-sent sending packets, or un-received reception packets generated because the software process cannot be in time since the second packetization means is formed of a hardware. Further, since the first packetization means with a small data amount can be farmed of reasonable microcomputers and the like, the cost can be reduced.

According to one embodiment of the present invention, the AKE means for exchanging equipment authentification and the encryption key is a scheme based on a DTCP scheme, and includes encryption key production means, DTCP information production means, AKE command sending process means, AKE command reception process means, exchange key production means, encryption key change information production means, and decode key production means. The encryption key production means produces encryption key, and inputs to the encryption to set an encryption operation. DTCP information production means uses copy control information input from outside and key update information to be input from the encryption key production means to produce AKE related information. The AKE command sending process means receives the encryption key from the encryption key production means, an AKE parameter from outside, and an AKE command information from the AKE command reception process means and produces and outputs the AKE sending command. The AKE command reception process means receives the AKE setting control information from the first packetization means and outputs setting control information respectively to the AKE sending processing means, the exchange key production means, and the encryption key change information production means. The encryption key change information production means obtains information from the AKE command reception process means and the first packets reception means to produce encryption key change information. The decoding key production means outputs a decoding key and outputs to the decoding process using the information from the exchange key production means and the encryption key change information production means.

According to one embodiment of the present invention, the second packetization means to which the encryption sending data produced at the encryption means and AKE related information for example, copy control information and/or update information of the encryption key are input includes an error correction code addition means therein. An error correction code is added to such information and transmitted by UDP/IP protocol.

Accordingly, in transmission of IP packets, it becomes possible to restore the sending data by error correction in the receiving apparatus even when a packet loss or a bit error is generated at the network.

In one embodiment of the present invention, the preferred packets to be sent preferentially and the general packets with a lower sending priority compared to the preferred packets are multiplexed on the time line and sent. An average sending data rate of the preferred data in the preferred packets to be sent is controlled, for example, to send packets at a speed equal to or higher than the average input rate using a hardware for are exclusive use.

The general data is temporarily stored ire the buffer means, and intermittently transmitted while the preferred data is preferentially transmitted. In this example, when the transmission rate of the general data is 1 Mbps or lower, transmission process of the general data is possible using processors such as reasonable CPU and/or microcomputers.

Regarding the preferred data input as a stream, invalid data portion of the stream is removed and only a valid data is used to produce packets based on packetization information. In this example, when the UDP/IP is used as a communication protocol, IP address as an address, and UDP port number as a subaddress are used as a header.

According one embodiment of the present invention, preferred data format information is obtained from the valid data to be used for determining a packetizing parameter with the packetizing information input from the outside. In this way, the automation of packetizing the preferred data can be performed in a unit of 80 bytes of DIF block when the preferred data is DV type, and in a unit of 188 bytes of TS packets when the preferred data is MPEG type. Thus, the structure of the sending/receiving apparatus can be made simple.

According one embodiment of the present invention, the preferred data can be restored in the receiving apparatus even when the packet loss is generated over the network by adding the error correction code to the preferred data in the preferred data packetization means in the sending apparatus.

One embodiment of the present invention relates to a transmission error protection function in the preferred data packetization means within the sending apparatus can be realized. By adding an error correction code after the preferred data is encrypted, even when a packet lose is generated in the network, the preferred data can be restored in the receiving apparatus. Moreover, data transmission which can prevent data eavesdropping on the network and has a high security is realized. In this way, even though a public network such as Internet is used as a transmission path, eavesdropping and leakage of the preferred data (AV data) to be real-time transmitted can be prevented. Moreover, it becomes possible to sell and charge on AV data transmitted via the Internet and the like, and selling contents distribution of B-B, B-C with a high security becomes possible.

One embodiment of the present invention relates to a method for switching the encryption key which performs encryption. By rendering a phase of the error correction matrix to a switching phase, it becomes possible to switching of the encryption key can be performed smoothly.

One embodiment of the present invention relates to a setting of a port number of the packet header of the valid data packets. Since a table which determines a combination of the formats of the preferred data and/or channel number and a port number is provided in the sending apparatus and the receiving apparatus, a format can be detected by only detecting a port number of the receiving apparatus. Thus, a signal can be readily processed in the reception apparatus.

Further, when the two streams are received at the same time in the receiving apparatus in which two lines of stream processes are possible, it is possible to identify a format or channel with the port number.

DETAILED DESCRIPTION

In the following description of the present specification, an apparatus which can send and receive information including packets will be referred to as a sending/receiving apparatus. Two sending/receiving apparatuses communicate information with each other. Further, in the following description of the present specification, a sending/receiving apparatus for sending data (for example, AV data) which is to be sent is referred to as a "sending apparatus", and a sending/receiving apparatus for receiving such data sent by the sending apparatus will be referred to as a "receiving apparatus" for the sake of convenience.

First, an overview of a system to which the present invention can be applied will be described for clarifying the present invention.

Figure 1:
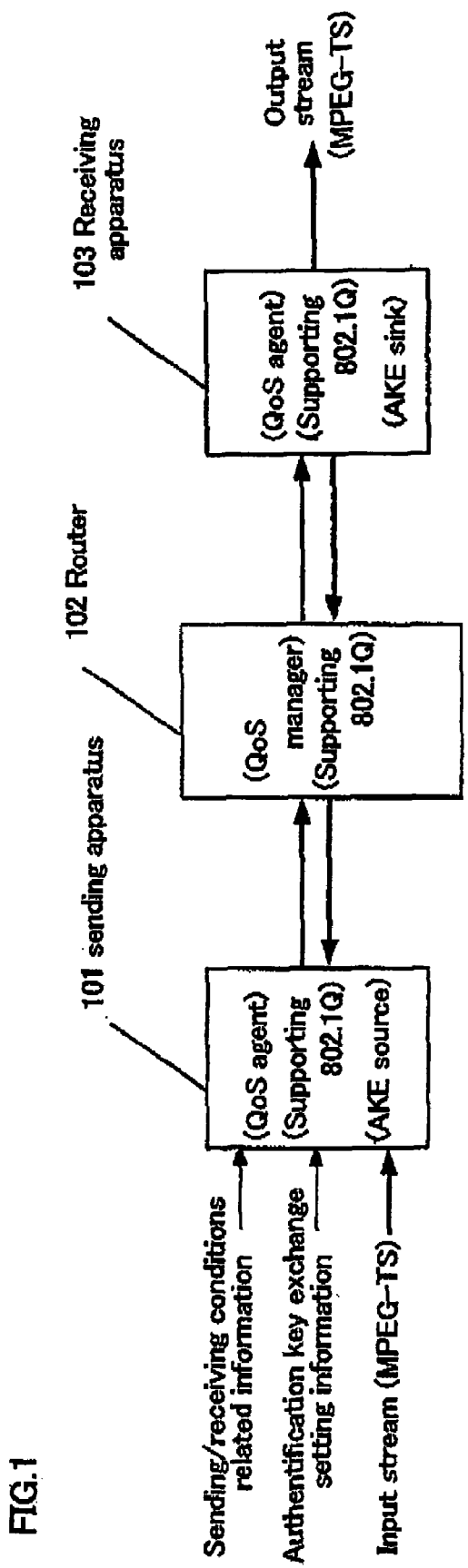
FIG. 1 is a diagram showing an exemplary system to which the present invention can be applied.

FIG. 1 is a diagram showing an exemplary system to which the present invention can be applied.

A sending apparatus 101 sends data to a receiving apparatus 103 via a router 102.

More specifically, sending/receiving condition related information, authentification and key exchange (hereinafter, also referred to as AKE) setting information, input stream (data such as MPEGTS) are input into the sending apparatus 101, and communication is performed based on the following procedures 1 through 3.

Procedure 1) Setting sending/receiving parameters: (1-1) Sets media access control (MAC) addresses internet protocol (IP) addresses, transmission control protocol/user datagram protocol (TCP/UDP) port numbers and the like of the sending apparatus 101 and the receiving apparatus 103.

(1-2) Sets Types and Bands of Signals to be Sent.

The sending apparatus 101 and the receiving apparatus 103 function as quality of service (QoS) agents. The router 102 functions as a QoS manager. Setting related to a network using IEEE 802.1Q (VLAN) standard is performed between the QoS agents and the QoS managers.

(1-3) Sate Priorities between the IEEE 802.1Q/p Standard.

Procedure 2) Authentification and key exchange: (2-1) The sending apparatus 101 and the receiving apparatus 103 authenticate each other and exchange keys to each other. In this case, for example, the DTCP scheme may be used.

Procedure 3) Data Transmission (3-1) Encrypted data (for example, MPEG-TS) is transmitted from the sending apparatus 101 to the receiving apparatus 103.

In FIG. 1, MPEG-TS is input to the sending apparatus 101 as an input stream. However, the present invention is not limited to this. The input stream may be, for example, MPEG-TS stream such as MPEG1/2/4 (ISO/IEC 13618), streams standardized with DV (IEC 61834, IEC 61883), SMPTE 314M (DV-based), SMPTE 259M (SDI), SMPTE 305M (SDTI), SMPTE 292M (HDSDI) and the like.

Data to be sent from the sending apparatus 101 may be common AV data. Furthermore, data of the present invention may be files. When files are transferred as data, data can be transmitted faster than real time under the conditions that the data transfer rate is larger than normal reproduction data rate from the relationship between the propagation delay time between the sending apparatus 101 and the receiving apparatus 103 and the processing abilities of the sending apparatus 101 and the receiving apparatus 103.

Figure 2:
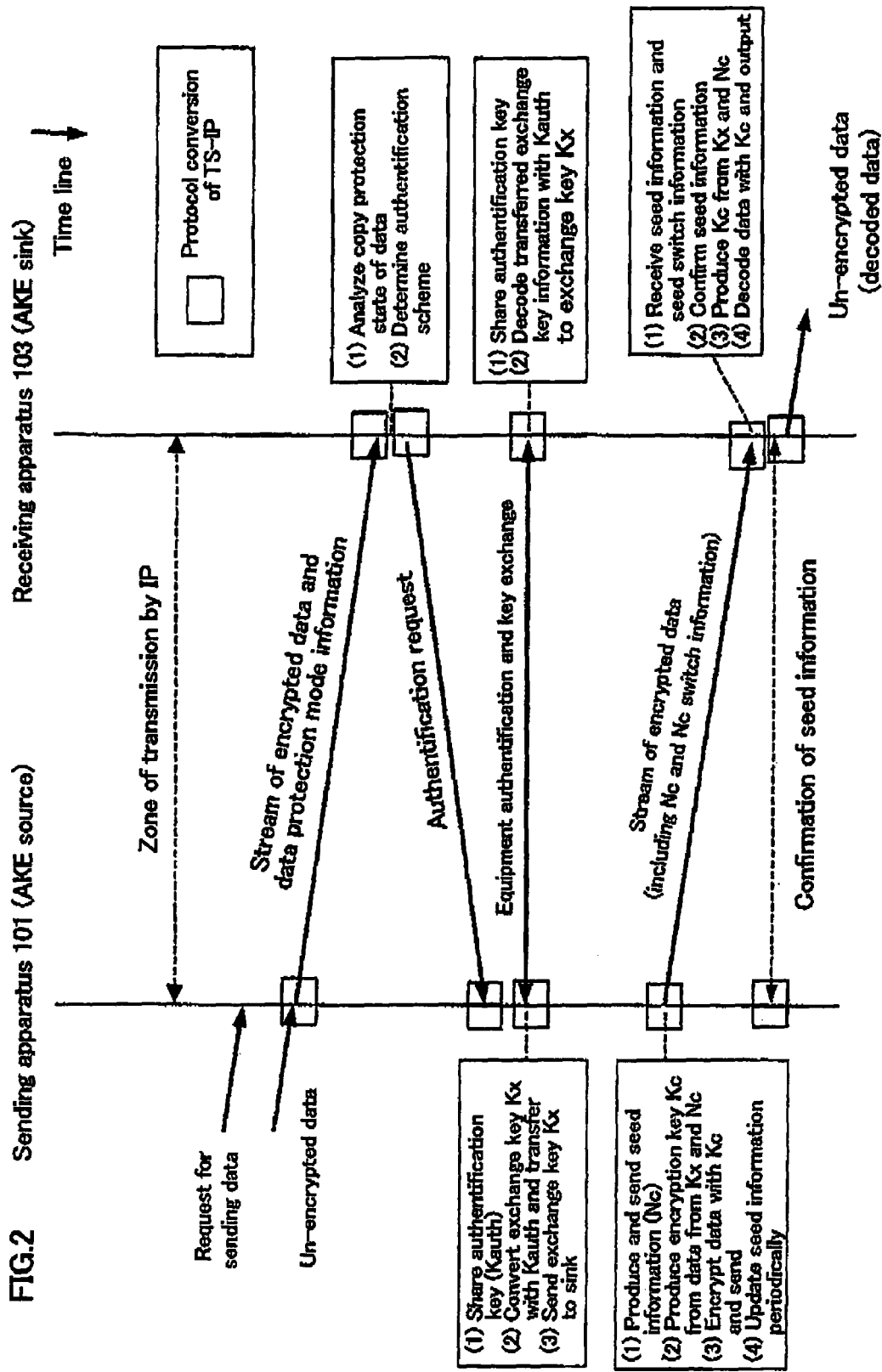
FIG. 2 is a diagram for showing operations of a sending apparatus and a receiving apparatus in the case where a DTCP scheme is applied for authentification and key exchange.

Next, with reference to FIG. 2, the authentification and key exchange in the above-mentioned procedure 2 will be further described.

FIG. 2 is a diagram for showing operations of the sending apparatus and the receiving apparatus in the case where the DTCP scheme is applied for authentification and key exchange.

Herein, authentification and key exchange (hereinafter, also referred to as AKE) which conform to the DTCP scheme are performed. In such a case, the sending apparatus 101 is also referred to as an AKE source and the receiving apparatus 103 is also referred to as an AKE sink.

The sending apparatus 101 and the receiving apparatus 103 are connected by an IP network.

First, protection mode information of data including copy protection information of data is sent from the sending apparatus 101 to the receiving apparatus 103. Herein, the sending apparatus 101 may send encryption data at the same time.

The receiving apparatus 103 analyses the copy protection information of the data and determines the authentification scheme to be used to send authentication request to the sending apparatus 101. By performing such operations, the sending apparatus 101 and the receiving apparatus 103 share the authentification key.

Next, the sending apparatus 101 encrypts exchange keys using the authentification key to produce encryption exchange key. Then, the sending apparatus 101 sends the encryption exchange key to the receiving apparatus 103. The receiving apparatus 103 uses the authentification key which it shares with the sending apparatus 101 to decode the encryption exchange key and produces the exchange key.

Then, the sending apparatus 101 produces key change information which changes over time for changing the encryption key in terms of time. Herein, the key change information is also referred to as seed information. The sending apparatus 101 sends the key change information to the receiving apparatus 103.

The sending apparatus 101 produces an encryption key using the exchange key and the key change information and encrypts data (for example, MPEG-TS) by encryption means using the encryption key to produce encryption data. Then, the sending apparatus 101 sends the encryption data to the receiving apparatus 103.

The receiving apparatus 103 produces an encryption key using the key exchange information and the exchange key. The receiving apparatus 103 decodes the encryption data using the encryption key. In the receiving apparatus 103, the encryption key is also referred to as a decode key.

Thereafter, the sending apparatus 101 and the receiving apparatus 103 may confirm the key change information of each other at any time.

Figure 3:
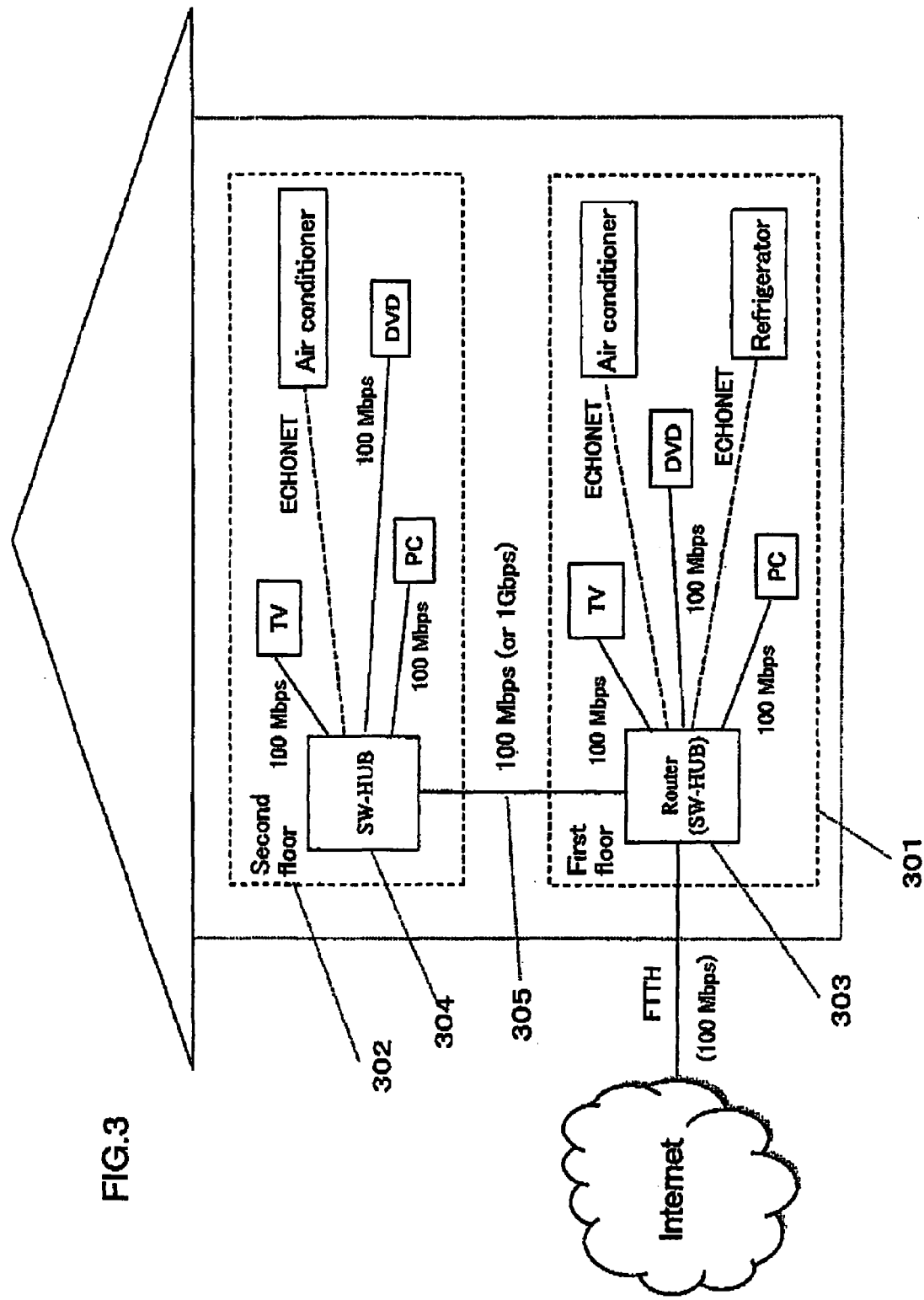
FIG. 3 is a schematic view showing an example of applying the DTCP scheme to a two-storied house using Ethernet™.

FIG. 3 is a schematic view showing an example of applying the DTCP scheme to a two-storied house using Ethernet™.

A network structure 301 for the first floor includes a router 303. The router 303 is provided on the first floor. The network structure 301 is connected to Internet via a fiber to the home (FTTH) of 100 Mbps.

A network structure 302 for the second floor includes a switching hub 304. The switching hub 304 is provided on the second floor.

The router 303 is connected to the switching hub 304 via a network 305. In this way, the network structure 301 for the first floor is connected to the network structure 302 for the second floor. In this example, the network 305 is Ethernet™ network for connecting the router 303 and the switching hub 304. The router 303 also functions as a switching hub.

The data rate of the Ethernet™ network for the entire house is 100 Mbps.

In the network structure 301 for the first floor, a television (TV), a personal computer (PC), and Digital versatile disc (DVD) recorder are connected to the router 303 by Ethernet™ of 100 Mbps. Further, an air conditioner and a refrigerator are connected by ECHONET.

In network structure 302 for the second floor, a television (TV), a personal computer (PC), and Digital versatile disc (DVD)recorder are connected to the switching hub 304 by Ethernet™ of 100 Mbps. Further, an air conditioner is connected by ECHONET. ECHONET is a transmission scheme developed in "ECHONET CONSORTIUM" (http://www.echonet.gr.ip/).

In the example shown in FIG. 3, the personal computers (PCs), the DVD recorder, the router 303, and the switching hub 304 support IEEE 802.1Q standard (VLAN). Thus, data rates at all the ports are the same (for example, 100 Mbps). As long as the total data rate being output from a specific output port does not exceed a standard value or and effective value of an output port of the port in the router 303 and the switching hub 304, data input from an input port is not lost at the router 303 or the switching hub 304 and is all output from an output port.

For example, even when data is input via eight input ports at the same time, if outputs ports for the data are different, the data do not conflict with each other in a buffer provided inside the router 303 or the switching hub 304, and are switched and output from output ports. Data input from the input ports are all output from the output ports without a dropping packet.

In the example shown In FIG. 3, the data rate of the entire Ethernet™ in the house is 100 Mbps and the data rate of the network 305 between the first floor and the second floor is also 100 Mbps. When a plurality of data flow between equipment on the first floor and equipment on the second floor, the total data rate flows on the network 305 may exceed 100 Mbps if there is no limit on the data rate for each of the data. A data stream which requires real-time transmission such as video application of MPEGTS may be interrupted.

In this came, it is necessary to perform priority control with respect to the transmission data in order not to interrupt a data stream which requires real-time transmission. It becomes possible not to interrupt a data stream which requires real-time transmission by introducing a speed limit mechanism for stream transmission and file transfer, which will be described later, not only to a terminal, but also to the router 303 and the switching hub 304.

For instance, if a higher priority is given to transmission of MPEG-TS data which requires real-time transmission than to transmission of file data, it becomes possible to transfer file between the PC at the first floor and the PC at the second floor and encrypt MPEG-TS data and transmit on a real-time basis between the DVD recorder, PC, or TV at the first floor and the DVD recorder, PC, or TV at the second floor at the same time.

The transmission speed limit mechanism at the router 303 or the switching hub 304 can be realized by data flow control. More specifically, data with high priority and data with low priority are compared at input data queue means of the router 303 or the switching hub 304. Buffer control rules used for priority control scheme include: a round robin scheme; fluid fair scheduling scheme; weighting fair scheduling scheme; self-synchronization fair scheduling; WFFQ scheme; virtual clock scheduling scheme; classifying scheduling scheme; and the like. The details of the scheduling schemes are described in, for example, Iwao Toda, "Nettowaku QoS Gijutu (Network QoS Technique)", May 25, 2001 (First edition), Ohmsha Ltd., Chapter 12.

(Embodiment 1)

Figure 4:
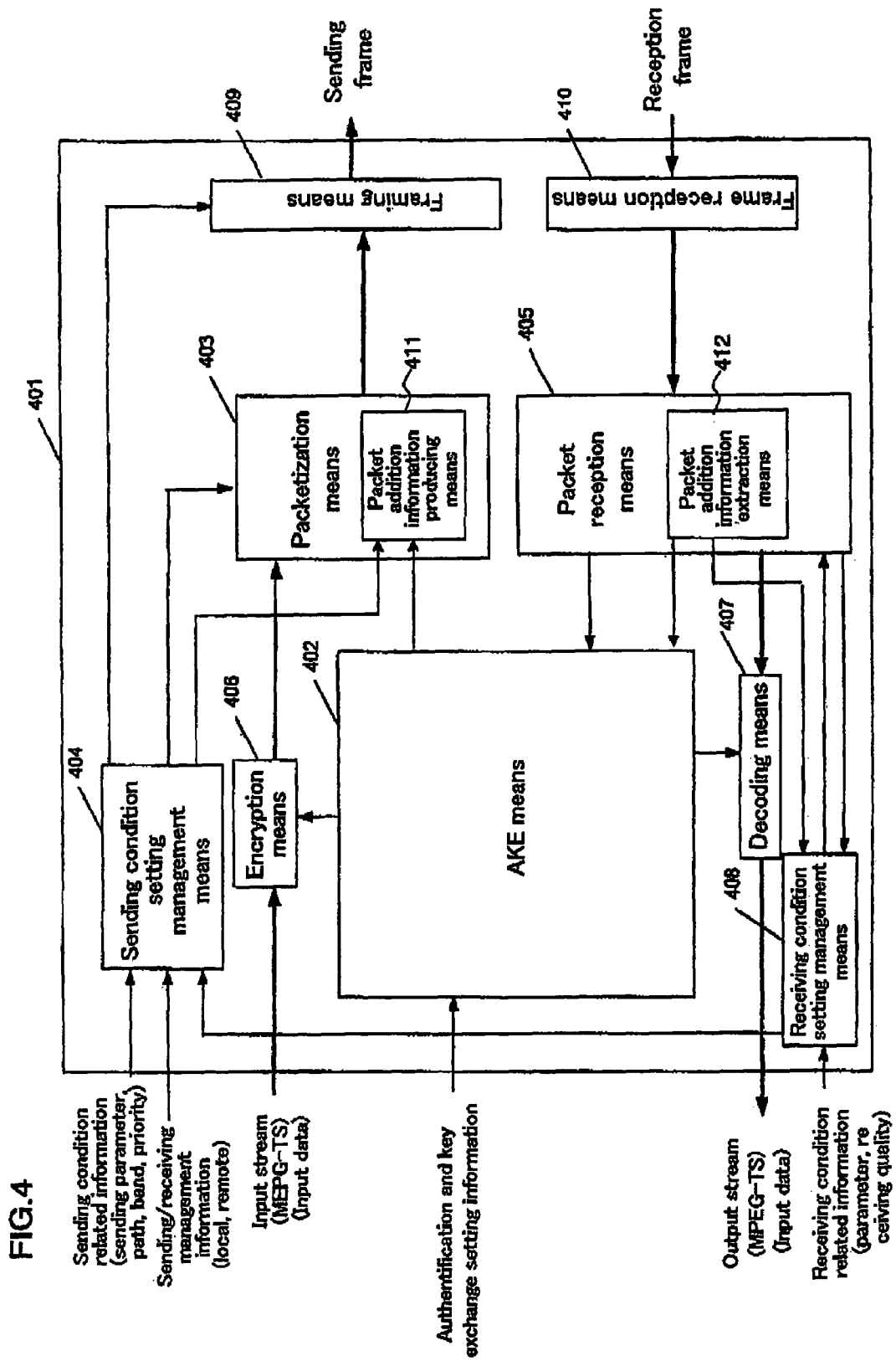
FIG. 4 is a block diagram of a packets sending/receiving apparatus according to Embodiment 1 of the present invention.

FIG. 4 is a block diagram of a packets sending/receiving apparatus 401 according to Embodiment 1 of the present invention.

The packets sending/receiving apparatus 401 performs authentification and key exchange which conform to the DTCP scheme to send and receive packets. In this example, it is assumed that the packets sending/receiving apparatus 401 send packets to another packet sending/receiving apparatus having similar functions as the packets sending/receiving apparatus 401 and receives packets from such packets sending/receiving apparatus. Thus, the packets sending/receiving apparatus 401 sends sending packets to the destination of the sending packets and receives reception packets from the source of the reception packets.

The packets sending/receiving apparatus 401 includes: authentification/key exchange means (hereinafter, also referred to as AKE means) 402 for producing an encryption key and a decoding key; encryption means 406 for producing encrypted sending data by encrypting sending data using the encryption key; sending condition setting management means 404 for producing sending condition setting information for setting sending conditions for set packets using at least one of sending conditions related information, sending/receiving management information, and receiving condition setting information; packetization means 403 for producing sending packets; receiving condition setting management means 408 for producing receiving condition setting information for setting receiving conditions of reception packets using at least one of receiving condition related information and packet receiving information; packets reception means 405 for receiving reception packets, which extracts reception data included in the reception packets from the reception packets using the receiving condition setting information, produces packets receiving information from the reception packets, and outputs the packets receiving information to the authentification/key exchange means or the receiving condition setting management means 408; and decoding means 407 for decoding the reception data using the decoding key.

The packets sending/receiving apparatus 401 further includes framing means 409 for producing sending frames using the sending packets and frame reception means 410 for receiving reception frames. This allows the packets sending/receiving apparatus 401 to function as a sending apparatus for sending the sending frames including the sending packets and as well as a receiving apparatus for receiving the reception frames including the reception packets.

Hereinafter, an example where the packets sending/receiving apparatus 401 sends the sending frames using TCP/IP or UDP/IP and the like will be described.

The sending condition related information, the sending/receiving management information, and the receiving condition setting information are input to the sending condition setting management means 404.

The sending condition related information include, for example, the type of the sending data, information on an address to be sent or port number, path information (routing information) used for sending, a band of the sending data, and a priority for sending the sending data.

The sending/receiving management information includes equipment control data in a sending apparatus (local) and a receiving apparatus (remote).

More specifically, the sending management information includes equipment management control data such, as media access control address or location information in the sending apparatus (local) and the receiving apparatus (remote). The location information is information with an area specified by a region code, address, postal code, or longitude and latitude. By using the location information, it becomes possible to limit the area of sending equipment and receiving equipment for authentification. Further, it is also possible to limit authentification range by permitting authentification when propagation time of the packets for one-way or round trip between the sending apparatus and the receiving apparatus is shorter than the predetermined limit time. For example, the authentification range can be limit by permitting authentification only when round trip time (RTT) is 1 msec or shorter in IP connection of Ethernet scheme. Further, when a plurality of transmission media, for example, a wireless scheme such as 802.11a standard or 802.11b standard and Ethernet standard are combined, authentification may be permitted by setting RTTs which respectively correspond to propagation delay properties of the transmission media. Such times may be measured by commands specific to AKE, or may be realized by including a time stamp or location information in packets addition information, as will be described with reference to FIG. 5.

Further, if there is a wireless transmission zone in a sending/receiving zone between the sending apparatus and the receiving apparatus, it is possible to prevent a third party from reading data due to data leakage in wireless the transmission zone by permitting authentification after performing encryption and scrambling of data to confirm that it is in a transmission mode.

The receiving condition setting information includes information for feeding back a reception state of the receiving apparatus from the receiving apparatus to the sending apparatus. The information is input from the receiving condition setting management means 408 to the sending condition setting management means 404.

The sending condition setting management means 404 produces sending condition setting information using at least one of the sending condition related information, sending/receiving management information and receiving condition related information. The sending condition related information includes at least one of location information of the destination of the sending packets and location information of source of received packets.

Using the sending condition setting information produced in the sending condition setting management means 404, header, payload and the like are set in the packetization means 403 and the framing means 409. The sending condition setting management means 404 also outputs the sending condition setting information the packetization means 403 and packets addition information producing means 411 included in the packetization means 403.

To the AKE means 402, authentification and key exchange setting information (hereinafter, also referred to as AKE information) is input. From the AKE means 402, authentification and key exchange related information related to the AKE setting information (hereinafter, also referred to as AKE related information) is input to the packets addition information producing means 411. The authentification and key exchange related information includes, for example, copy protection information indicating encryption state of encryption sending data at the time of transmission and encryption key change information.

For example, MPEG-TS is input as an input stream to the-encryption means 406. The encryption means 406 takes a part of MPEG-TS as the sending data and encrypt the sending data using the encryption key produced at the AKE means 402 to produce the encryption sending data. The encryption sending data is output from the encryption means 406 to the packetization means 403.

The packetization means 403 produces sending packets by using the encryption sending data based on sending condition setting information produced in the sending condition setting management means 404.

The packetization means 403 includes the packets addition information producing means 411. The packet addition information producing means 411 produces packets addition information using at least one of sending condition setting information and authentification and key exchange related information.

The packetization means 403 converts the encryption sending data into a predetermined size and may add internet protocol (IP) header defined as IPv4 or IPv6 in IETF, add information indicating that it is preferred packets in a service type field in the IPv4 header or a type of service (TOS) field within the service type field, or add information indicating that it is preferred packets in a priority field of the IPv6 header.

The packets additional information produced at the packets addition information producing means 411 is input to the packetization means 403 and added to the encryption sending data. More specifically, the packets addition information is added to the encryption sending data as a part of a header of TCP/IP or UDP/IP protocol, and sending packets are produced.

To the sending packets, encryption mode information is also added as copy control information of the DTCP scheme in the AKE means 402.

To the sending packets, an MAC header is further added in the framing means 409 to form an Ethernet™ frame. The Ethernet™ frame is output from the framing means 409 to a network as a sending frame.

The copy control information of the contents is referred to as copy control information (CGI). The copy protection information indicating encryption at the transmission is referred to as encryption mode indicator (EMI). In general, EMI is used with a protection mode equal to or stronger than that of CGI.

Next, an example in which the packets sending/receiving apparatus 401 receives a reception frame will be described.

The frame reception means 410 receives a reception frame via the network.

The frame reception means 410 extracts an MAC header included in the reception frame and performs filtering based on the extracted MAC header. Then, the frame reception means 410 outputs IP packets obtained by filtering to the packets reception means 405.

In the packets reception means 405, filtering is performed by identifying an IP packets header of the IP packets to produce packets reception information. AKE information obtained as packets reception information by filtering is input to packets addition information extraction means 412 included in the packets reception means 405. The packets addition information extraction means 412 extracts packets addition information from the reception packets. The extracted packets addition information is output to the AKE means 402.

In this way, the AKE means of the sending apparatus and the AKE means of the receiving apparatus can be connected to each other on one-on-one basis. Thus, they can exchange messages to with each other via a communication protocol.

The AKE means 402 permits authentification when the location information of the packets sending/receiving apparatus 401 and the location information of the destination of the sending packets or the location information of the source of the reception packets match the predetermined condition.

The AKE means 402 permits authentification when the propagation time in one way or a sound trip from the packets sending/receiving apparatus 401 to the destination of the sending packets or the source of the reception packets is shorter than the predetermined limit time is shorter between the packets sending/receiving apparatus 401 and the destination of the sending packets or the source of the reception packets.

Alternatively, when there is a wireless transmission zone in the sending/receiving zone between the packets sending/receiving apparatus 401 and the destination of the sending packets or the source of the reception packets, the AKE means 402 may permit authentification when it is confirmed that it is in a mode of scrambling data for transmission in the wireless transmission zone.

Therefore, authentification and key exchange can be performed in accordance with setting procedure of two AKE means.

After the authentification and key exchange are approved between packets sending/receiving apparatus which functions as a sending apparatus and packets sending/receiving apparatus which functions as a receiving apparatus, the sending apparatus sends encrypted AV data.

In the receiving apparatus, MEPG-TS data is input to the encryption means 406. The encryption means 406 encrypts the MEPG-TS data to produce encrypted MEPG-TS data. The encrypted MEPG-TS data is input to the packetization means 403. A header of TCP/IP protocol is added in the packetization means 403 to produce sending packets.

In the framing means 409, an MAC header is further added to the sending packets using 802.1Q (VLAN) scheme to convert into Ethernet™ frame and to produce sending frames. The sending frames produced as such are output to the network.

By setting priority (user priority) in tag control information (TCI) in the MAC header, priority of network transmission can be made higher than that of general data.

In the receiving apparatus, a signal input from the network is filtered based on the MAC header in the frame reception means 410, and is input to the packets reception means 405 as IP packets. The IP packets are filtered in the packets reception means 405 by identifying a packets header or the like, and is input to the decoding means 407. Then, decoded MEPG-TS is output.

To the sending condition setting management means 404, information for feeding back the reception state to the sending apparatus from the receiving condition setting management means 408 as receiving condition setting information is input. The sending condition setting management means 404 produces sending condition setting information based on this information. Based on the sending condition setting information, the header and the payload produced in the packetization means 403 and the framing means 409 are set.

Figure 5:
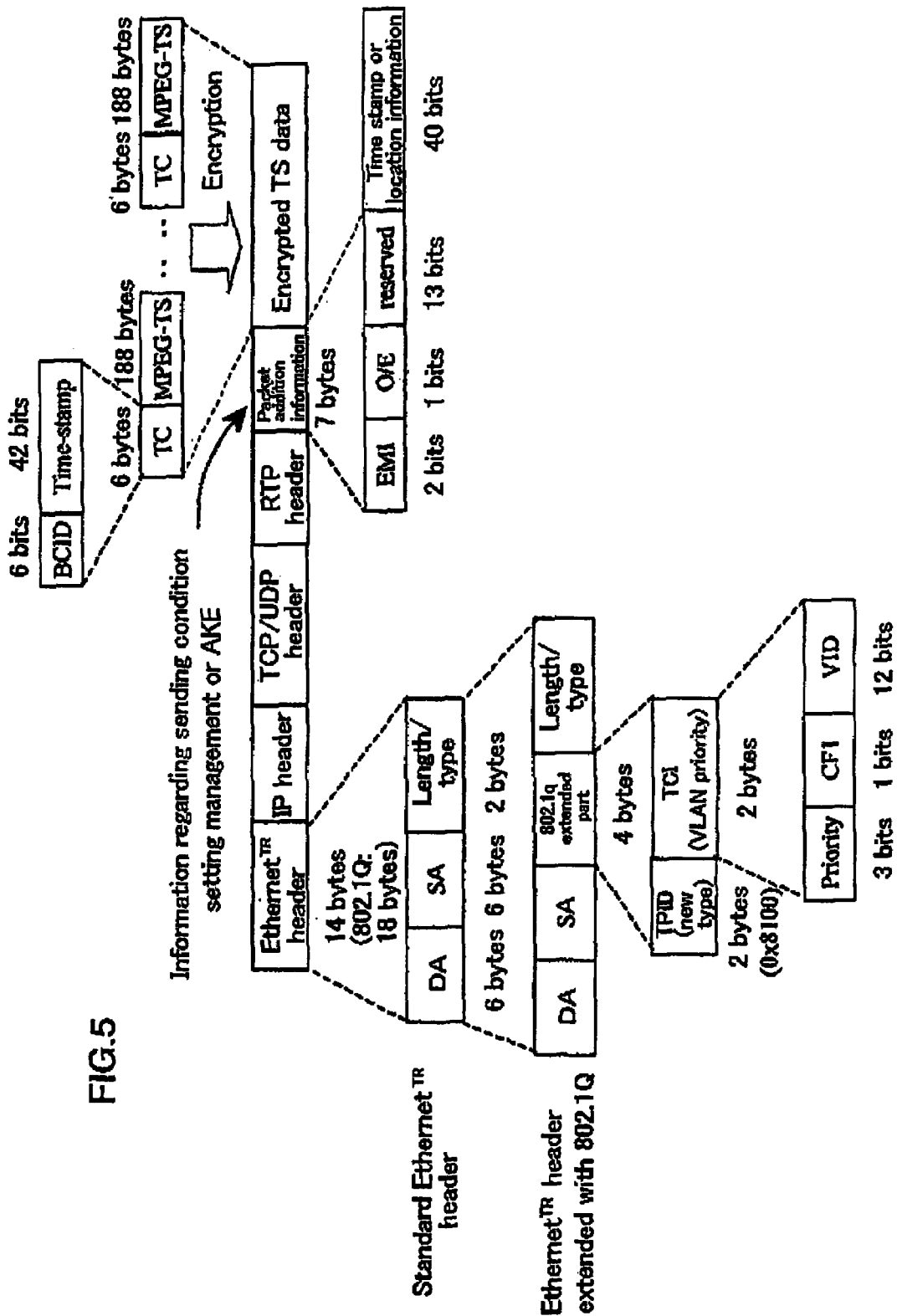
FIG. 5 is a schematic diagram showing an exemplary packets format when packets is transmitted using MEPG-TS, and then a frame is produced for transmission.

FIG. 5 is a schematic diagram showing an exemplary packets format when packets are transmitted using MEPG-TS, and further, a frame is produced and transmitted. In this example, MEPG-TS conforms to ISO/IBC 13818. MEPG-TS may be a signal format based on ARIB standard, ARID TR-B14, ARIB TR-B15, or ARID STD-B21.

MEPG-TS to be input as an input stream is segmented in every 188 bytes. A time code (TC) of 6 bytes is added to the MEPG-TS of 188 bytes to form a unit of 194 bytes. In this example, TC includes a time stamp of 42 bits and a base-clock ID (BCID) of 6 bits.

BCID can represent frequency information of the time stamp.

For example:
(Case 1) When BCID is 0x00, there is no frequency information of time stamp;
(Case 2) When BCID is 0z01, the frequency information of the time stamp is 27 MHz (system clock frequency of MPEG2);
(Case 3) When BCID is 0x02, the frequency information of the time stamp is 90 kHz (clock frequency used with MPEG1);
(Case 4) When BCID is 0x03, the frequency information of the time stamp is 24.576 MHz (clock frequency used with IEEE 1394); and
(Case 5) When BCID is 0x04, the frequency information of the time stamp is 100 MHz (frequency used in Ethernet™).

Two units of data of 194 bytes are combined and encrypted to produce encryption data. Then, packets addition information of 7 bytes is added to the encryption data. In this way, a payload of RTP protocol is formed.

In this example, the packets addition information includes encryption mode indicator (EMI) of 2 bits, odd/even (O/E) of 1 bit, reserved data of 13 bits and a time stamp or location information of 40 bits. EMI and O/E are defined by the DTCF scheme. Instead of O/E, seed information (Nc) of DTCP may be used.

The packets addition information producing means 411 (see FIG. 4) uses the AKE related information to produce EMI and O/E.

The time stamp or the location information is produced in the packets addition information producing means 411 (see FIG. 4) using sending condition setting information, and is located following the reserved data. The time stamp or the location information may also be located between the O/E and the reserved data.

The location information is information with an area specified by a region code, address, postal code, or longitude and latitude.

In this example, the packets addition information is 7 bytes. However, the packets addition information is not limited to 7 bytes.

The packets addition information may not include the time stamp or the location information. In such a case, the packets addition information becomes 2 bytes.

When the packets addition information of 7 bytes is added to the encryption data, the payload of the RTP protocol is formed. When a RTP header is added as a header, the RTP protocol is formed.

The RTP protocol is a payload of TCP packets or UDP packets. When a TCP header or a UDP header is added, the TCP packets or the UDP packets are formed.

The TCP packets or the UDP packets are a payload of IP packets. When an IP header is added as a header, the ID packets are produced. In this example, the IP header is defined as Ipv4 or Ipv6 with IETF.

Furthermore, the IP packets are a payload of a MAC frame. When an Ethernet header is added as a header, Ethernet packets are produced.

As the Ethernet™ header, both a standard Ethernet™ header and a Ethernet™ header extended with IEEE 802.1Q (VLAN) are applicable as shown in FIG. 5.

A standard Ethernet header is 14 bytes, and includes destination address (DA) of 6 bytes, source address (SA) of 6 bytes, and information indicating length/type of 2 bytes.

An Ethernet header extended with 802.1Q is 18 bytes. The Ethernet header extended with 802.1Q is different from a standard Ethernet header on the point that 802.1Q extended part of 4 bytes is provided between the SA and the information indicating the length/type.

The 802.1Q extended part includes tag control ID (TPID) of 2 bytes and tag control information (TCI) of 2 bytes which indicates VLAN priority.

TCI includes priority (user priority) of 3 bits, canonical format indicator (CFI) of 1 bit and VLAN Identifier (VID) of 12 bits.

How to use priority is defined by ISONEC 15802-3. With a flag of the priority, priority of the Ethernet™ frame can be set.

Figure 6:
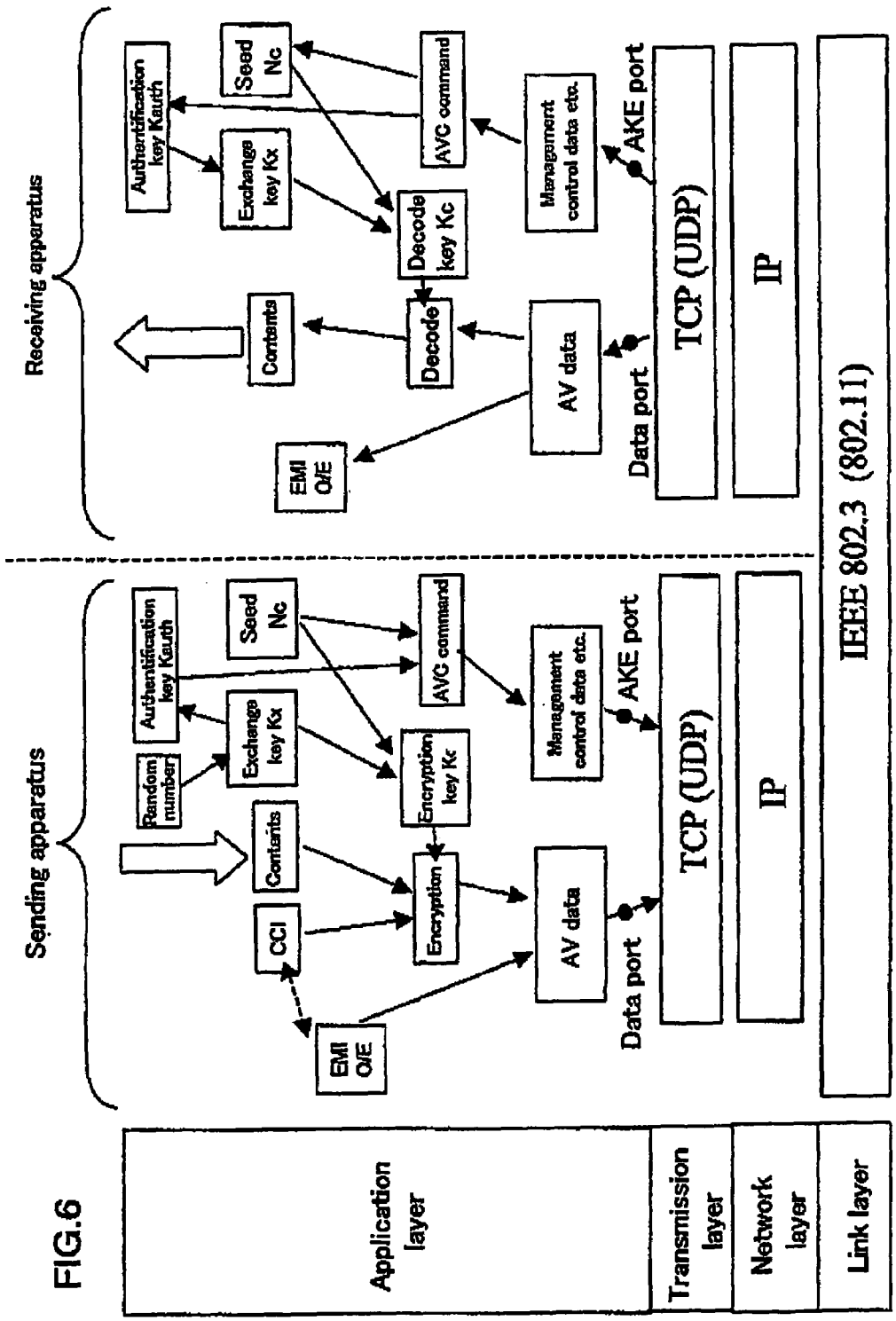
FIG. 6 is a schematic view for illustrating a protocol stack according to Embodiment 1 of the present invention.

FIG. 6 is a schematic view for illustrating a protocol stack according to Embodiment 1 of the present invention.

On the left of side of FIG. 6, a hierarchy of open systems interconnection (OSI) is shown. The hierarchy includes a link layer, a network layer, a transmission layer, and an application layer in this order from the bottom.

First, encryption data is sent from the sending apparatus to the receiving apparatus via a data port, and AKE related information is sent via an AKE port.

In the receiving apparatus, copy protection information of data is analyzed and an authentification scheme is determined. Then, authentification request is sent to the sending apparatus.

Next, in the sending apparatus, a random number is generated. The random number is input into a predetermined function to produce an exchange key. When information of the exchange key is input into a predetermined function, an authentification key is produced.

In the receiving apparatus, a predetermined process is performed to produce the authentification key. In this way, the sending apparatus and the receiving apparatus share the authentification key.

In this example, information used for encryption is information produced by combining one or more of information unique to the sending apparatus (for example, equipment ID, authentification information of the equipment, MAC address, and the like), secret key, public key, information provided from outside. Secure encryption can be achieved by using encryption scheme with a high encryption strength such as DES scheme or AES scheme.

Next, the sending apparatus encrypts the exchange key using the authentification key to produce an encryption exchange key and outputs the encryption exchange key to the receiving apparatus. The receiving apparatus uses the authentification key to decode the encryption exchange key to the exchange key. Further, the exchange key and initial key update information are input into a predetermined function and produces the encryption key (decode key).

Further, the receiving apparatus produces key update information which changes over time for changing the encryption key over time, and send the key update information to the receiving apparatus.

In the sending apparatus, MEPG-TS data, which is contents data, is encrypted with the encryption key, and encryption data is produced. The encryption data becomes payload of TCP (or UDP) packets as AV data with the above-mentioned EMI and O/E, and the TCP (or UDP) packets are produced. Further, the TCP (or UDP) packets are used as a payload of IP packets, and the IP packets are produced. The IP packets are used as a payload of a MAC frame, and the Ethernet™ MAC frame is produced.

MAC can be applied not only to IEEE 802.3 standard, which is a standard for Ethernet™, but also to MAC of IEEE 802.11 standard, which is a standard for the wireless LAN.

Ethernet™ MAC frame is transmitted from the sending apparatus to the receiving apparatus over Ethernet™. The receiving apparatus produces the encryption key (decode key) in accordance with a predetermined procedure. Then, the IP packets are filtered from the received Ethernet™ MAC frame. Further, the TCP (or UDP) packets are extracted from the IP packets. Then, AV data is extracted from the TCP (or UDP) packets. By using the exchange key and the encryption key (decode key) produced using the key change information, data (MEPG-TS) is decoded.

Preferably, the timing information indicating timing for the AKE means 402 to update the decode key is added to sending packets. In such a case, the timing for the AKE means 402 to update the decode key may be notified by changing a TCP port number or UDP port number of the sending packets.

When the sending packets use HTTP, the timing for the AKE means 402 to update the decode key may be updated for every HTTP request, or may be changed for every constant amount of data.

Alternatively, in the case where the sending packets use RTP, the timing for the AKE means 402 to update the decode key may be updated within a predetermined period (for example, 60 seconds).

As described above, it is possible to encrypt data such as MEPG-TS in the sending apparatus, transmit the IP packets via the network with HTTP/ICP/IP or RTP/UDP/IP, and decode to original data in the receiving apparatus. If the above-mentioned O/E or seed information (Nc) is updated in accordance with a certain rule, for example, for every HTTP request, or for every constant amount of AV data (for example, 1 MB), or within a predetermined time, security can be further improved.

Now, with reference to FIG. 3 again, how stream transmission and file transfer can become compatible by changing a network topology using the switching hub will be described.

For example, by extending the data rate of the network 305 between the first floor and the second floor from 1.00 Mbps to 1 Gbps, it becomes possible to transfer a file between the PC of the first floor to the PC of the second floor, and to encrypt and transmit in real time MEPG-TS between the DVD recorder, PC or TV of the first floor and DVD recorder, PC or TV of the second floor at the same time.

For example, a commercially available switching hub having eight ports of 100 Mbps and one port of 1 Gbps is used. The port of 1 Gbps is connected to the network 305 which connects the network structure 301 for the first floor and the network structure 302 for the second floor. AV equipment such as TV are connected to the remaining eight parts of 100 Mbps. Since there are eight 100 Mbps ports, even when data is respectively input to the eight ports at maximum of 100 Mbps and output from one port, the total data rate of the input ports is 800 Mbps (100 Mbps×8 ch). This value is smaller than 1 Gbps. Thus, data input from the eight input ports are not lost in the switching hub, and is all output from the output port.

Therefore, it is possible to transmit all the data to be output from AV equipment on the first floor to the second floor via the network 305. It is also possible to transmit all the data to be output from AV equipment on the second floor to the first floor via the network 305.

By using the switching hub as described above, real-time transmission of data and file transfer can be performed at the same time.

(Embodiment 2)

Figure 7:
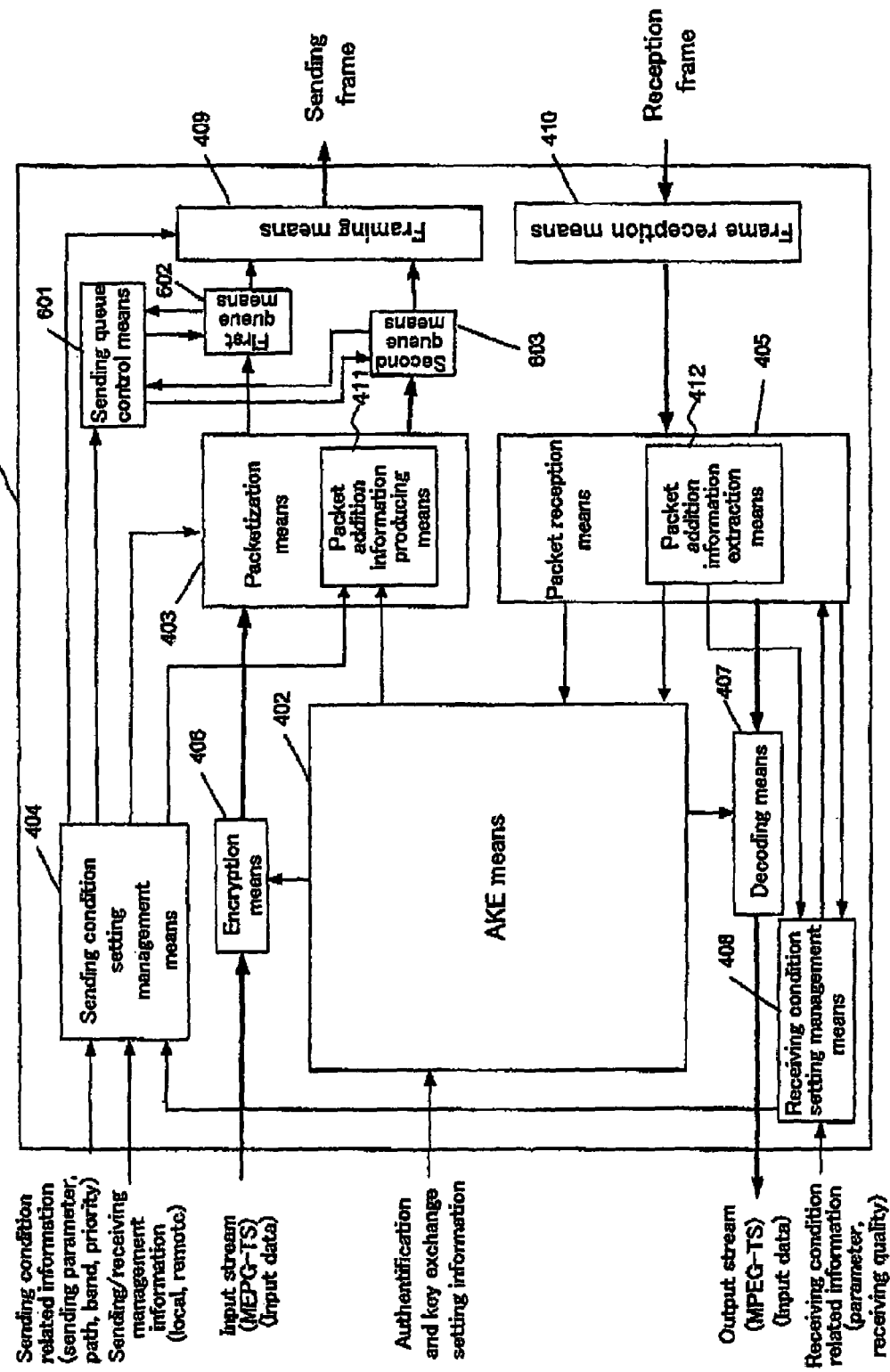
FIG. 7 is a block diagram of a packets sending/receiving apparatus according to Embodiment 2 of the present invention.

FIG. 7 is a block diagram of a packets sending/receiving apparatus 401A according to Embodiment 2 of the present invention.

The packets sending/receiving apparatus 401A has a similar structure as the packets sending/receiving apparatus 401 described with reference to FIG. 4 in Embodiment 1 except for that it further includes sending queue control means 601, first queue means 602, and second queue means 603. In the following description, the sending queue control means 601, the first queue means 602 and the second queue means 603 will be mainly described in order to simplify the description.

The packetization means 403 performs a TCP/IP protocol process to general data to produce first packets group, and outputs the first packet group to the first queue means 602. In this example, general data is, for example, sending condition setting information or AKE related information.

The first queue means 602 temporarily stores the first packets.

The packetization means 403 again performs a TCP/IP protocol process to the encryption sending data produced at the encryption means 406 to produce second packets, and outputs the second packets to the second queue means 603.

The second queue means 603 temporarily stores the second packets.

The packetization means 403 uses general data for producing first packets group, while it uses the encryption data, which is contents data, to produce second packets group.

The sending queue control means 602 controls that which packets are to be output preferentially based on the sending condition setting information when the packets are temporarily stored in the first queue means 602 and the second queue means 603.

Specifically, the sending queue control means 601 controls which of the first packets stored in the first queue means and the second packets stored in the second queue means is to be sent by using at least one of the information regarding a sending path of the first packets or the second packets, information regarding a bandwidth required for sending the first packets or the second packets, information regarding a delay from sending of the sending packets from the arrival, and information regarding a priority of the first packets or the second packets.

In normal state, the sending queue control means 602 controls the first queue means 602 and the second queue means 603 so as to output contents data such as MPEG-TS preferentially over general data. In other words, the sending queue control means 602 handles the encryption sending data, which is contents data, as preferred data which is given a priority over general data.

The preferred data has at least one of data stream formats such as an uncompressed SD format signal defined by SMPTE 259M standard, an uncompressed HD format defined by SMPTE 292 standard, a transmission stream format of DV or MPEG-TS by IEEE 1394 defined by IEC 61883, MPEG-TS format by DVB-ASI defined by DVB standard A010, MPEG-PS format, MPEG-ES format, and MPEG-PES format.

The sending queue control means 601 may any one of control scheme such as RSVP scheme described with IETF RFC2205, RFC2208,RFC2209,Intservscheme described with IETF RFC2210, RFC2211, 2212, RFC2215, and Diffserv scheme described with IETF RFC2474, RFC2475, RFC2597, RFC2598.

The framing means 409 uses the first packets or the second packets respectively output from the first queue means 602 and the second queue means 603 to produce a sending frame, and outputs the sending frame to the network.

The sending queue control means 601 may control the first queue means and the second queue means so as to average a period between the first packets to be sent from the first queue means 602 and the second packets to be sent from the second queue means 603.

In general, when, MEPG-TS is transmitted from the sending apparatus to the receiving apparatus with: a low delay, overflow is more likely to occur since a buffer for MEPG-TS is small.

In the sending apparatus, when a buffer for MEPG-TS (for example, a buffer of the second queue means 603) nearly overflows, or it turn out that a buffer for MEPG-TS in the receiving apparatus nearly underflow with reference to information fed back from the receiving apparatus, such a crash of a buffer can be avoided by further increasing the priority of the second queue means 603 adaptively so as to preferentially output data of MEPG-TS.

When the sending apparatus remotely operates the receiving apparatus, the priority of the first queue means 602 may be increased adaptively in the sending apparatus in order to increase control response such as reproduction and stop of the receiving apparatus. However, in such a case, the buffer for the MEPG-TS may overflow or underflow.

Accordingly, for the sending apparatus to remotely operate the receiving apparatus so as to avoid overflow and underflow of the buffer, and increase the speed of control response such as reproduction and stop of the receiving apparatus, a rapid control response can be realized by outputting packets for remotely controlling the receiving apparatus directly from the packetization means 403 to the framing means 409 without passing through the queue means. Alternatively, a rapid control response can be realized by newly providing third queue means for packets for remotely controlling the receiving apparatus.

The operation of the receiving apparatus is similar to that in Embodiment 1.

Preferably, the sending queue control means 601 controls the first queue means 602 and the second queue means 603 such that the data rate of the second packets group does not become smaller than a predetermined value. Further, it is preferable that the sending queue control means 601 controls the first queue means 602 and the second queue means 603 such that storage time in the second queue means 603 is always smaller than the predetermined value.

(Embodiment 3)

Embodiment 3 will be described.

Figure 8:
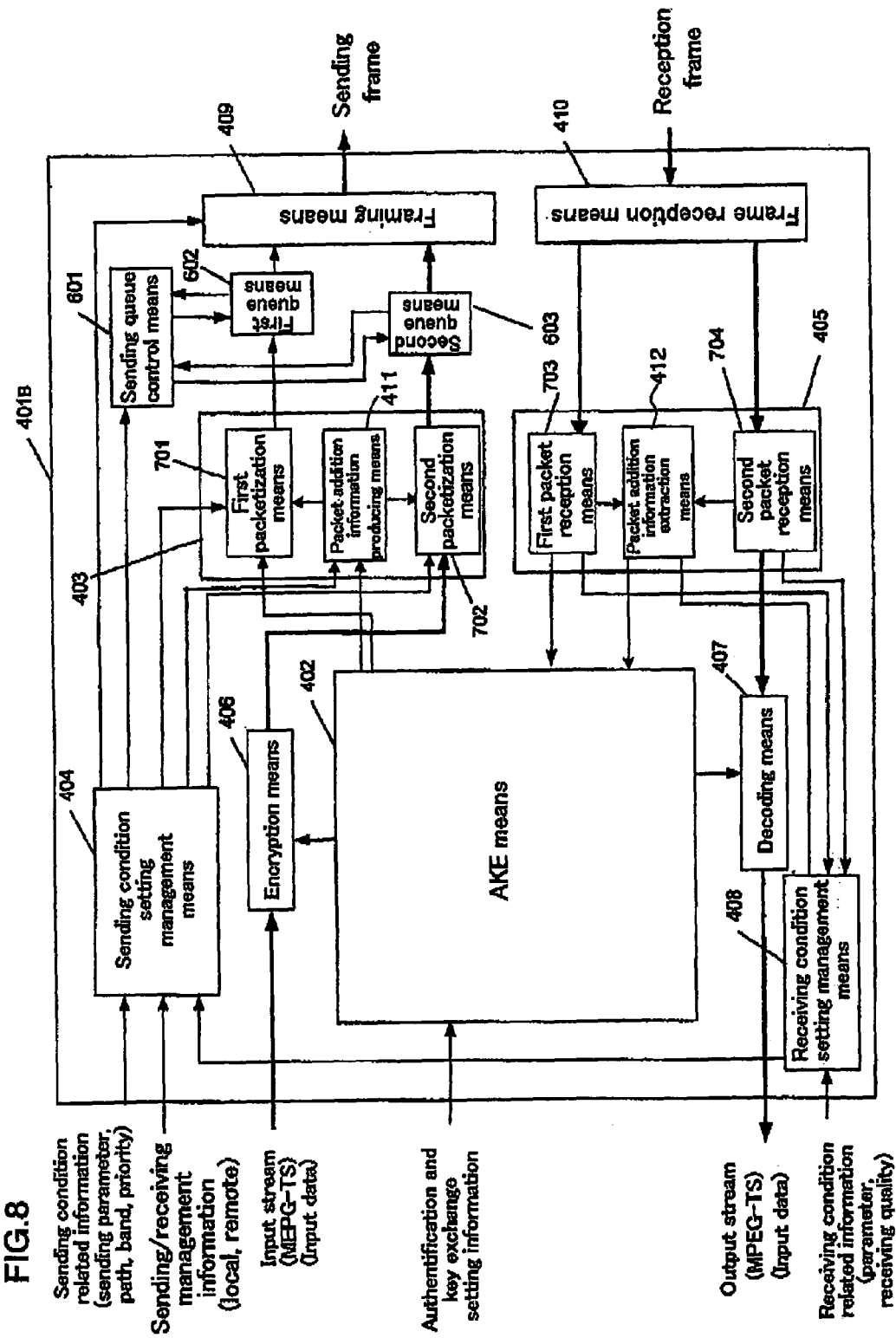
FIG. 8 is a block diagram of a packets sending/receiving apparatus according to Embodiment 3 of the present invention.

FIG. 8 is a block diagram of a packets sending/receiving apparatus 401B according to Embodiment 3 of the present invention.

The packets sending/receiving apparatus 401B has a similar structure as the packets sending/receiving apparatus 401A described with reference to FIG. 7 in Embodiment 2 except for that the packetization means 403 includes first packetization means 701 and second packetization means 702, and the packets reception means 405 includes a first packets reception means 703 and second packets reception means 704. In the following description, the first packetization means 701, second packetization means 702, the first packets reception means 703 and the second packets reception means 704 will be mainly described in order to simplify the description.

First, how the receiving/sending apparatus 401B send a sending frame will be described.

The first packetization means 701 includes a processor, for example. To the first packetization means 701, the sending condition setting information and the AKE related information produced at the sending condition setting management means 404 are input. The first packetization means 701 produces first packets by performing a TCP/IP protocol process on the sending condition setting information and the AKE related information with a software process using a processor to produce first packets. The first packetization means 701 outputs the first packets to the first queue means 602.

The first packetization means 701 adds at least one header from RTCP, RTSP, HTTP, TCP, UDP, and IP, which are data process protocol defined by the IETF document.

To the second packetization means 702, the encryption sending data, which is sending data such as MPEG-TS encrypted by the encryption means 406, is input. The AKE related information may be input to the second packetization means 702. The AKE related information is, for example, copy control information, encryption update information, and the like.

The second packetization means 702 produces second packets by performing UDP/IP protocol process on the encryption sending data with a hardware process. The second packetization means 702 outputs the second packets to the second queue means 603.

The second packetization means 702 adds sequence number, or at least one header from RTP, UDP, HTTP, TCP, IP, which are data process protocols defined in the IETF document to the data.

As in Embodiment 2 described above, the sending queue control means 601 controls that which of the packets in the first queue means 602 and the second queue means 603 is to be output when packets are temporarily stored in both the first queue means 602 and the second queue means 603.

How the sending/receiving apparatus 401B receives a reception frame will now be described.

The frame reception means 410 receives a reception frame via the network.

The frame reception means 410 filters IP packets from the reception frame based on the MAC header.

When the IP packets is the same packets as the first packets produced at the first packetization means 701, the IP packets are input to the first packetization means 701. When the IP packets are the same packets as the second packets produced at the second packetization means 703, the IP packets are input to the second packetization means 704.

In the first packets reception means 703, a reception process of the TCP/IP protocol is performed with a software process using a processor. The packets reception information produced by the process is output to the AKE means 402 or the reception condition setting management means 408.

In the second packets reception means 704, a reception process of UDP/IP protocol is performed with a hardware process. Reception data extracted by the process is output to the decoding means 407. The decoding means 407 decodes encryption of the reception data.

Figure 9:
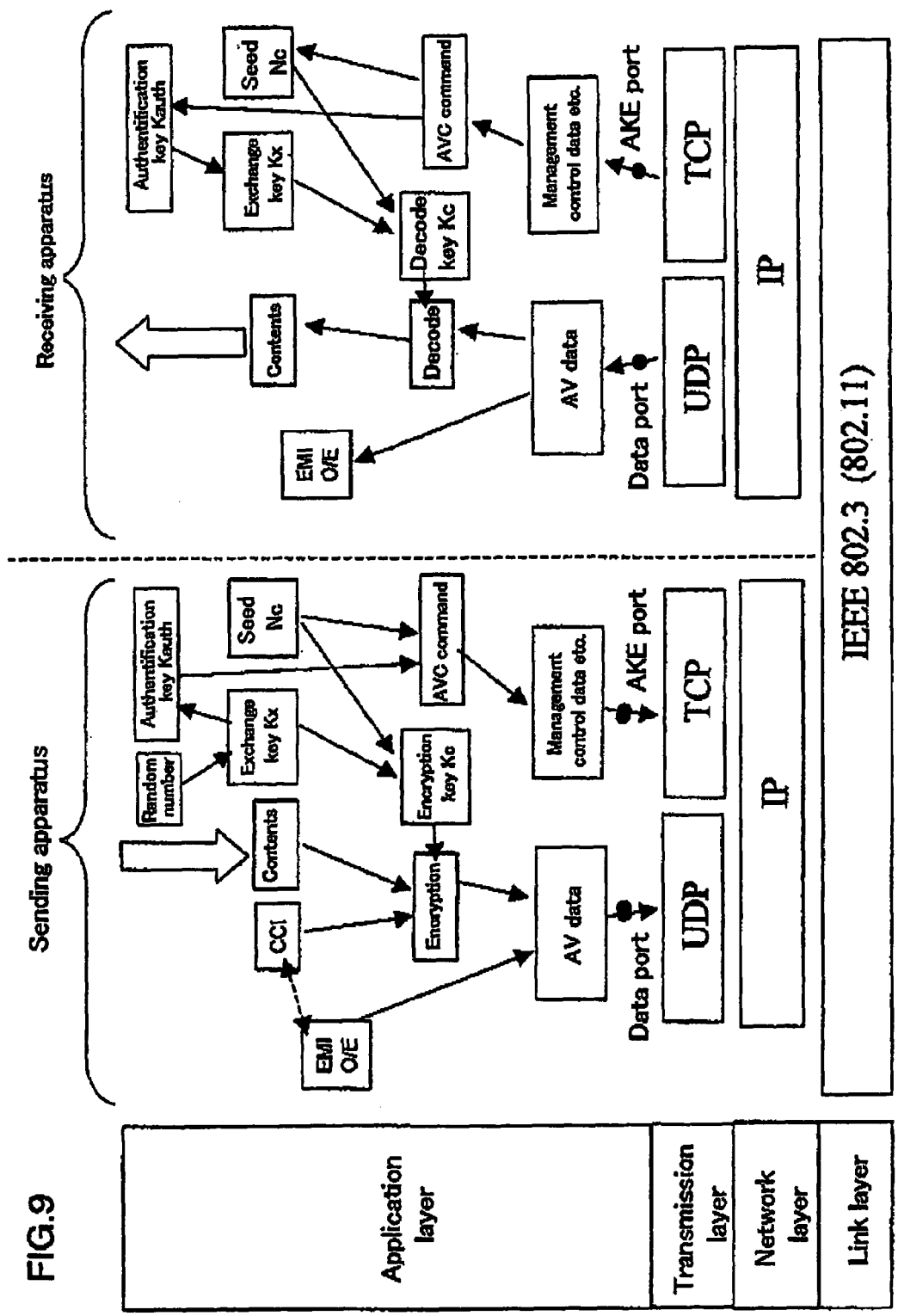
FIG. 9 is a schematic view for illustrating a protocol stack according to Embodiment 3 of the present invention.

Next, the above-mentioned procedure will be further explained in detail using a protocol stack of FIG. 9.

FIG. 9 is a schematic view for illustrating a protocol stack according to Embodiment 3 of the present invention.

The protocol stack shown in FIG. 9 has a similar structure as the protocol stack described with reference to FIG. 6 except for the point that a transmissions layer of AV data such as MPEG-TS is UDP. Thus, In the following description, the point that the transmission layer is UDP will be described.

In the sending apparatus, sending data (for example, MPEG-TS), which is contents, is encrypted using encryption key Kc to produce encryption sending data. The encryption sending data becomes a payload of UDP packets by a hardware as AV data with the above-mentioned EMI and OIE. By adding a UDP header, UDP packets are produced. Further, the UDP packets are used as a payload of the IP packets, and the IP packets are produced by adding an IP header.

The EMI and OIE may be transmitted from the sending apparatus to the receiving apparatus by, for example, producing other packets which are exclusively used. In such a case, decoding of the encryption key becomes further difficult. Eavesdropping and leakage of the contents can be made more difficult. In the public network such as Internet, it is possible to make eavesdropping and leakage of the contents can be made more difficult by changing or sending as other packets an encryption parameter of the AV data transmitted real time.

As for the management control data, similarly to example shown in FIG. 6, the TCP packets are produced by a software process and the IP packets are produced.

Ethernet™ MAC frame is transmitted from the sending apparatus to receiving apparatus over the Ethernet™. In the receiving apparatus, an encryption key is produced in accordance with a predetermined procedure. An IP packets are filtered from the received Ethernet™ MAC frame. Further, UDP packets are extracted from the IP packets. Reception data is extracted from UDP packets. Using the encryption key Kc, reception data (for example, MPEG-TS) is decoded.

In a layer for processing the reception frame which is a lower layer than a layer for processing encryption sending data and general data, preferred data and general data can be selected from communication protocol headers of the reception packets included in the reception frame, and a process for the preferred data and a process for the general data can be performed independently.

Figure 10:
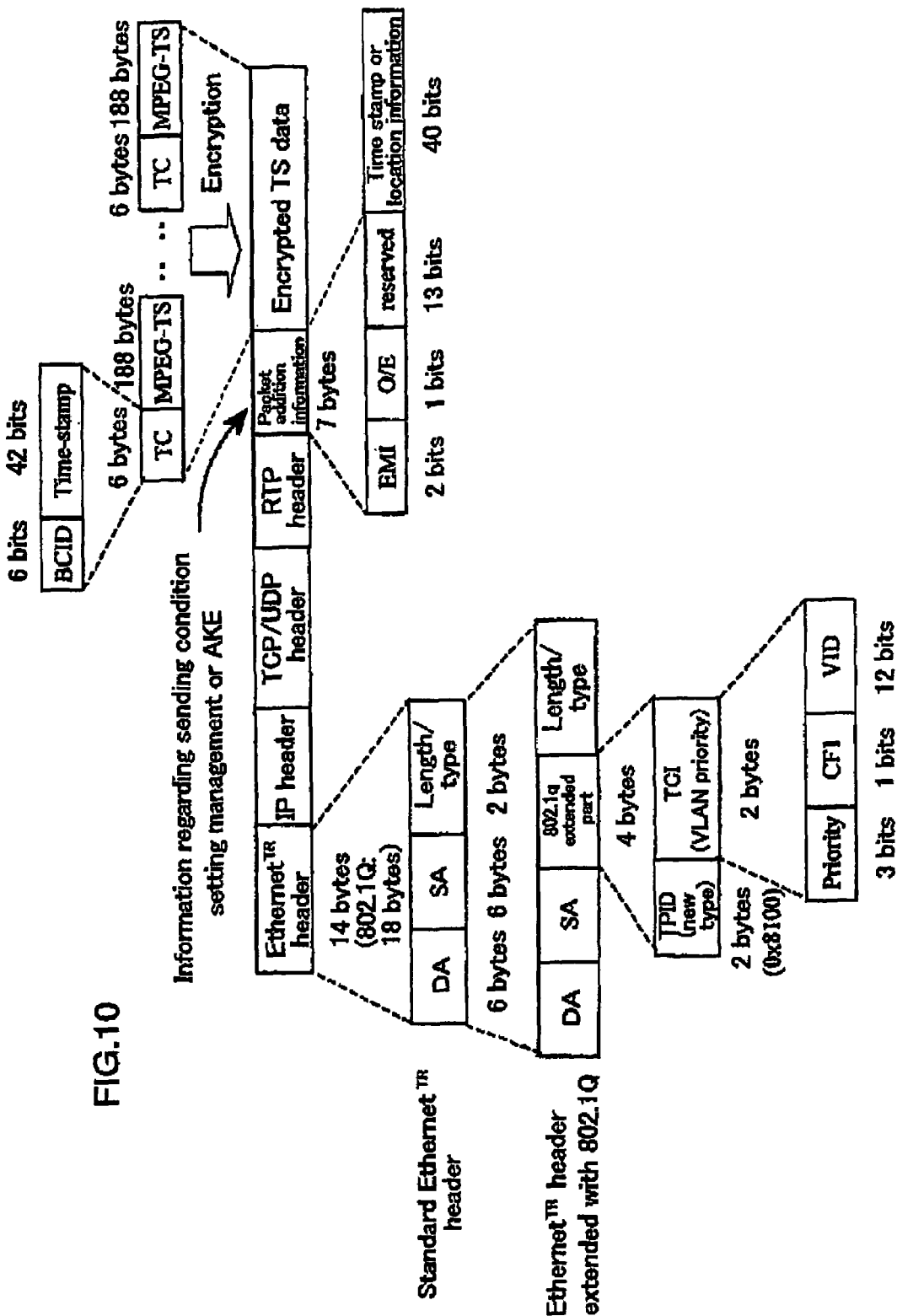
FIG. 10 is a schematic view showing an example of packets format when packets are produced using MPEG-TS, and then a frame is produced for transmission.

FIG. 10 is a schematic view showing an example of packets format when packets are produced using MPEG-TS, and a frame is produced for transmission. In this example, MPEG-TS also conforms to ISO/IBC 13818.

The MPEG-TS input as an input stream is segmented in every 188 bytes. A time code (TC) of 6 bytes may be added to MPEG=TS of 188 bytes to forma unit of 194 bytes. In this example, TC includes a time stamp of 42 bits and a basis clock ID (BCID) of 6-bits.

The BCID can represent frequency information of the time stamp.

For example:

(Case 1) When BCID is 0x00, there is no frequency information of time stamp;

(Case 2) When BCID is 0z01, the frequency information of the time stamp is 27 MHz (system clock frequency of MPE02);

(Case 3) When BCID is 0x02, the frequency information of the time stamp is 90 kHz (clock frequency used with MPEG1);

(Case 4) When BCID is 0x03, the frequency information of the time stamp is 24.576 MHz (clock frequency used with IEEE 1394); and (Case 5) When BCID is 0x04, the frequency information of the time stamp is 100 MHz (frequency used in Ethernet™).

Two units of data of 194 bytes are combined and encrypted to produce encryption data. Then, packets addition information of 2 bytes is added to the encryption data. In this way, a payload of RTP protocol is formed.

In this example, the packets addition information includes encryption mode indicator (EMI) of 2 bits, odd/even (O/E) of 1 bit, reserved data of 13 bite and a time stamp or location information of 40 bits. EMI and O/E are defined by the DTCP scheme. Instead of O/E, seed information (Nc) of DTCP may be used.

The packets addition information producing means 411 (see FIG. 4) uses the AKE related information to produce EMI and O/E.

The time stamp or the location information is produced in the packets addition information producing means 411 (see FIG. 4) using sending condition 'setting information, and is located following the reserved data. The time stamp or the location information may also be located between the O/E and the reserved data.

The location information is information with an area specified by a region code, address, postal code, or longitude and latitude.

In this example, the packets addition information is 7 bytes. However, the packets addition information is not limited to 7 bytes.

The packets addition information may not include the time stamp or the location information. In such a case, the packets addition information becomes 2 bytes.

When the packets addition information of 7 bytes is added to the encryption data, the payload of the RTP protocol is formed. When a RTP header is added as a header, the RTP protocol is formed.

The RTP protocol is a payload of TCP packets or UDP packets. When a TCP header or a UDP header is added, the TCP packets or the UDP packets are formed.

The TCP packet or the UDP packet is a payload of an IP packet. When an IP header is added as a header, the ID packet is produced.

Furthermore, the IP packets are a payload of a MAC frame. When an Ethernet header is added as a header, Ethernet packets are produced.

As the Ethernet™ header, both a standard Ethernet™ header and a Ethernet™ header extended with IEEE 802.1Q (VDAN) are applicable as shown in FIG. 10.

A standard Ethernet header is 14 bytes, and includes destination address (DA) of 6 bytes, source address (SA) of 6 bytes, and information indicating length/type of 2 bytes.

An Ethernet header extended with 802.1Q is 18 bytes. The Ethernet header extended with 802.1Q is different from a standard Ethernet header on the point that 802.1Q extended part of 4 bytes is provided between the SA and the information indicating the length/type.

The 802.1Q extended part includes tag control ID (TPID) of 2 bytes and tag control information (TCI) of 2 bytes which indicates VLAN priority.

TCI includes priority (user priority) of 3 bits, canonical format indicator (CFI) of 1 bit and VLAN Identifier (VID) of 12 bits.

How to use priority is defined by ISO/IEC 15802-3. With a flag of the priority, priority of the Ethernet™ frame can be set.

In this way, sending data (for example, MPEG-TS) is encrypted between the sending apparatus and the receiving apparatus and real-time transmission becomes possible. Further, since the second packetization means is formed with a hardware, essentially, there is no un-sent sending packets or un-received reception packets due to a software process. Thus, all the preferred data packets are completely sent, and transmission of high-quality image with a secured real-time property becomes possible.

Further, general data is temporarily stored in a buffer and intermittently transmitted while the preferred data is being transmitted preferentially. The first packetization means 701 may be formed of a reasonable processor such as microcomputers.

Further, with a hardware process, an Ethernet™ can be received and the IP header of the third layer and the UDP header of the fourth layer can be checked at the same time in a reception process.

Packets of contents data (for example, MPEG-TS), which are preferred data, and packets of general data are separated, and a process of the packets of the contents data is performed with a hardware. Thus, there is no un-received reception frame and a high-quality reception with a real time property secured can be performed.

By controlling the timing for sending packets, or percentage of sending packets from two queue means by a hardware instead of a software, it becomes possible to completely control sending in a clock unit. In this way, all the preferred packets can be completely sent and a high-quality transmission with a real-tame property secured becomes possible. Since shaping of the output packets is accurately performed in a clock unit, a high-quality communication with a very small percentage of packets dropping at a router in a first stage or a switching hub.

(Embodiment 4)

Figure 11:
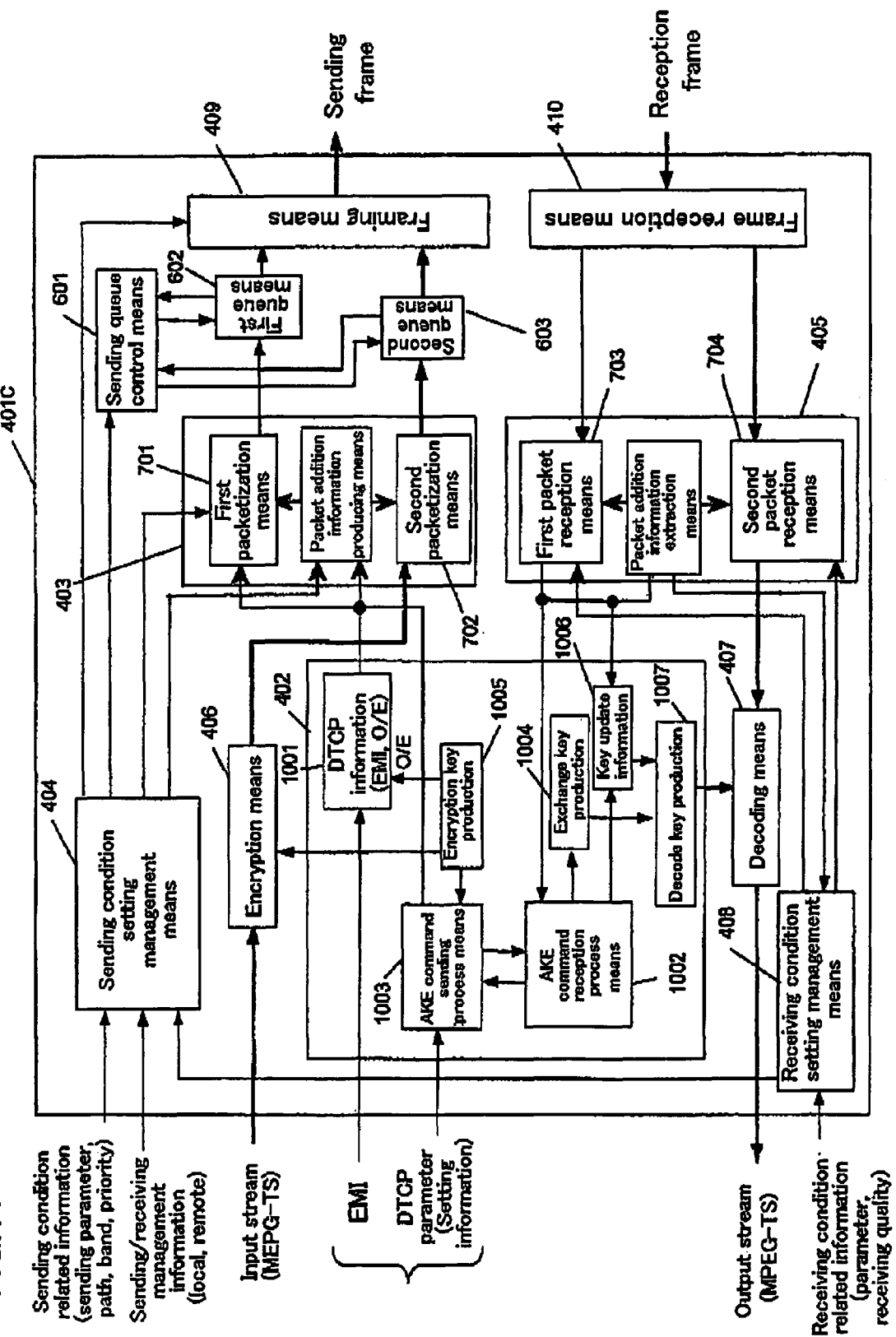
FIG. 11 is a block diagram of a packets sending/receiving apparatus according to Embodiment 4 of the present invention.

FIG. 11 is a block diagram of a packets sending/receiving apparatus 401C according to Embodiment 4 of the present invention.

The packets sending/receiving apparatus 401C has a similar structure as the packets sending/receiving apparatus 401B described with reference to FIG. 8 in Embodiment 4 except for the point that AKE means 402 includes DTCP information production means 1001, AKE command reception process means 1002, AKE command sending process means 1003, exchange key production means 1004, encryption key production means 1005, encryption key change information production means 1006, and decoding key production means 1007. Therefore, in the following description, the DTCP; information production means 1001, the AKE command reception process means 1002, the AKE command sending process means 1003, the exchange key production means 1004, the encryption key production means 1005, the encryption key change information production means 1006, and the decoding key production means 1007 are mainly described.

In the packets sending/receiving apparatus 401C, encryption sending data is sent with the DTCP scheme in accordance with the following steps. In this embodiment, functions of both the source for sending packets and the sink for receiving packets are described with reference to packets sending/receiving apparatus 401C. Please note that this is for the sake of simplicity of the description, and packets are sent and receiving in two different packets sending/receiving apparatuses actually.

(Step 1) Copy protection information representing an encryption state of encryption sending data during transmission is input to the DTCP information production means 1001 as authentification and key exchange related information.

(Step 2) First, a request for sending data is generated in the sending apparatus (source). The data protection mode information (EMI) information is output from the DTCP information production means 1001 to the first packetization means 701. Sending packets are produced and the sending packets are sent from the sending apparatus.

(Step 3) The sending packets sent from the sending apparatus is received as reception packets in the receiving apparatus (sink). The AKE command reception process means 1002 analyzes copy protection information of the data received from the first packets reception means 703, and determines which of the authentification scheme, complete authentification or limited authentification, is to be used. Then, the AKE command reception process means 1002 sends an authentification request through the AKE command sending process means 1003.

(Step 4) A predetermined process of the DTCP scheme is performed between the receiving apparatus and the sending apparatus is performed, and an authentification key is shared.

(Step 5) Next, the sending apparatus sends an encryption exchange key produced by encrypting an exchange key using the authentification key in the AKE command sending process means 1003 via the first packetization means 701. In the receiving apparatus, an encryption exchange key is extracted by the AKE command reception process means 1002 and decoded to an exchange key in the exchange key production means 1004.

(Step 6) In the sending apparatus, seed information (O/E) which changes over time is produced in the encryption key production means 1005 for changing an encryption key over time. The seed information is tent to the receiving apparatus via the DTCP information production means 1001 and the first packetization means 701.

(Step 7) In the sending apparatus, an encryption key is produced using the exchange key and the seed information in the encryption key production means 1005. The encryption means 406 encrypts sending data (for example, MPEG-TS) using the encryption key and produces encryption sending data. The encryption means 406 outputs the encryption sending data to the second packetization means 702.

(Step 8) In the receiving apparatus, the encryption key change information production means 1006 receives seed information from the first packets reception means 703. The decoding key production means 1007 uses the seed information and the exchange key of the exchange key production means 1004 to produce an encryption key (decoding key).

(Step 9) In the receiving apparatus, the encryption key (decoding key) is used to decode the encrypted data in the decoding means 407.

Figure 12:
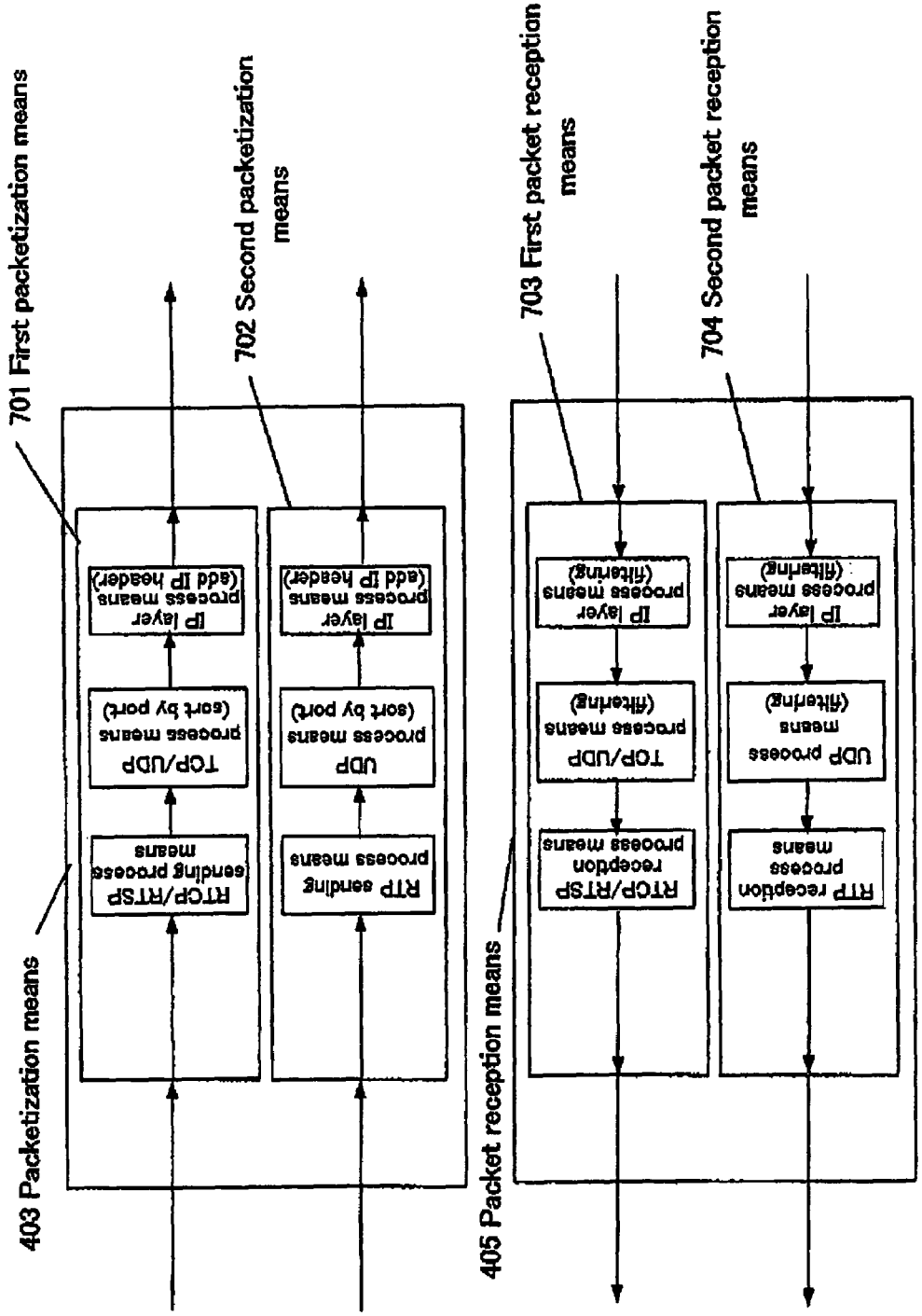
FIG. 12 its a block diagram for illustrating packetization means and packets reception means according Embodiment 4 of the present invention.

Figure 12 is a block diagram far illustrating packets processes in the first packetization means 701 and the second packetization means 702 included in the packetization means 403, and the first packets reception means 703 and the second packets reception means 704 included in the packets reception means 405.

In the first packetization means 701, processes for forming the input data to an RTCP or RTSP protocol, a TCP or UDP protocol, and an IP protocol is sequentially performed.

Further, when RTCP protocol (RFC1889) is used, communication sate of the network such as effective bandwidth and delay time of the network is sent from the receiving apparatus to the sending apparatus. The sending apparatus can adjust the quality of the data to be transmitted with RTP in accordance with the communication state of the network over which it has been sent and send the data.

The RTSP protocol (RFC2326) can send the control command such as reproduction, stop, forward and the like. It is also possible to reproduce data with the data being downloaded from an AV file.

In the second packetization means 702, processes for forming the input data into the RTP protocol, UDP protocol, and the IP protocol are sequentially formed to produce IP packets.

In the first packets reception means 703, a reception process of the IP protocol, a reception process of the TCP or UDP protocol, and a reception process of the RTCP or RTSP protocol such as filtering are sequentially performed. Thus, reception data included in the reception packets is extracted.

Further, in the second packets reception means 704, a reception process of the IP protocol, a reception process of the UDP protocol, and a reception proves s of the RTP protocol such as filtering are sequentially performed to extract a reception data included in the reception packets.

In this way, data (for example, MPEGTS) is encrypted based on the DTCP scheme between the sending apparatus and the receiving apparatus and real-time transmission becomes possible. Further, since the second packetization means is formed with a hardware, essentially, there is no un-sent sending packets or un-received reception packets due to a software process. The first packetization means with a small data amount may be formed of a reasonable processor such as microcomputers.

Even when authentification between the receiving apparatus and the receiving apparatus cannot be secured because any of the predetermined conditions is not matched due to some reason, a least one of certificate which the sending apparatus or the receiving apparatus has previously stored, information such as MAC address and biometric information for specifying an individual such as fingerprint, iris and the like may be used for performing authentification between the sending apparatus and the receiving apparatus.

Again, with reference to FIG. 11, in the case where authentification is performed between the packets sending/receiving apparatus 401C, and destination of the sending packets or the sending source of the reception packets, the AKE command reception process means 1002 of the authentification and key exchange means 402 may function as verify means for verifying the information stored in the storage means and information regarding destination of the sending packets or information regarding sending address of the reception packets when the authentification is not secured since the storage means for temporarily stores information regarding the destination of the sending packets or the sending source of the reception packets, the packets sending/receiving apparatus, and the destination of the sending packets and the sending source of the reception packets do not match the predetermined conditions.

In this way, two equipment authentificated one another within a household can be specifically authentificated between remote places. Thus, transmission of data contents and remote transmission of data contents between the household and a remote place such as travel destination become possible.

(Embodiment 5)

Figure 13:
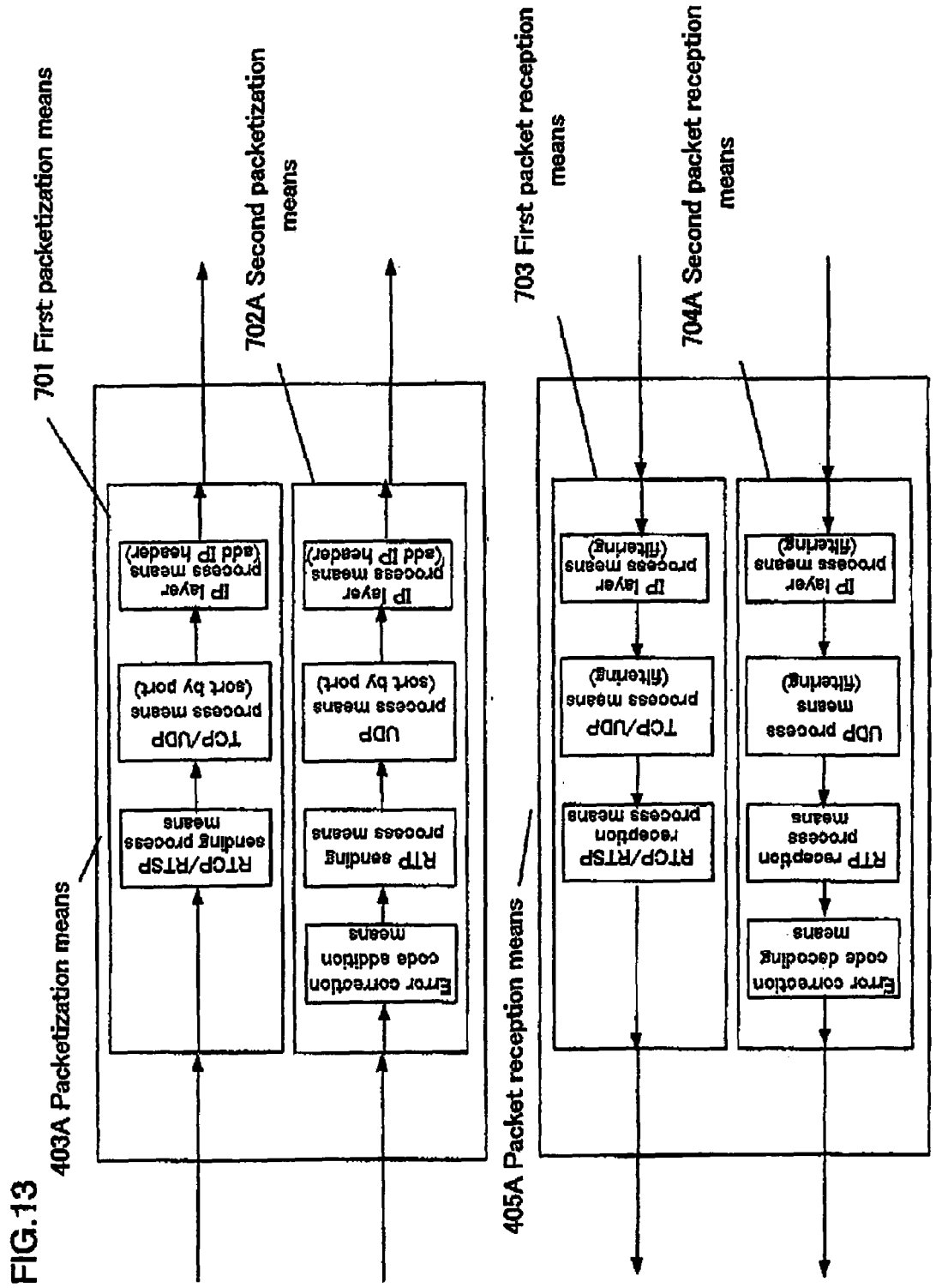
FIG. 13 is a block diagram for illustrating packetization means and packets reception means according Embodiment 5 of the present invention.

FIG. 13 is a block diagram for illustrating packets processes in the first packetization means 701 and the second packetization means 702 included in the packetization means 403A, and the first packets reception means 703 and the second packets reception means 704A included in the packets reception means 405A.

The packetization means 403A and the packets reception means 405A have similar structures as the packetization means 403 and the packets reception means 405 described with reference to FIG. 12 on the point that the second packetization means 702 and the second packets reception means 704A are different. Therefore, in the following description, the second packetization means 702A and the packets reception means 405 will be mainly described.

The second packetization means 702A performs error correction process on the data to be input and sequentially processes so as to form RTP protocol, UDP protocol, and IP protocol to produce IP packets.

The second packets reception means 704A sequentially performs a reception process of IP protocol, reception process of UDP protocol, and reception process of RTP protocol such as filtering, and further, an error correction code process. Thus, error-corrected data is output.

Figure 14:
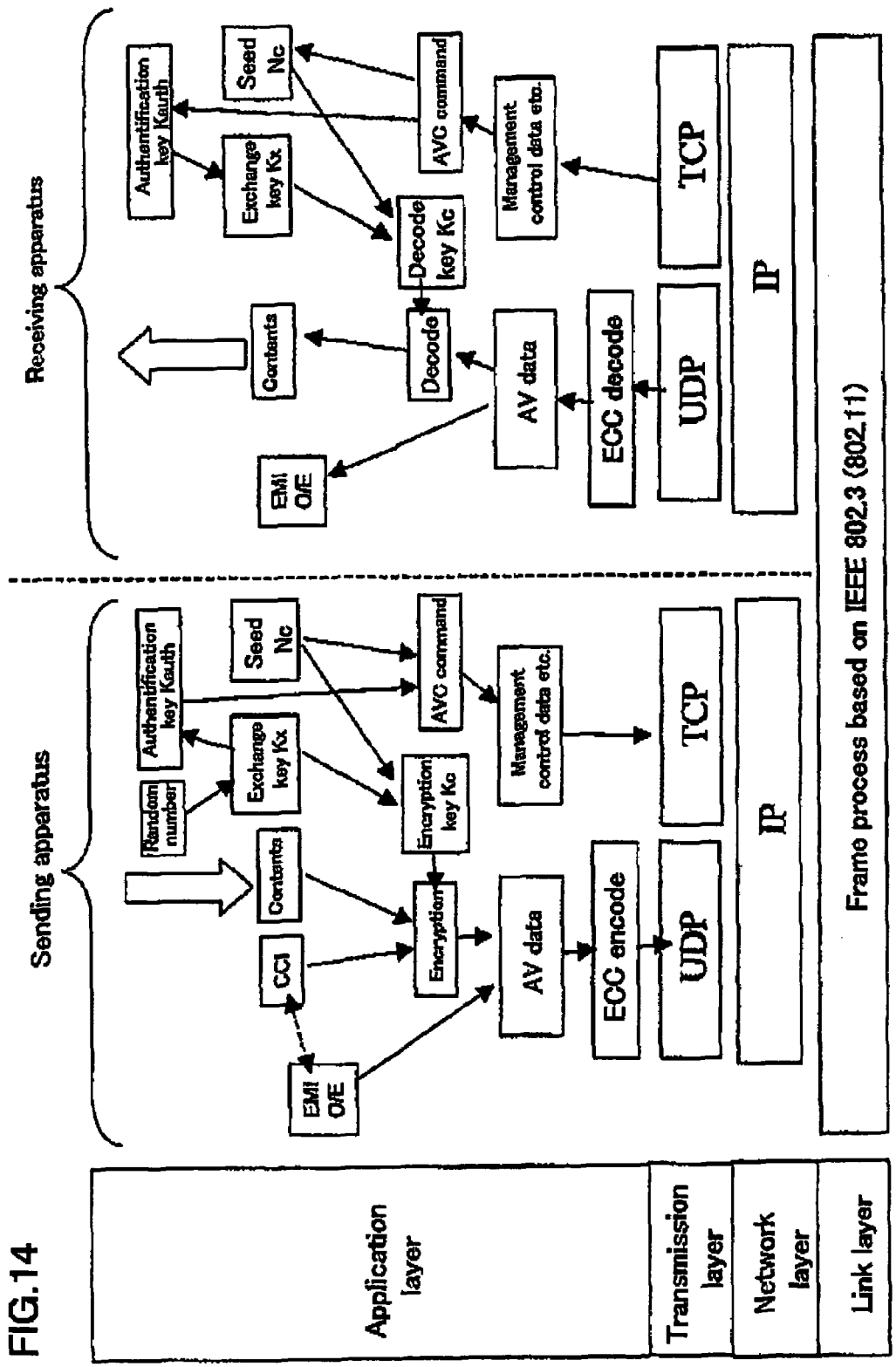
FIG. 14 is a schematic view for illustrating a protocol stack according to Embodiment 5.

FIG. 14 is a schematic view for illustrating a protocol stack according to Embodiment 5.

In the sending apparatus, an error correction coda is added to AV data (ECC encode), and passed to the UDP protocol. In the receiving apparatus, data is received and error-corrected with the UDP protocol process and becomes AV data for upper layers.

Examples of error correction schemes will be described with-reference to FIGS. 15 and 16.

Figure 15:
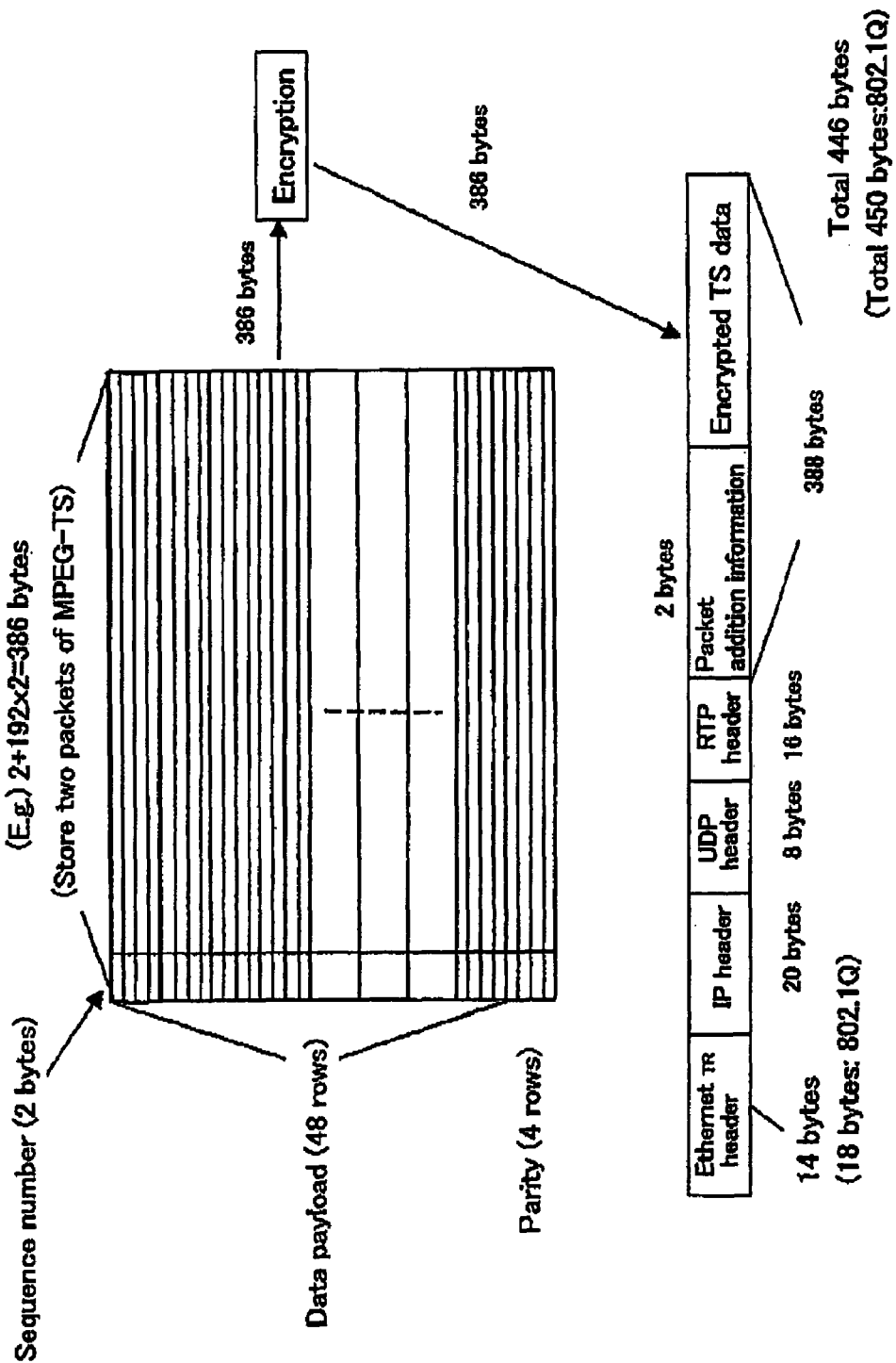
FIG. 15 is a schematic view for illustrating an example where the error correction scheme is a Reed-Solomon scheme.

FIG. 15 is a schematic view for illustrating an example where the error correction scheme is a Reed-Solomon scheme.

Figure 16:
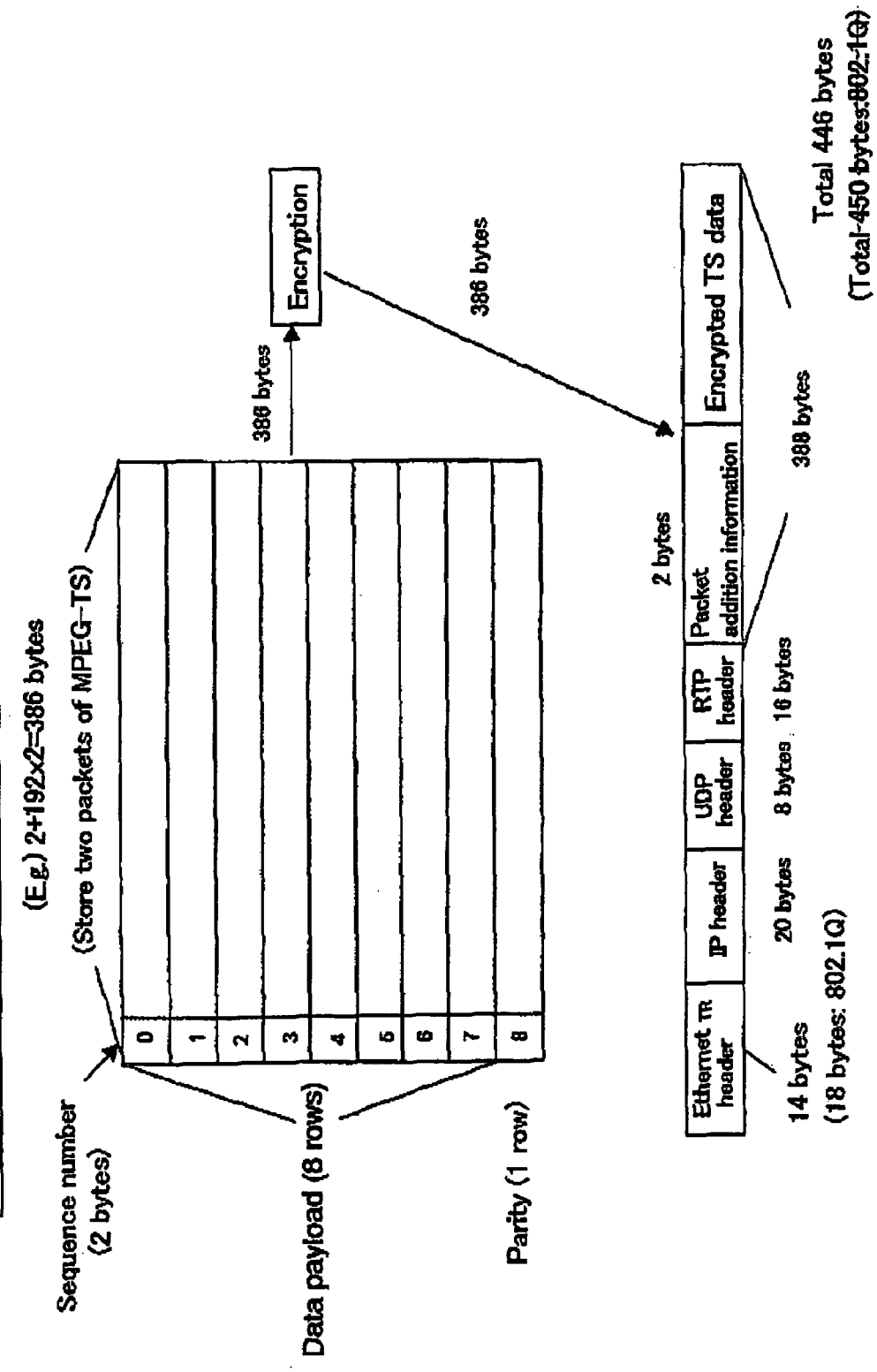
FIG. 16 is a schematic view for illustrating an example where the error correction scheme is a parity scheme.

FIG. 16 is a schematic view for illustrating an example where the error correction scheme is a parity scheme.

In these examples, data (MPEG-TS) of two units is input to an error correction interleave matrix. 2 bytes of the sequence number are used for each row.

Then, packets addition information of two bytes, for example, is used and the RTP header, UDP header, IP header, Ethernet™ header are further added to produce an Ethernet™ frame.

In this way, data (for example, MEPG-TS) can be encrypted based on the DTCP scheme between the receiving apparatus and the sending apparatus and an error correction code is added, and can be transmitted in a real-time manner. Further, since the second packetization means is formed with a hardware, essentially, there is no un-sent sending packets or un-received reception packets due to a software process. The first packetization means with a small data amount may be formed of a reasonable processor such as microcomputers.

(Embodiment 6)

Figure 17:
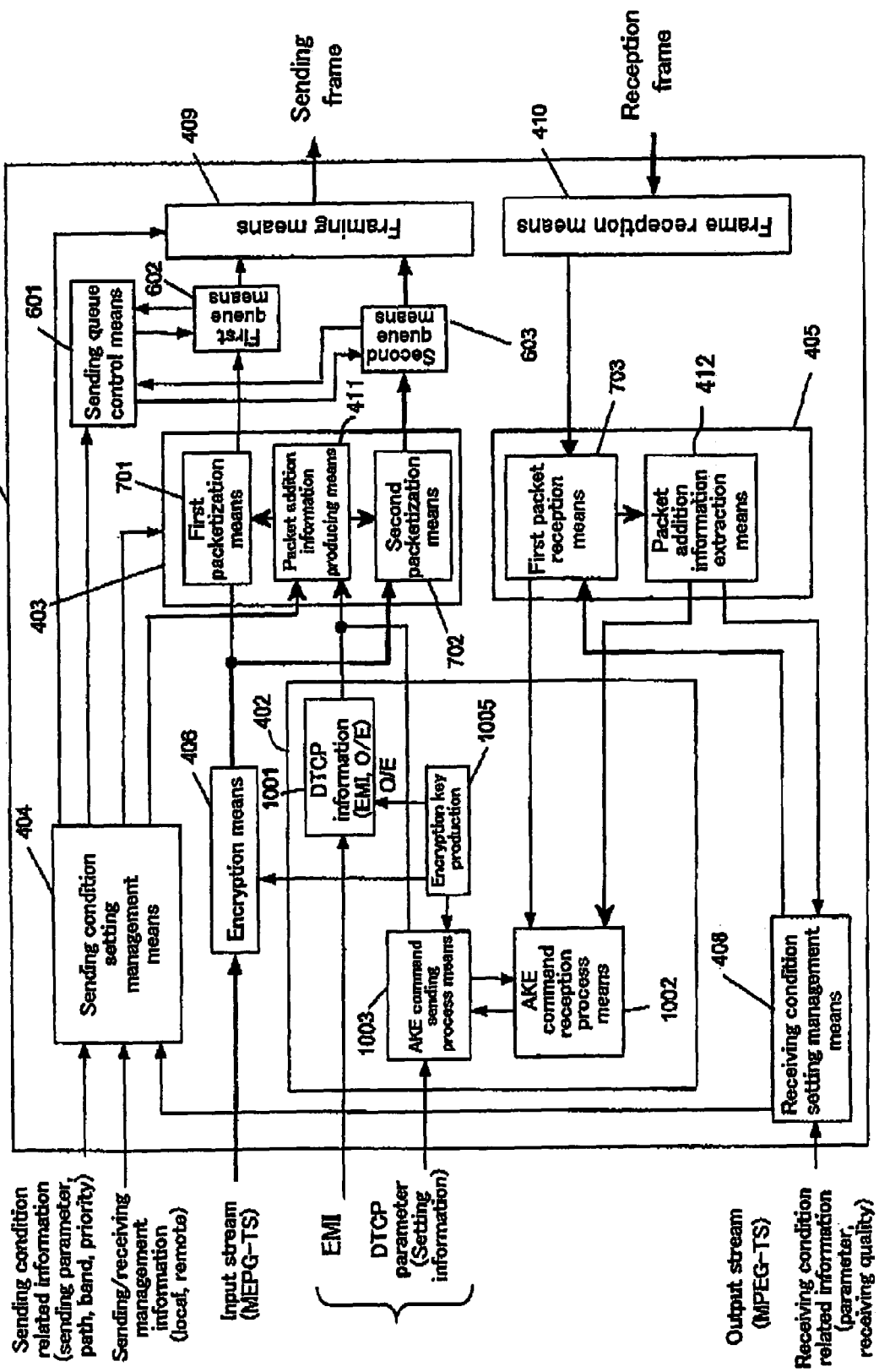
FIG. 17 is a block diagram of a packets sending/receiving apparatus according to Embodiment 6.

FIG. 17 is a block diagram of a packets sending/receiving apparatus 401D according to Embodiment 6.

The packets sending/receiving apparatus 401 D has a similar structure as the packet a sending/receiving apparatus 401C described with reference to FIG. 11 except for the point that a receiving function of the reception data (for example, AV data such as MPEG-TS) is omitted.

Figure 18:
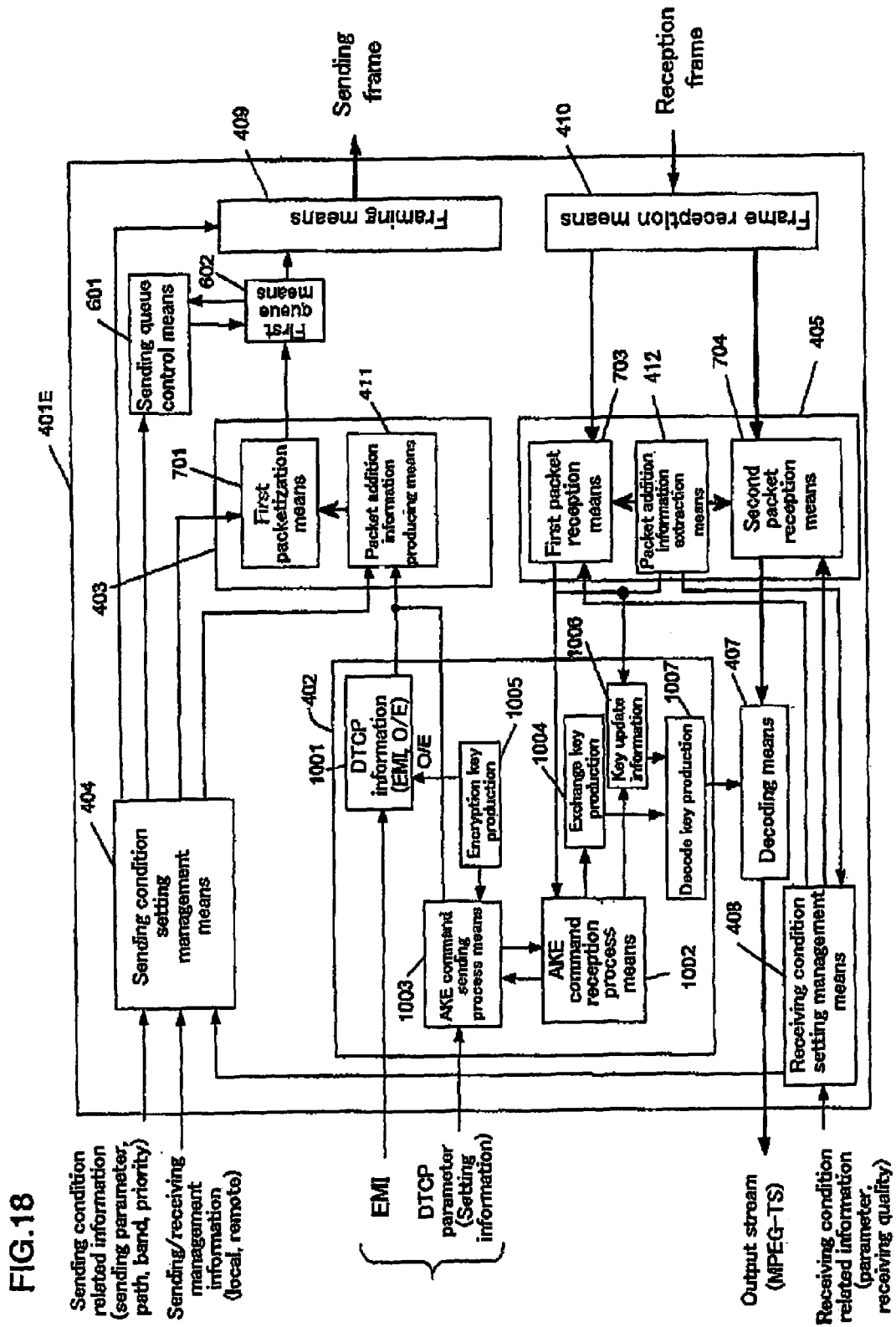
FIG. 18 is a block diagram of a packets sending/receiving apparatus according to another example of Embodiment 6 of the present invention.

FIG. 18 is a block diagram of a packets sending/receiving apparatus 401E according to another example of Embodiment 6 of the present invention.

The packets sending/receiving apparatus 401E has a similar structure as the packets sending/receiving apparatus 401C described with reference to FIG. 11 except for the point that a sending function of the sending data (for example, AV data such as MPEG TS) is omitted.

Omitting the receiving function or the sending function of data as such can be applied to all the packets sending/receiving apparatuses described in Embodiments 1 through. Further, the present invention can also be applied to equipment which performs only sending or reception. Thus, it is possible to try to reduce the cost.

In the above-described Embodiments 1 through 6, when packets are transmitted over a communication network where the order of the packets are not secured, such as, a general IP network, packets with the sequence number added may be sent and the order may be secured using the sequence number added to the packets in the receiving apparatus. The order can be secured at the fourth layer or higher of OSI model, in other words, with RTP protocol or video signal process.

The packets of the AV data which is subjected to a hardware process and transmitted can be prevented from being fragmented in the network. Specifically, in the sending apparatus, the maximum size (MTU) not fragmented in the communication network is previously checked and the packets are transmitted with the packet size equal to or smaller than the maximum size.

More specifically, the sending condition setting management means 404 and the receiving condition setting management means 408 detects the maximum transmission packet size in a path from the sending destination of the sending packet to the reception destination between sending and the arrival of the sending frame. The maximum transmission packet size information is used to produce sending condition setting information or receiving condition setting management means.

Alternatively, in the standard of RFC, it is defined all the terminals should be capable of handling IP packets of the size of 576 bytes. Thus, in most of network equipments such as a router, fragmentation does not occur on the IP packets having the size equal to or smaller than this. Thus, it is enough if the packet size of the AV data to be subjected to a hardware process in the sending apparatus is adjusted. When fragmentation does not occur in packets of AV data to be subjected to a hardware process in the sending apparatus, if the received packets are fragmented, they can be all processed as general packets. When the size exceeds the maximum value of the IP packet of Ethernet™, fragmenting in the sending apparatus is required. Accordingly, it is needless to say that the seize should be equal to or smaller than the maximum size of the IP packet in order to prevent the preferred packets from being fragmented.

When the percentage of fragmenting in the communication network is very small, a flag of fragmenting prohibition is added to IP header of the packets of the AV data subjected to a hardware process in the sending apparatus and transmitted and is sent. In this way, IP packet may be dropped in the situation where the router should fragment to alleviate a load of fragmenting process of the receiving apparatus. In this case, very small, number of packets is lost, but communication quality can be compensated by performing error correction or error retouch in the receiving apparatus.

Further, in Embodiments 1 through 6, Ethernet™ is explained as a specific example of communication protocols. However, the present invention is not limited to this.

Moreover, MPEG-TS is used as an example of video signal process in Embodiments 1 through 6. However, the present invention is not limited to this. As the input stream of the present invention, any stream regarding video and audio including MPEG-TS stream (ISO/IEC 13818) such as MPEG1/2/4, and streams standardized by DV (IEC 61834, IEC 61883), DV (IEC 61834, IEC 61883), SMPTE 314M (DV-based), SMPTE 259M (SMI), SMPTE 305M (SDTI), SMPTE 292M (HD-SDI) and the like are applicable.

The data rate of the video and audio is not limited to constant bit rate (CBR). It may be VBR. Furthermore, not only video and audio but general real time data, and any data as long as sent/received preferentially should not be omitted from the present invention.

The data to be used in the present invention may be a file. When the data is a file, it is also possible to transmit data more rapidly than real time under certain conditions based on the relationship between propagation delay time between the sending apparatus and the receiving apparatus, and a processing property of the sending apparatus and the receiving apparatus.

Further, a contents transmission scheme which is generally called streaming in the field of the Internet can also be realized. In contents transmission of the streaming scheme, contents data is transmitted with TCP/IP or UDP/IP from the sending apparatus to the buffer of the receiving apparatus via the network and the contents data is read out at a relatively constant rate from the buffer of the receiving apparatus, continuous data is reproduced in the receiving apparatus.

Further, the present invention is also applicable to GXF file format (SMPTE 360M) standardized by SMPTE (www.smpte.org) and encryption transmission of a file which conforms to a MXF file format which has been promoted to be standardized.

(Embodiment 7)

Hereinafter, Embodiment 7 will be described.

Figure 19:
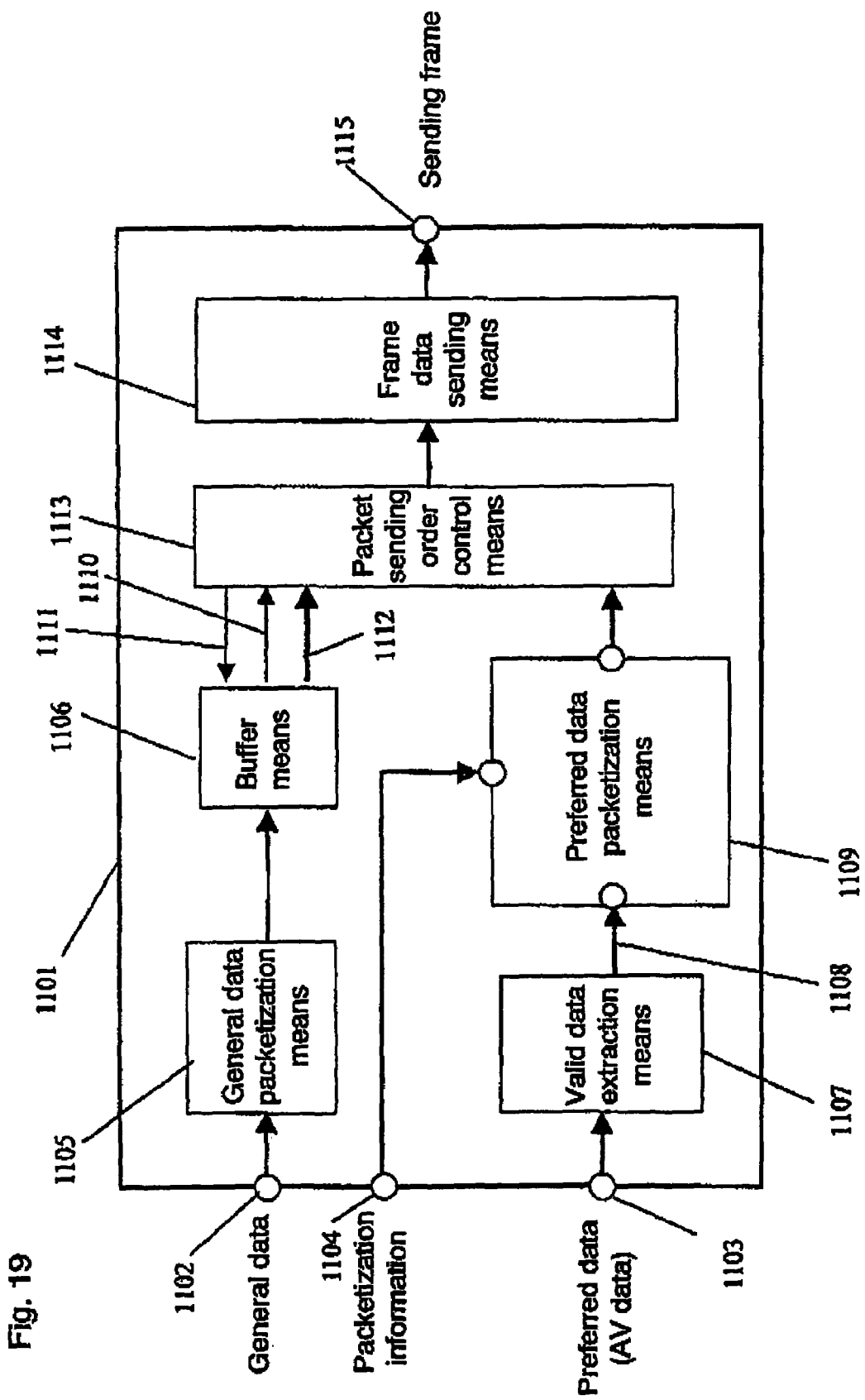
FIG. 19 is a block diagram of a packets sending means according to Embodiment 7 of the present invention.

FIG. 19 is a block diagram of a packets sending means 1101 according to Embodiment 7 of the present invention.

In this example, the packets sending means 1101 corresponds to the packetization means 403 and the framing means 409 described with reference to FIG. 4.

The packets sending means 1101 includes general data input means 1102, packetization information input means 1104, general data packetization means 1105, buffer means 1106, valid data extraction means 1107, preferred data packetization means 1109, packets sending order control means 1113, and a frame data sending means 1114.

In the packets sending means 1101, preferred data is input from priority data input means 1103 to the valid data extraction means 1107. The valid data extraction means 1107 removes invalid data component from the input preferred data and extracts a valid payload, and inputs valid data 1108 to the preferred data packetization means 1109.

The preferred data packetization means 1109 corresponds to the second packetization means 702 of the packets sending/receiving apparatus 401B described with reference to FIG. 8.

The packets sending order control means 1113 corresponds to sending queue means 601 of the packets sending/receiving apparatus 401B described with reference to FIG. 8.

The process in the valid data extraction means 1107 includes buffering of data, data bit number conversion, clock frequency conversion and the like.

Specifically, the preferred data stream may be SDTI stream of SMPTE321 M standard, or the valid data may be DIF data of SMPTE314M standard.

Alternatively, the preferred data stream may be a DVB-ASI stream of A10M standard, or the valid data may be MPEG-TS packets of MPEG standard.

The preferred data packetization means 1109 produces a preferred data packets using packetization information and the valid data 1108.

Figure 20:
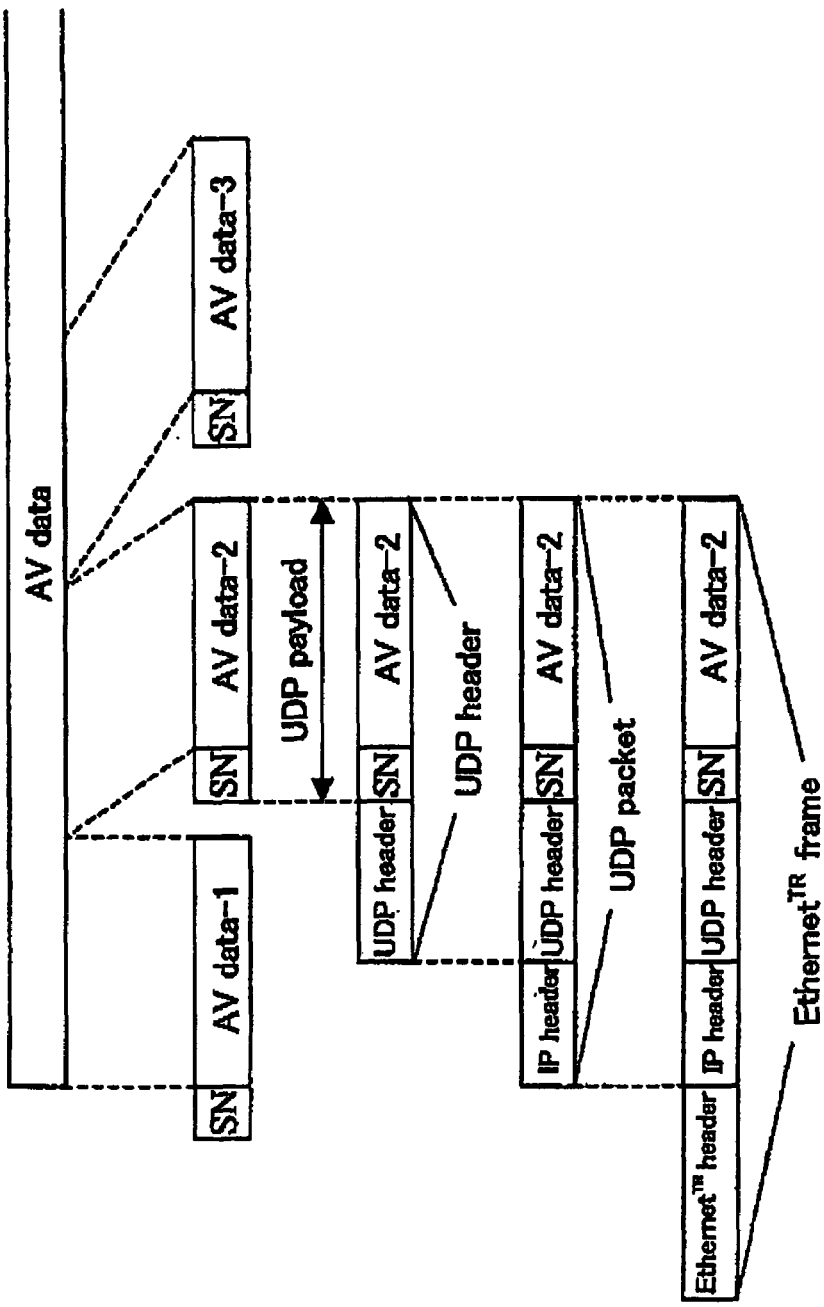
FIG. 20 is a schematic view for illustrating a protocol stack of preferred data packets.

FIG. 20 is a schematic view for illustrating a protocol stack of the preferred data packets.

The AV data shown FIG. 20 is preferred data to be input from the preferred data input means 1103 in the present embodiment.

As shown in FIG. 20, by processing AV data, an Ethernet™ is produced.

On the other hand, general data is input to the general data input means 1102. In general, the general data is data which does not have to be sent in real time. The general data packetization means 1105 generates general data packets using the general data and outputs general data packets. The general data input means 1102 functions as an interface of data.

The general data packetization means 1105 corresponds to the first packetization means 701 of the packets sending/receiving apparatus 401B described with reference to FIG. 8.

Examples of the general data include information regarding operation control of the equipment described above, and management information of SNMP, MIB, and the like. These are transmitted using TCP/IP or UDP/IP.

The general data packets output from the general data packetization means 1105 is input to the buffer means 1106. The buffer means 1106 temporarily stores the general data packets. When the general data packets are stored in the buffer means 1106, the buffer means 1106 notifies (asserts) the packets sending order control means 1113 of a sending request signal 1110.

In general, for stream transmission of contents data such as video data in real time, video data has to be processed preferentially over a data which does not require a real time property.

The packets sending order control means 1113 permits sending of the general data packets 1112 within the range which does not impair the real-time property of the preferred data packets when the sending request signal 1110 is asserted while it gives the priority to sending of the preferred data packets. Sending permission permits sending of the general data packets from the buffer means 1106 by asserting a sending permission signal 1111 to the buffer means 1106.

The frame data sending means 1114 uses sending packets input from the packets sending order control means 1113 to produces an Ethernet™ frame and send as a sending frame to the network.

Figure 21:
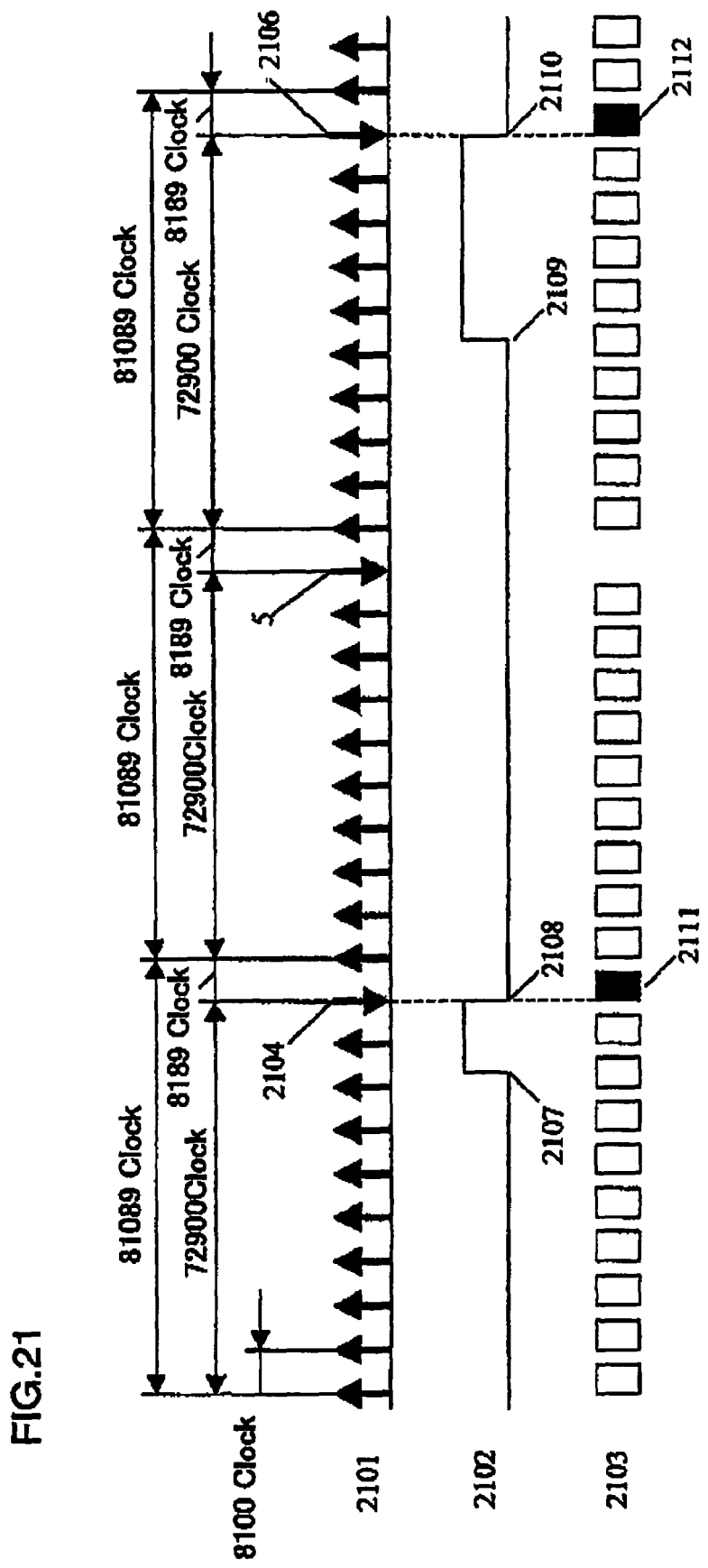
FIG. 21 is a schematic view for illustrating a sending timing chart of preferred data packets and a general data packets.

FIG. 21 is a schematic view for illustrating a sending timing chart in the present embodiment. The scheme shown in the timing chart is a sending control scheme of the preferred data packets and the non-preferred data packets (general data packets), which is a key point of the present embodiment.

In FIG. 21, sending start timing 2101 of the sending packets 2103, a pulse waveform 2102 of the sending request signal 1110, and the sending packets 2103 are shown so as to correspond each other in a time-wise manner.

In the sending start timing 2101, upward arrows indicate timings for sending the sending frames including the preferred data packets, and downward arrows indicate timings in which sending frames including non-preferred data packets can be sent.

Further, the sending packets 2103 show the preferred data packets with blank rectangles and show the non-preferred data packets with solid rectangles.

In the present embodiment, the case where the preferred data as follows is sent will be described as an example. When the preferred data is DVCPR025 (defined by SMPTE314M), data of 120,000 bytes is generated within a period of 1 frame in NTSC mode. Thus, the data rate is a constant rate (CBR) of about 57.6 megabits/second (about 57.6 Mbps). In this example, video payload length of the AV data is 1200 bytes and the system clock is 27 MHz.

The percentage of the packets generation of the AV data which is preferred data is 2997 packets/second (120,000/1,200=100 packets/frame).

Thus, only when the preferred data packets are transmitted, it is enough if a packet is sent every 9009.9 clock (27000000/2997). In other words, 9009.9 clock is average sending interval.

According to the present embodiment, by sending the preferred data packets in an interval shorter than the average sending interval, a timing margin for sending non-preferred data packets (sending margin period) is generated.

Specifically, the sending interval of the preferred data packets is made to be 8100 clock, and a sending margin period in which sending of non-preferred data packets can be permitted is generated for every nine preferred data packets. When nine preferred packets are sent in 9009.9 clock, 81089.1 clock (9009.9*9) are required. In this example, the average value is considered in order to simplify the discussion. However, the value after the decimal points is also used.

In the present embodiment, the packets are sent in an interval of 8100 clock shorter than 9009.9 clock. Actually, 72900 clock (8100*9) is required.

Therefore, sending margin period for sending non-preferred data packets is 8189.1 clock (81089.1−72900).

At the sending start timing 2001, an interval from an upward arrow indicating timing for sending preferred data packets to a next arrow is 8100 clock. A timing for sending non-preferred packets appears in every nine preferred packets timing (2104, 2105, 2106). An interval between a downward arrow indicating a timing for sending non-preferred packets and next arrow is 8189 clock.

As shown by the pulse waveform 2102, the sending request'signal 1110 asserts the sending request'signal when general data to be sent is stored in the buffer means. In FIG. 21, the pulse waveform becomes High.

In the pulse waveform 2102, the sending request signal becomes high at timing 2107. Next, in the sending start timing 2101, the sending permission signal 1111 is asserted at timing it becomes a timing at which the general data packets can be sent (timing 2108) (not shown in FIG. 21), and general data packets 2111 are sent. The sending request signal 1110 is de-asserted at the timing when sending the general data packets is started (timing 2108 of the pulse waveform 2102).

At the timing 2105, since the sending request signal 1110 is not asserted, general data packets to be sent does not exist in the buffer means 106 and the general data packets are not sent at the timing 2105.

Next, the pulse waveform 2102 of the sending request signal 1110 is asserted again at timing 2109 and general data packets 2112 are sent at timing 2110. The sending request signal 1110 is de-asserted after sending the general data packets 2112 is started (timing 2110 of the pulse waveform 2102).

When a plurality of general data packets are stored in the buffer means 1106, even though general data packets are sent, the sending request signal 1110 is not asserted and the remaining general data packets are sent one by one at the next timing when the general data packets can be sent. In this way, the preferred data packets are sent preferentially.

The sending packets are output from the packets sending order control means 1113 to the frame data sending means 1114 as described above. The frame data sending means 1114 uses the input reception packets to produce an Ethernet™ frame which can be an interface with a physical layer and transfers as a sending frame. In Ethernet™ of 10 Mbps and 100 Mbps, MII standard interface is defined. In a gigabit Ethernet™, GMII standard interface is defined.

In the present embodiment, time for allocating sending control of preferred data packets and general data packets to the respective packets in a clock unit is determined. However, the present invention is not limited to this. In the present invention, for example, a certain amount of preferred data packets may be stored in the buffer of the preferred data packetization means 1109 and preferentially sent in the packets sending order control means 1113 in a shorter time interval compared to that for an average packets production amount of the preferred data packets, and sending may be allocated to general data packets when the storage amount of the preferred packets in the buffer is equal to or smaller than a threshold level.

As described above, in the present embodiment, valid data may be extracted from the preferred data and may be sent preferentially over the general packets as the preferred data packets.

Figure 22:
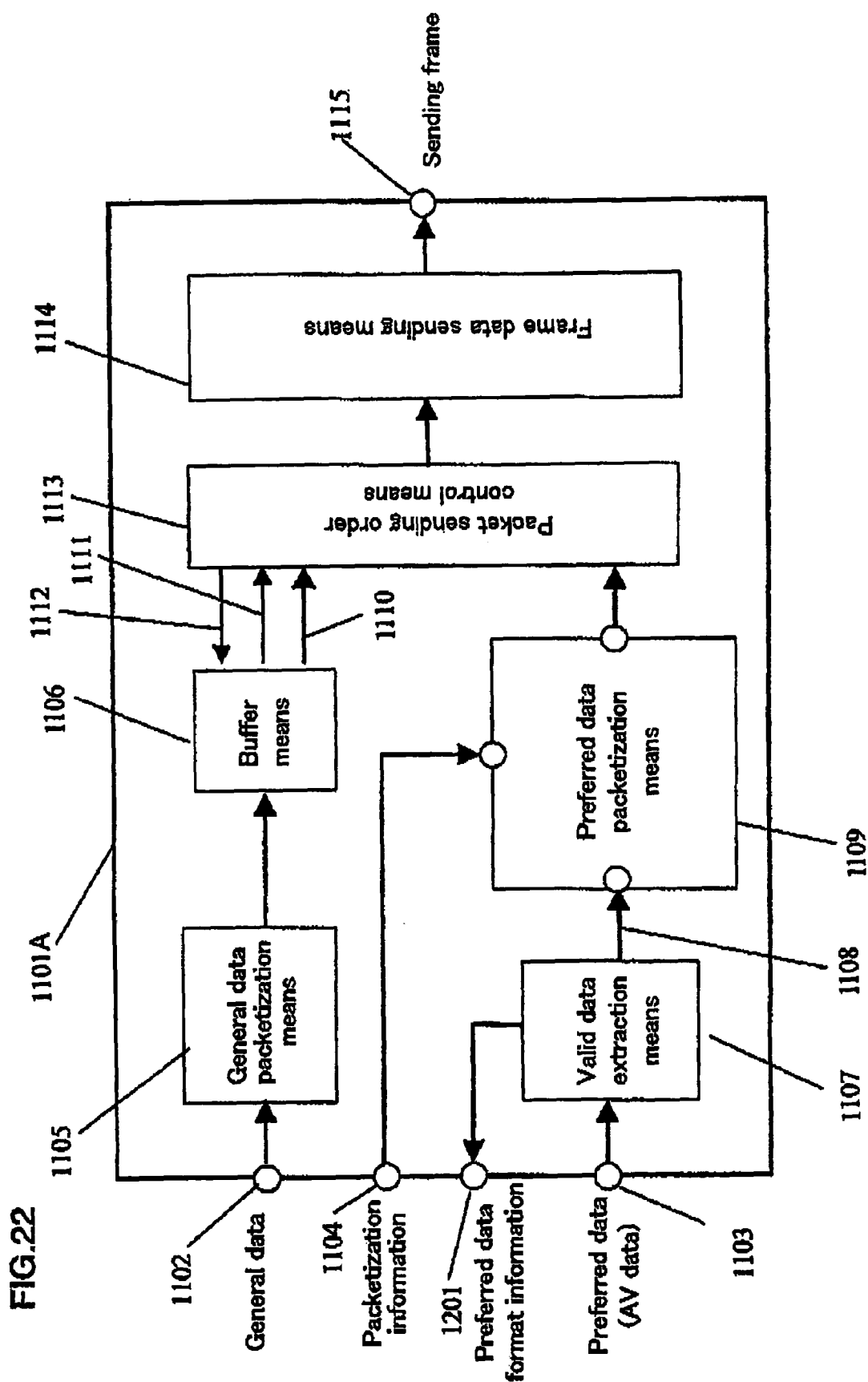
FIG. 22 is a block diagram showing packets sending means according to a variation of Embodiment 7 of the present invention.

FIG. 22 is a block diagram showing packets sending means 1101A according to a variation of Embodiment 7 of the present invention.

The packets sending means 1101A has a similar structure as the packets sending means 1101 described with reference to FIG. 19 except for the point that preferred data format information for indicating information regarding the format of the preferred data is output via preferred data format information output means 1201. Therefore, in the following description the preferred data format information output means 1201 will be mainly described.

In the packets sending means 1101A, if packetization information of the preferred data is set with an outside computer using format information of the preferred data to be output, packets can be transmitted efficiently.

(Embodiment 8)

Hereinafter, Embodiment e will be described.

Figure 23:
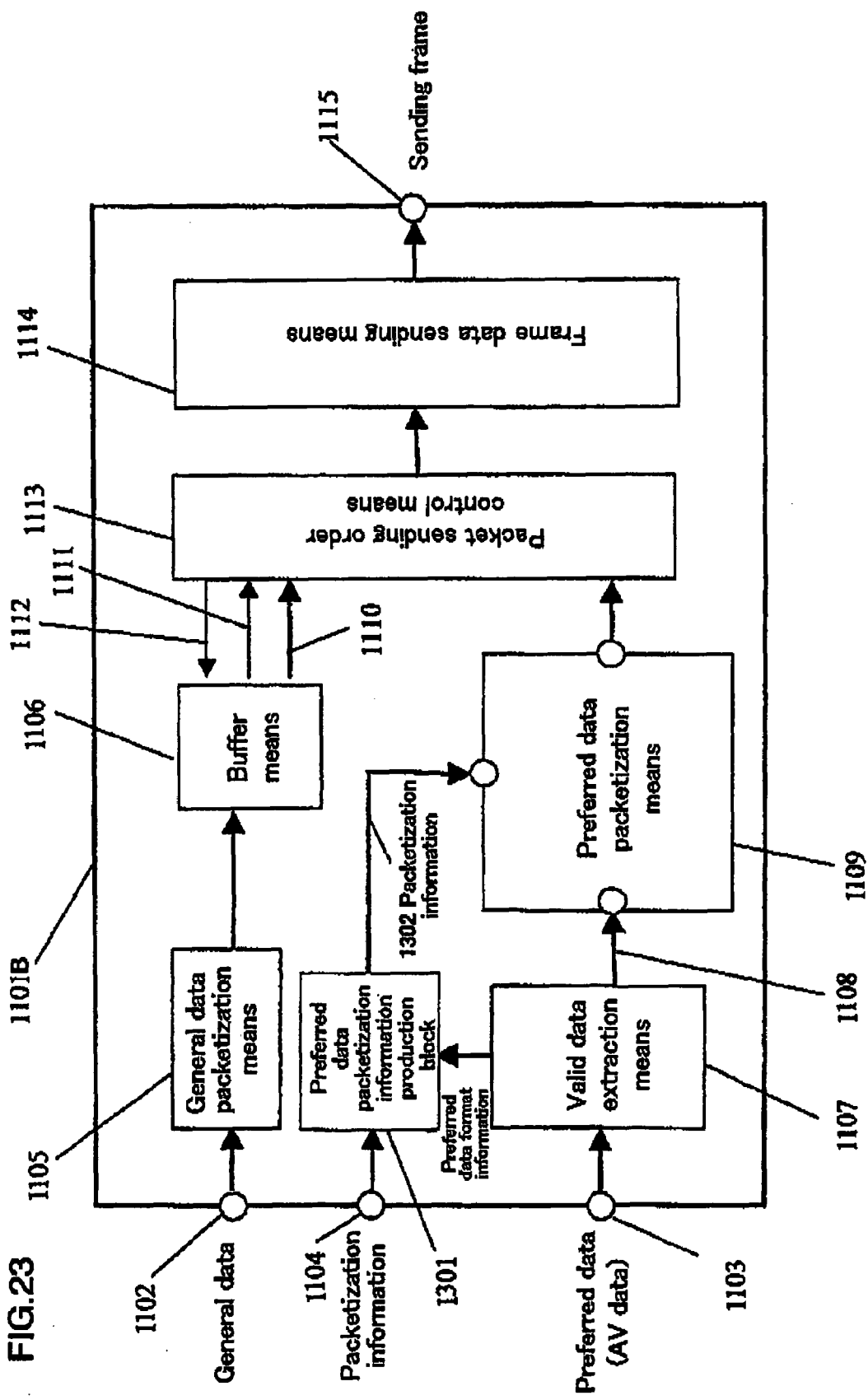
FIG. 23 is a block diagram of packets sending means according to Embodiment 8.

FIG. 23 is a block diagram of packets sending means 1101B according to Embodiment 8.

The packets sending means 1101B includes a preferred data packetization information production block 1301 and has a similar structure as the packets sending means 1101 described with reference to FIG. 19 except for that the preferred data format information is output from the valid data extraction means 1107 to the preferred data packetization information production block 1301. Therefore, in the following description, the preferred data packetization information production block 1301 will be mainly described.

Packetization information is input to the preferred data packetization information production block 1301. The preferred data packetization information production block 1301 uses the packetization information and the preferred data format information to reset the packetization information of the preferred data further optimally. In this way, optimal packetization information can be produced even when the packetization information is produced roughly outside. Thus, packets can be sent further efficiently.

According to the present embodiment, the preferred data format information can be obtained from the valid data extraction means 1107 to be used for determining the packetization parameter with the packetization information input from outside. In this way, packetization of the preferred data can be performed automatically in a unit of 80 byte of DIF block when the preferred data is DV type, and a unit of 188 bytes of TS packets when the preferred data is MPEG type.

Figure 24:
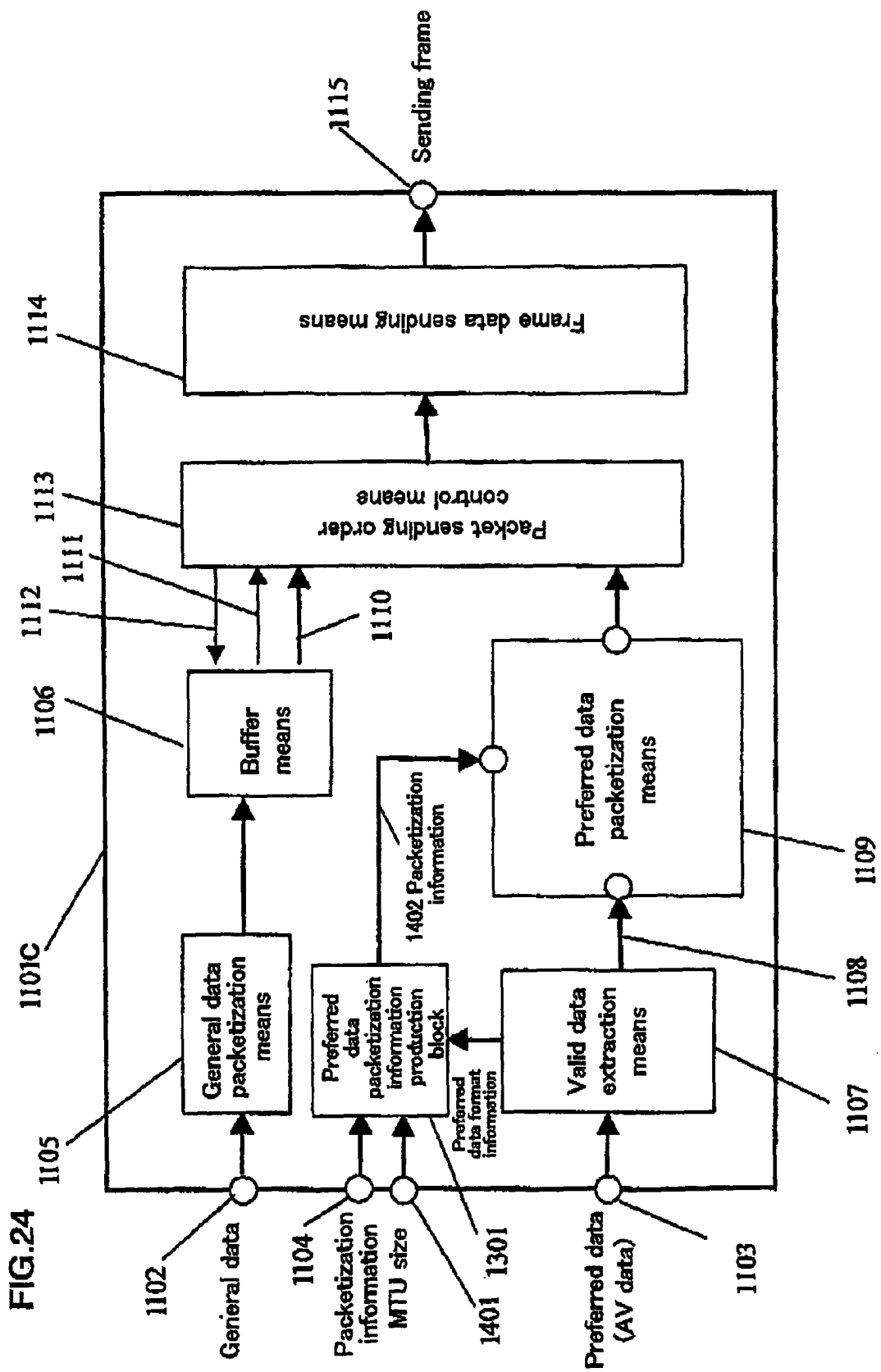
FIG. 24 is a block diagram of packets sending means according to a variation of Embodiment 8 of the present invention.

FIG. 24 is a block diagram of packets mending means 1101C according to a variation of Embodiment 8 of the present invention.

The packets sending means 1101C has a similar structure as the packets sending means 1101B described with reference to FIG. 23 except for the point that maximum transfer unit (MTU) size input means 1401 is provided. Therefore, in the following description, the MTU size input means 1401 will be mainly described.

In the packets sending means 1101C, MTU size (maximum transmission size) is input from MTU size input means 1401. The MTU size means the maximum transmission packet size of the preferred data in a transmission path. The preferred data packetization information production block 1301 produces packetization information 1402 such that the side of the preferred data packet produced at the preferred data packetization means 1109 is equal to or smaller than the MTU size to be input. In this way, fragmenting in the preferred data sending can be prevented and stable communication of preferred data can be realized.

(Embodiment 9)

Hereinafter, Embodiment 9 will be described.

Figure 25:
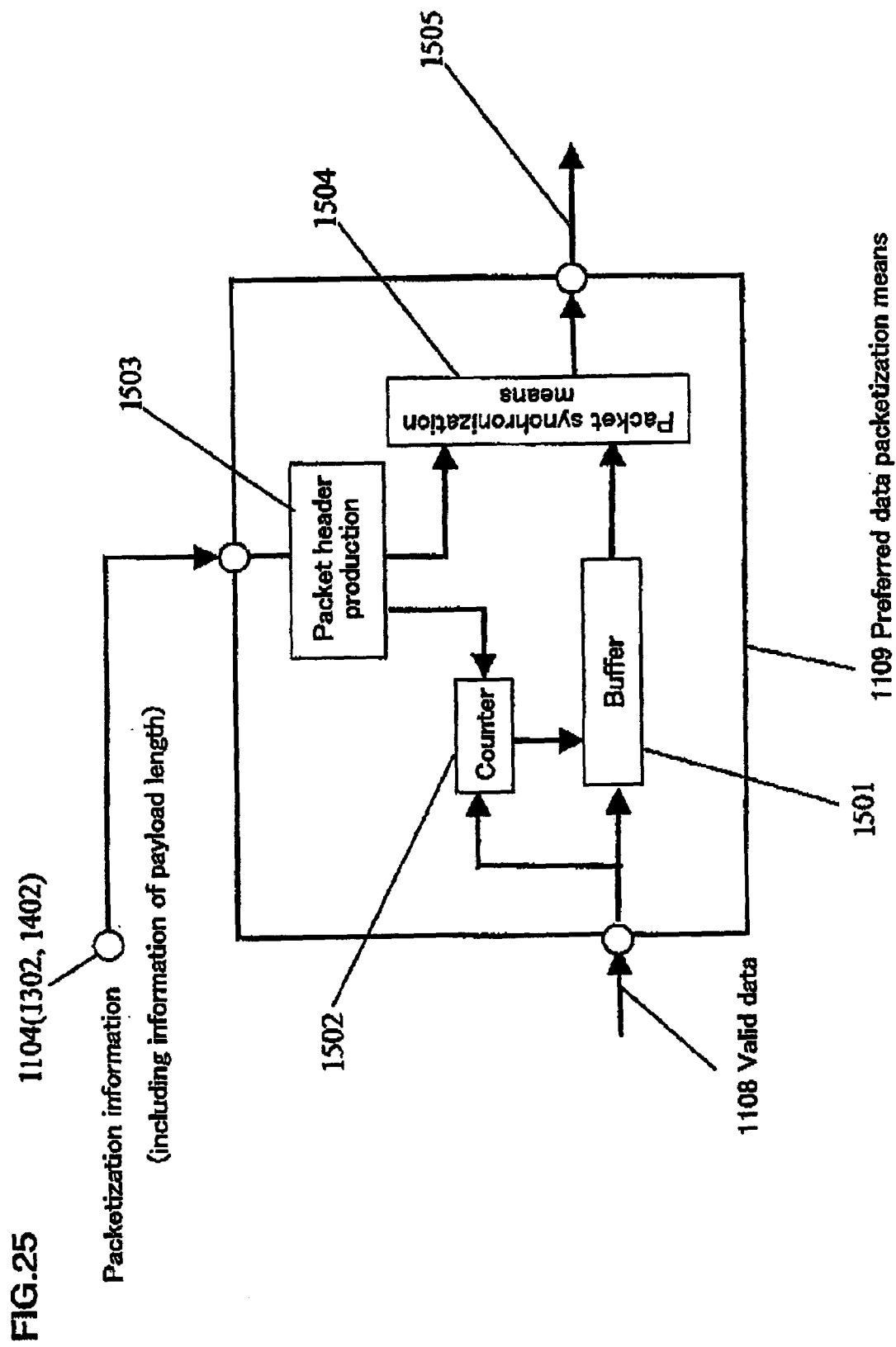
FIG. 25 is a block diagram of packets sending means according to Embodiment 9.

FIG. 25 is a block diagram preferred data packetization means 1109 according to Embodiment 9.

The preferred data packetization means 1109 is included in the second packetization means 702 described with reference to FIG. 8 in Embodiment 2.

The preferred data packetization means 1109 includes buffer means 1501, buffer means 1501, packet header production means 1503, and packets synchronization means 1504.

In the preferred data packetization means 1109, the valid data 1108 is input to the buffer means 1502 and counter means 1502. The valid data 1108 includes a clock signal, data and data valid flag.

The buffer means 1501 stores data only when the data valid flag of the valid data 1108 is asserted (valid).

Further the counter 1502 also counts a data amount of the valid data 1108 and stores in the register inside.

On the other hand, the packetization information 1104 (1302, 1402) is input to the packet header production means 1503. An UDP/IP header is produced in the packet header production means 1503 and input to the packets synchronization means 1504. Further, a payload length of a packet (for example, IP packet) is output from the packet header production means 1503 to the counter 1502. A control signal far reading out the preferred data for the payload length is sent from the counter means 1502 to the buffer means 1501.

The buffer means 1501 the preferred data of the payload length specified by the packet header production means 1503 to the packets synchronization means 1504. The packets synchronization means 1504 synchronizes the UDP/IP packet header produced at the packet header production means 1503 and the preferred data of the specified payload length to produce a UDP/IP packet and outputs from the output means 1505.

Figure 26:
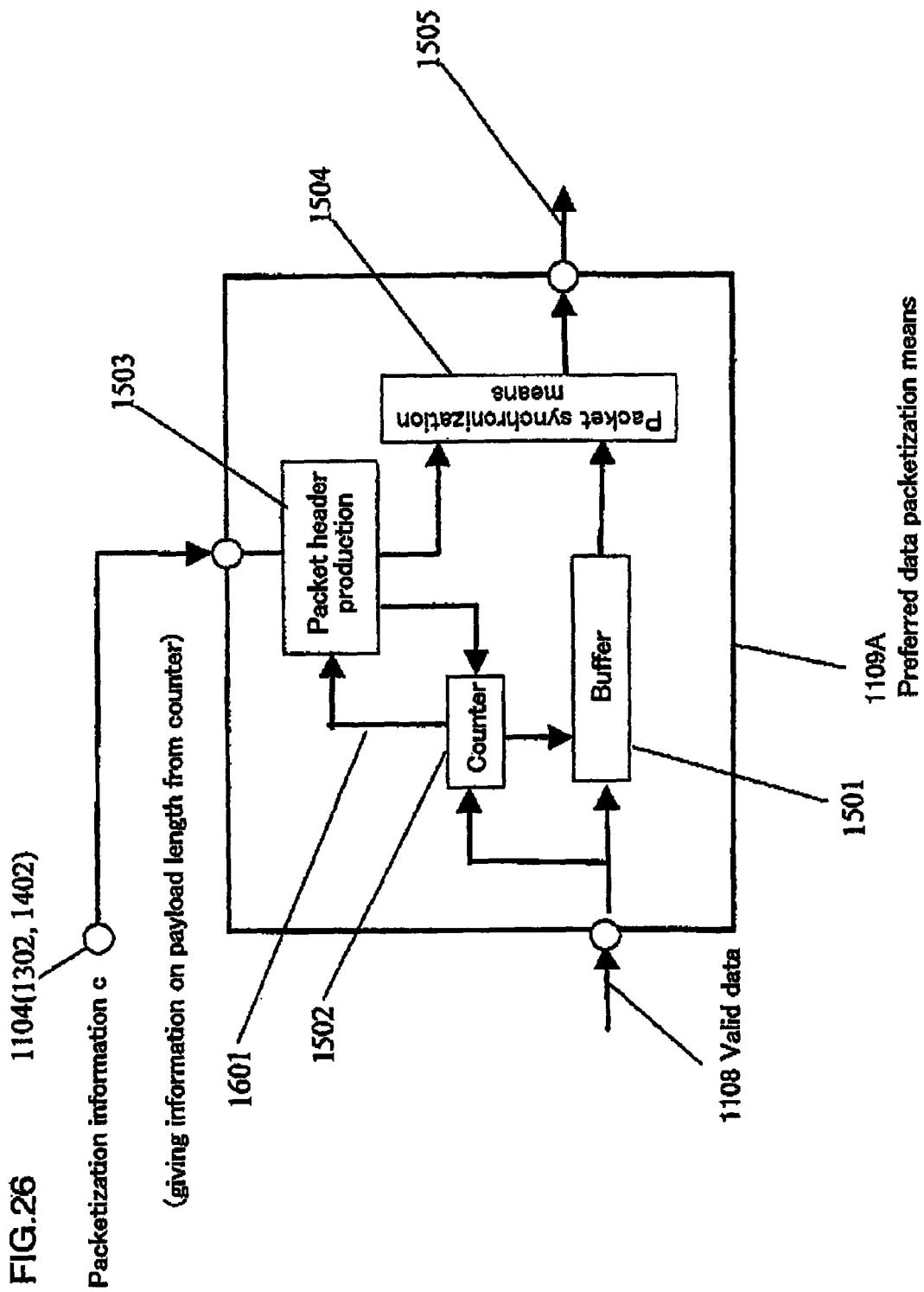
FIG. 26 is a block diagram of preferred data packetization means according to a variation of Embodiment 9 of the present invention.

FIG. 26 is a block diagram of preferred data packetization means 1109A according to a variation of Embodiment 9 of the present invention.

The preferred data packetization means 1109A has a similar structure as the preferred data packetization means 1109 described with reference to FIG. 25 except for that a path 1601 through which information indicating a payload length of the preferred data packets is input from the counter means 1502 to the packet header production means 1503. Therefore, in the following discussion, the path 1601 will be mainly described.

In the preferred data packetization means 1109A, information indicating the payload length of the preferred data packets is input from the counter means 1502 to the packet header production means 1503 via the path 1601. The packet header production means 1503 uses the input packetization information 1104 (1302, 1402) and packet payload length to determine a packet header.

Figure 27:
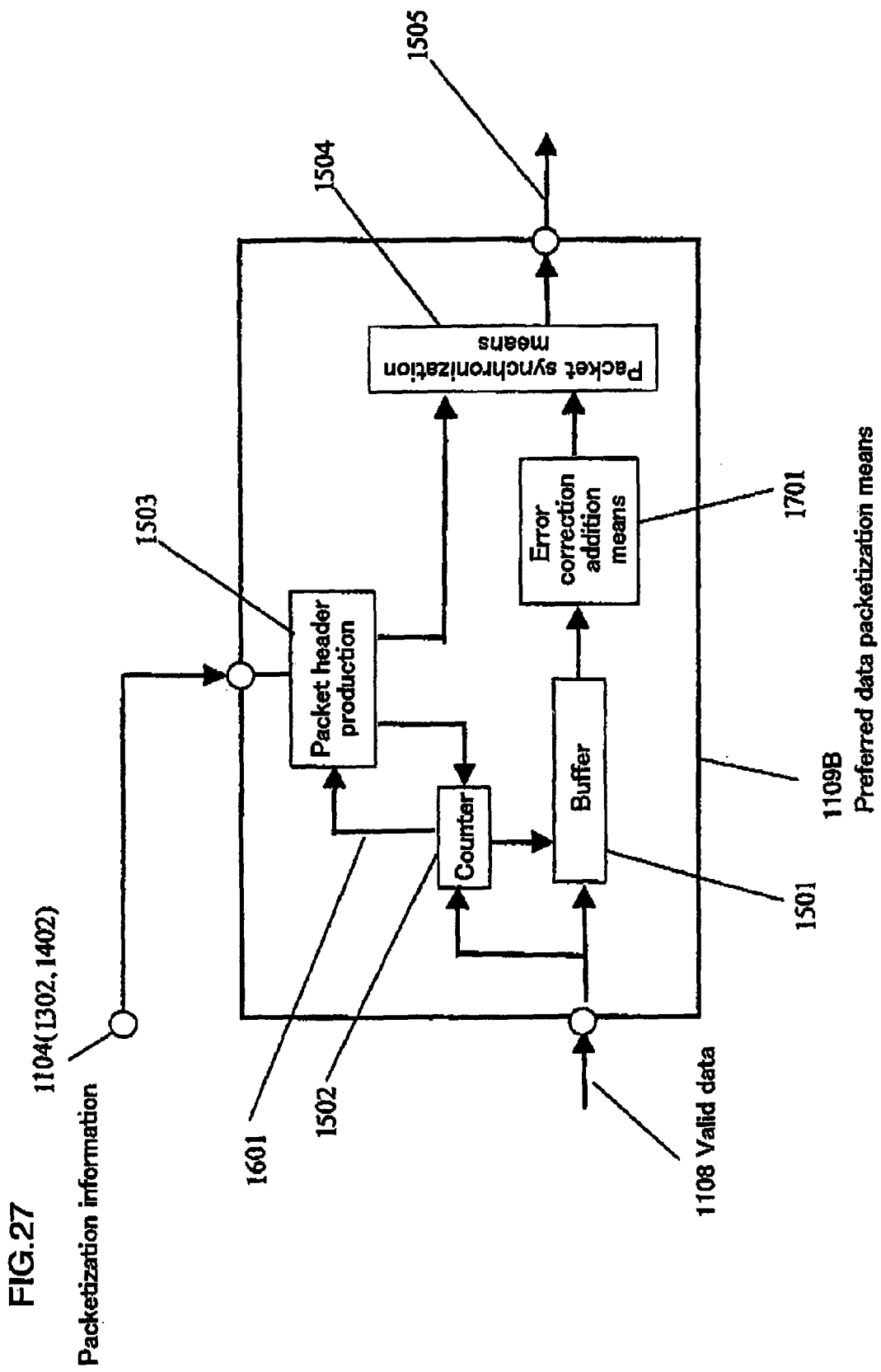
FIG. 27 is a block diagram of preferred data packetization means according to a variation of Embodiment 9 of the present invention.

FIG. 27 is a block diagram of preferred data packetization means 1109B according to a variation of Embodiment 9 of the present invention.

The preferred data packetization means 1109B has a similar structure as the preferred data packetization means 1109A described with reference to FIG. 26 except for that an error correction addition means 1701 is added. Therefore, in the following discussion, the error correction addition means 1701 will be mainly described.

In the preferred data packetization means 1109B, a payload of the preferred data packets is input from the buffer means 1501 to the error correction addition means 1701. In the error correction addition means 1701, a packet produced by adding an error correction code with a parity addition scheme and a Reed-Solomon scheme which will be described is input to the packets synchronization means 1504.

Example of the preferred data packets may be AV data represented in one dimension as shown in FIG. 20. However, two dimensional matrix data can be also used as AV data.

Figure 28:
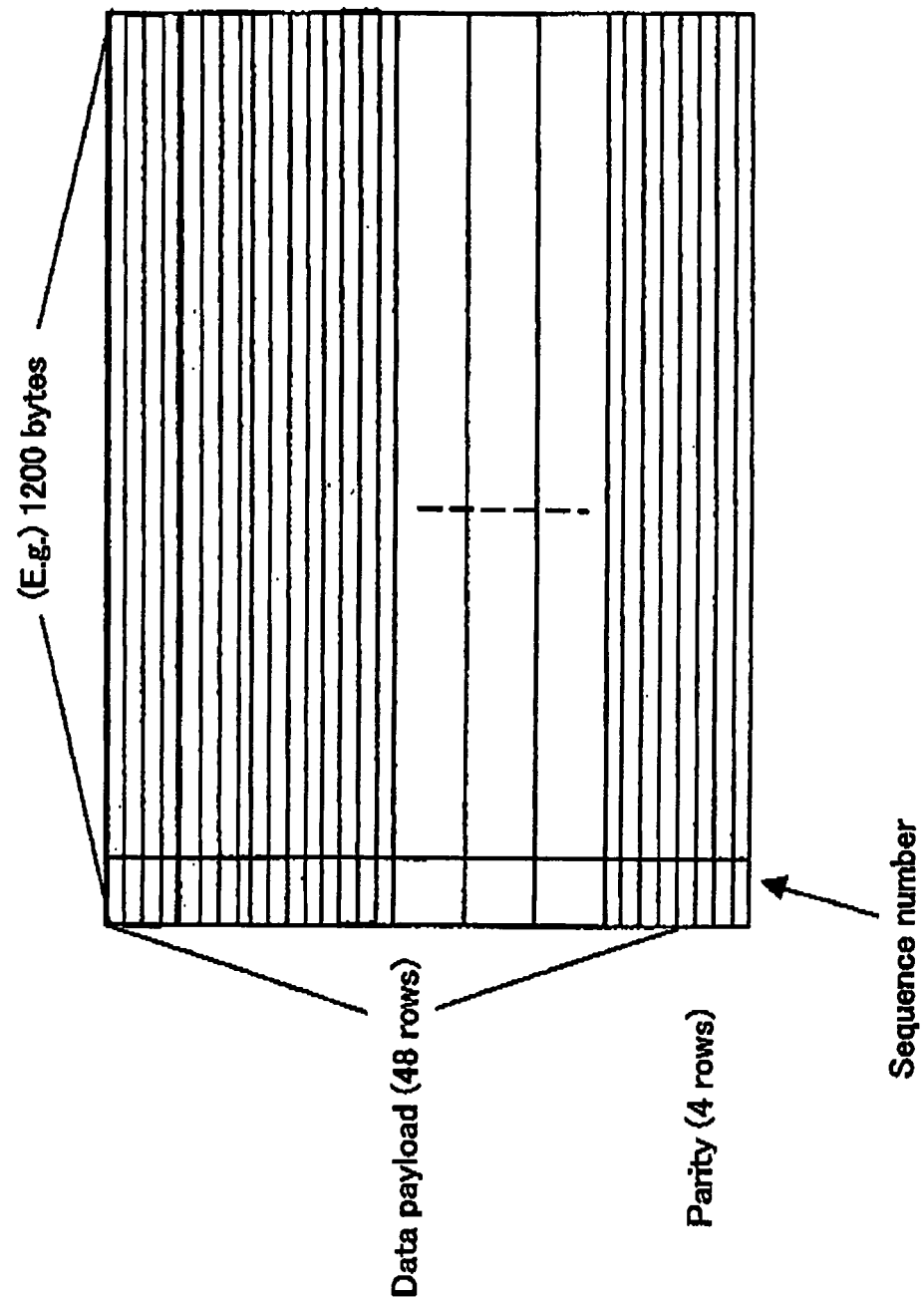
FIG. 28 is a diagram showing packets structure when error correction is in a Reed-Solomon scheme.

FIG. 28 is a diagram showing packets structure when error correction is in Reed-Solomon scheme.

As shown in FIG. 28, error correction of Reed-Solomon scheme is performed to AV data matrix located in byte units (8 bit units) on a matrix of m rows in a vertical direction (m is integer, for example, 48 in FIG. 28) and n columns in a horizontal direction (n is integer, for example, 1200 bytes in FIG. 28). A data matrix with error correction data of four rows added (1200 bytes in horizontal and 52 rows in vertical) is produced. Data matrix is read one row at a time. The data with the sequence number or the signal format information added as header information may be preferred data packets.

Figure 29:
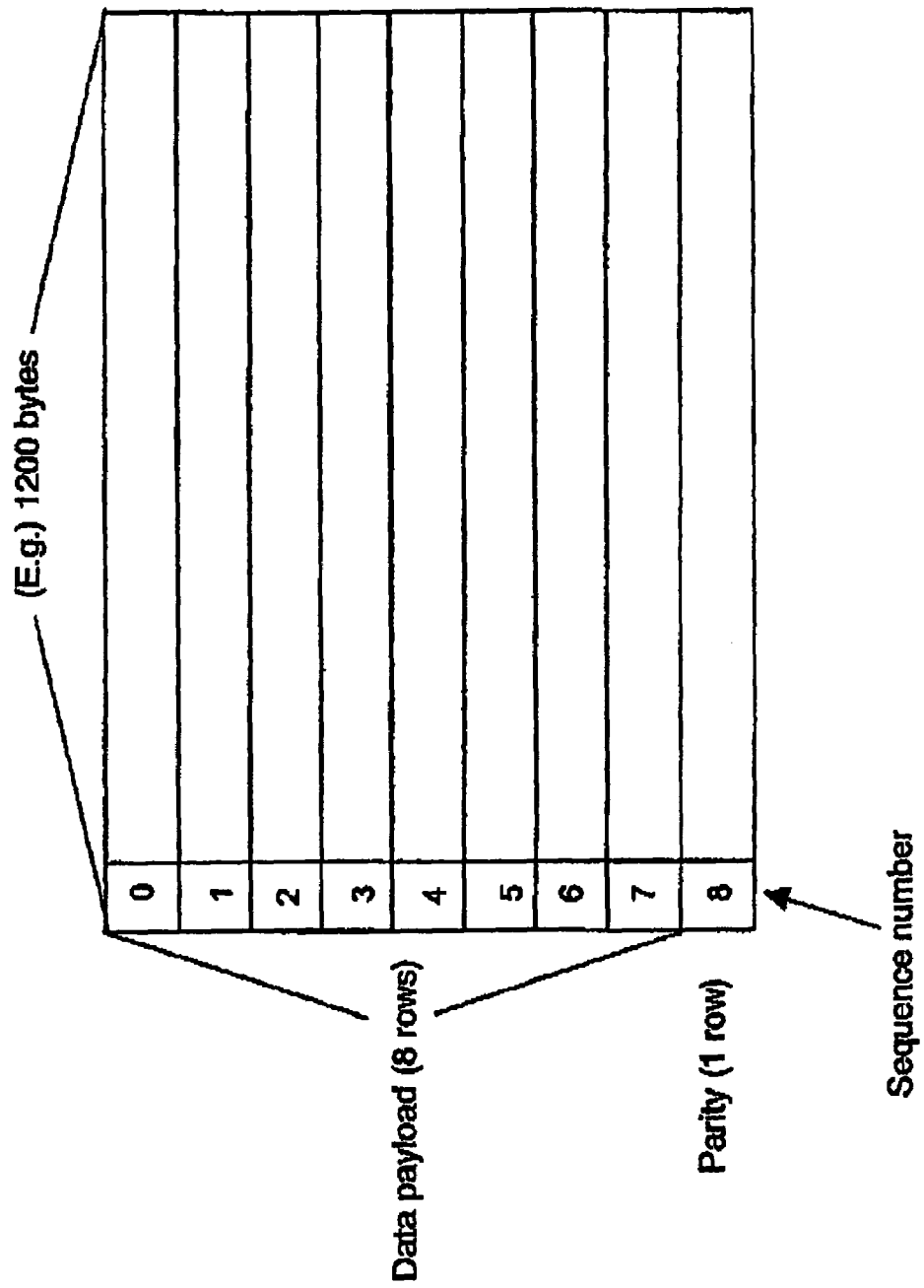
FIG. 29 is a diagram showing packets structure when error correction is in a parity process scheme.

FIG. 29 is a diagram showing packets structure when error correction is in a parity process scheme.

Parity calculation is performed to AV data matrix located in byte units (8 bit units) on a matrix of m rows in a vertical, direction (m is integer, for example, 8 in FIG. 29) and n columns in a horizontal direction (n is integer, for example, 1200 bytes in FIG. 29). A data matrix with one row of parity data added is produced. Data matrix is read one row at a time. The data with the sequence number or the signal format information added as header information may be preferred data packets.

As an example of a matrix unit for producing preferred data packets are as follows. K number (k is an integer, for example, 5) of matrix of m rows in a vertical direction (m is an Integer, for example, 15), and n rows in a horizontal direction (n is an integer, for example, 80) is produced, and a data interleave process in a row unit in the k number of the matrix, which is a process to embed data to the same row in the k number of matrix one by one. When matrix data of m rows and n columns is embedded, parity calculation is performed in a vertical direction of the matrix and data matrix with one row of the parity data is added is generated. Then, k number of data in the first row in the k number of data matrix is read out and then k number of data in the second row of k number of data matrix is read out to read out k number of data in m-th row of the k number of data matrix. The data with the sequence number and signal format information added as header information may be preferred data packets.

As described above, by adding error correction code to the preferred data in the preferred data packetization means in the sending apparatus, it becomes possible to restore the preferred data in the receiving apparatus even when a packet loss is generated in the network.

(Embodiment 10)

Hereinafter, Embodiment 10 will be described.

Figure 30:
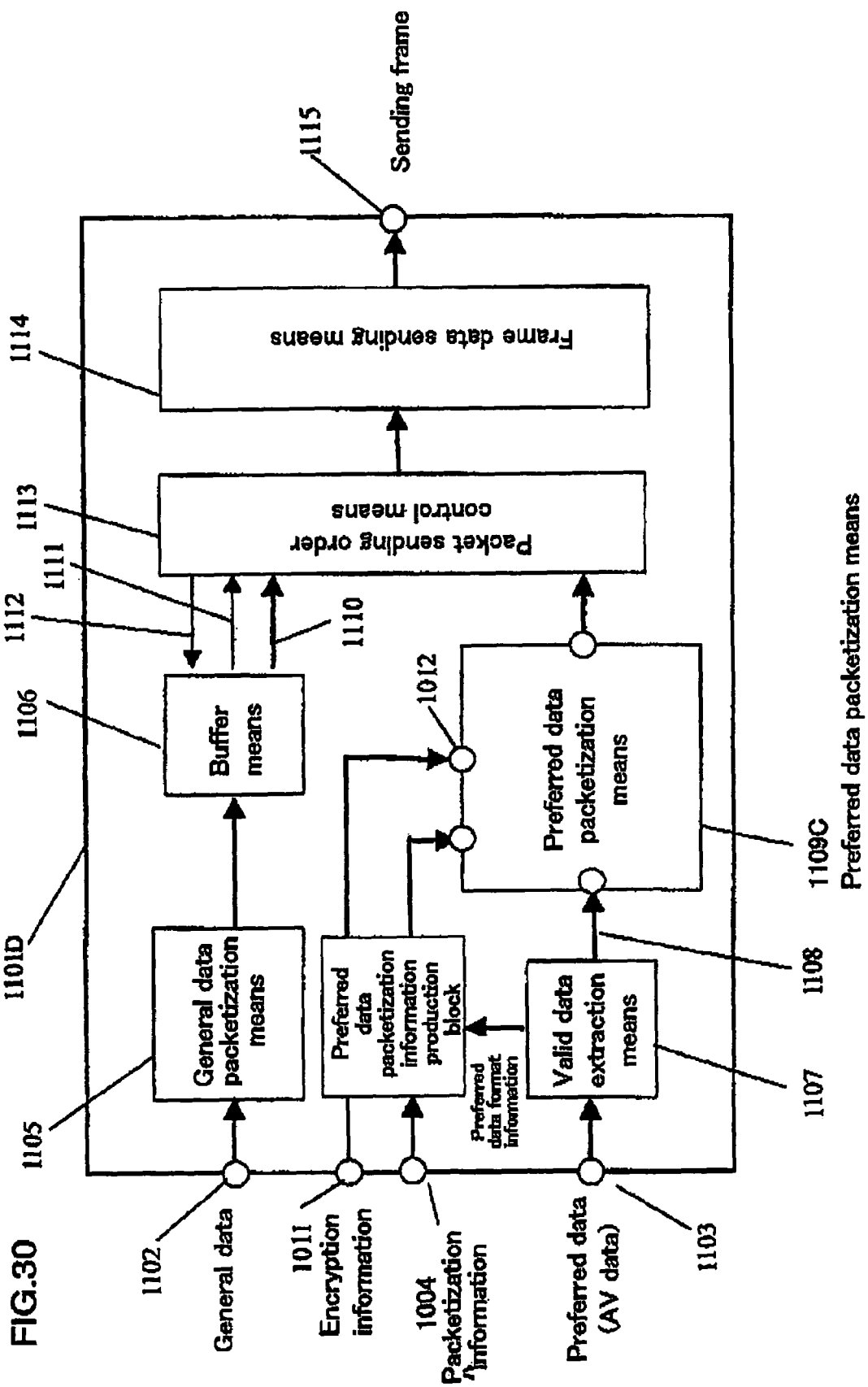
FIG. 30 is a block diagram of packets sending means according to Embodiment 10 of the present invention.

FIG. 30 is a block diagram of packets sending means 1101D according to Embodiment 10 of the present invention.

The packets sending means 1101D has a similar structure as the packets sending means 1101B described with reference to FIG. 23 except for the point that encryption information input means 1011 and encryption information input means 1012 in the preferred data packetization means 1109C are provided.

Figure 31:
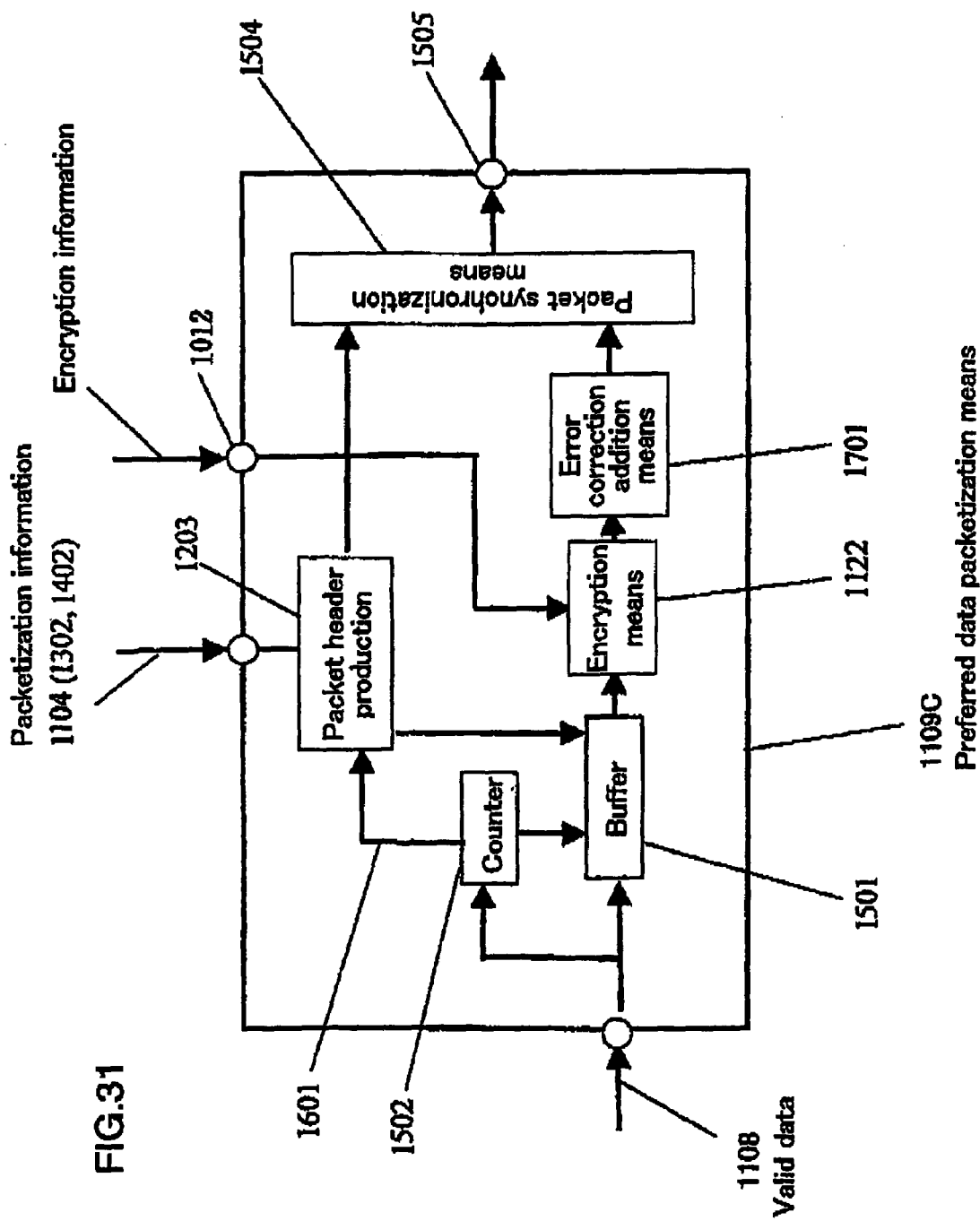
FIG. 31 is a block diagram of preferred data packetization means according to Embodiment 10 of the present invention.

FIG. 31 is a block diagram of the preferred data packetization means 1109C according to Embodiment 10 of the present invention.

The preferred data packetization means 1109C has a similar structure as the preferred data packetization means 1109B described with reference to FIG. 27 except for the point that encryption information input means 1012 and encryption means 1122 are provided.

Therefore, in the following description, the encryption information input means 1011, the encryption information input means 1012 in the preferred data packetization means 1109C, and encryption means 1121 are mainly described.

The encryption means 1122 corresponds to encryption means 406 of the packets sending/receiving apparatus 401 with reference to FIG. 4.

In the packets sending means 1101D, encryption information is input from the encryption information input means 1011 to the encryption information input means 1012 in the preferred data packetization means 1109C.

In the preferred data packetization means 1109C, data output from the buffer means 1501 is input to the encryption means 1122 and encrypted using the encryption information input from the encryption input means 1011. The data encrypted at the encryption means 1122 is input to the error correction addition means 1701.

Information used for encryption is information produced by using at least one of unique information of the sending apparatus (equipment ID, authentification information equipment, MAC address, and the like), private key, public key. By combining encryption scheme with a high encryption strength, a strong copyright protection with respect to the preferred data packets can be provided.

Regarding encryption scheme, for example, encryption key Kc used in digital transmission content protection (DTCP) may be applied. For producing the encryption key Kc, authentification process based on the DTCP scheme is performed in the sending apparatus and the receiving apparatus. The process is a known process and is described in, for example, Digital Transmission Licensing Administrator (DTLA) (HPERLINK "http://www.dtcp.com/", http://www.dtcp.com/", http://www.dtcp.com/data/dtcp_tut.pdf") and a book "IEEE1394, AV kikiheno ouyou (IEEE 1394, Application to AV equipment)", edited by Shinji Takada, The Nikkan Kogyo Shimbun Ltd., "Chapter 8, Copy protection", pp. 133-149. Further, as authentification information, certificate information appropriately authentificated in a public or private certify organization via the network and the like can be used. For example, reference can be made in a governmental authentification basis (HYPERLINK http://222.gpki.go-jp/; http://gpki.go.jp/).

As described above, for UDP/IDP packets transmission of the preferred data in the sending apparatus, the preferred data is encrypted and error correction is added. Even when a packet loss is generated in the network, the preferred data can be restored in the receiving apparatus. Also, the eaves dropping and leakage of data over the network can be prevented and AV data transmission with a copyright protected and a high security can be realized.

(Embodiment 11)

Hereinafter, Embodiment 11 will be described.

Figure 32:
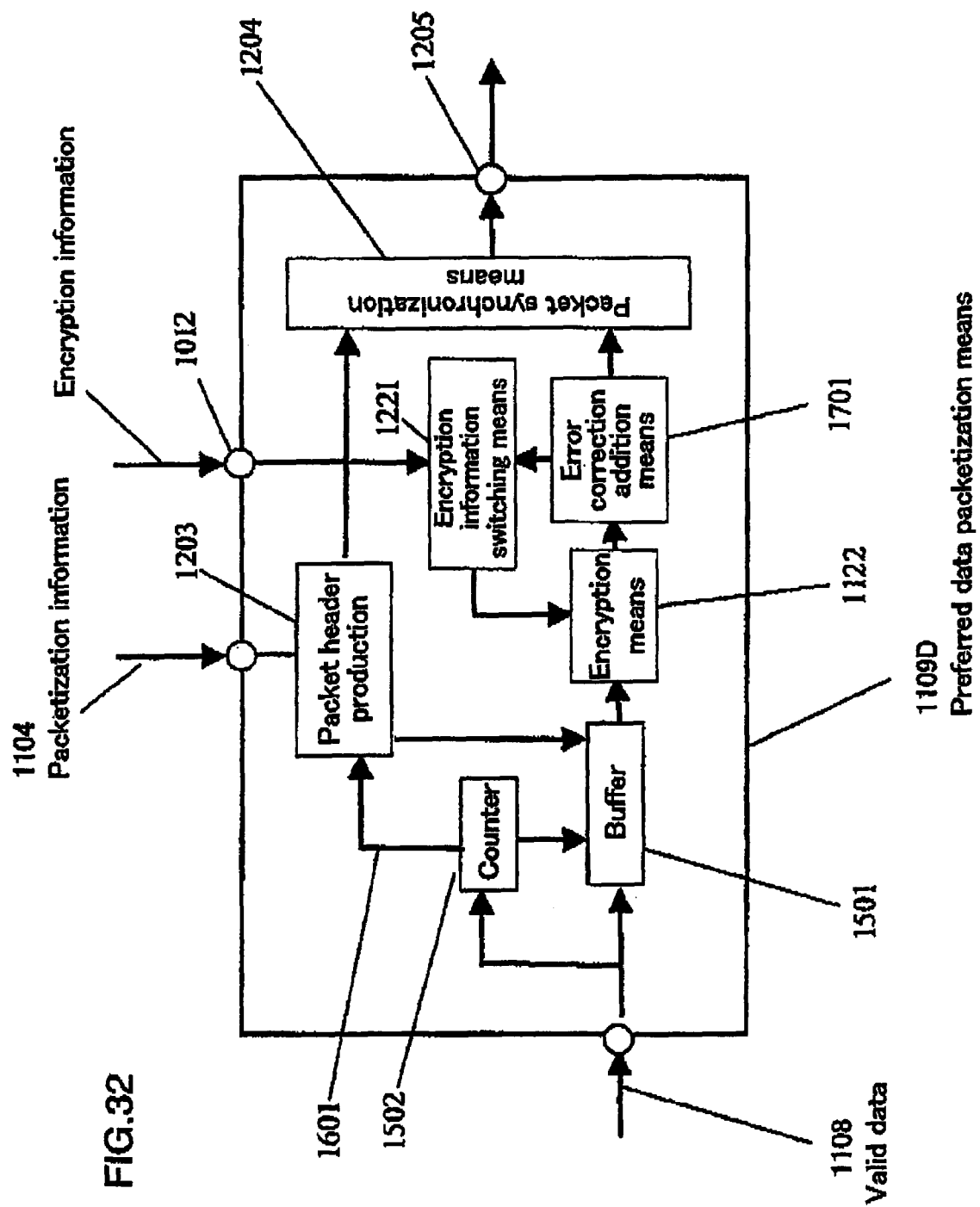
FIG. 32 is a block diagram of preferred data packetization means according to Embodiment 11 of the present invention.

FIG. 32 is a block diagram of preferred data packetization means 1109D according to Embodiment 11 of the present invention.

The preferred data packetization means 1109D has a similar structure as the preferred data packetization means 1109C described with reference to FIG. 31 except for the point that encryption information switching means 1221 is provided. Therefore, in the following description, the encryption information switching means 1221 will be mainly described.

In the preferred data packetization means 1109D, encryption information changes over time is input to the encryption information switching means 1221 via the encryption information input means 1012. The encryption information switching means 1221 switches the encryption information used in the encryption means 1122.

An example of a switching timing of the encryption information may be a timing for switching in an error correction matrix unit obtained from the error correction addition means 1701. In this way, encryption strength of the communication between the sending apparatus and the receiving apparatus is further enhanced and the decoding of the encryption can be steadily realized.

The buffer means 1501 and the encryption means 122 of the preferred data packetization means 1109D corresponds to the encryption means 406 of the packets sending/receiving apparatus 401B described with reference to FIG. 8. The Counter means 1502 of the preferred data packetization means 1109D, the packet header production means 1203 and the encryption information switching means 1221 correspond to a part of the AKE means 402 and a part of the sending condition setting management means 404 of the packets sending/receiving apparatus 401B described with reference to FIG. 8. The packet header production means 1203 and the error correction addition means 1701 of the preferred data packetization means 1109D correspond to the sending condition setting management means 404, the second packetization means 702 and a part of the encryption means 406 of the packets sending/receiving apparatus 401B described with reference to FIG. 8. Particularly, the error correction addition means 1701 of the preferred data packetization means 1109D corresponds to error correction addition means of the second packetization means 702A described with reference to FIG. 13.

Figure 33:
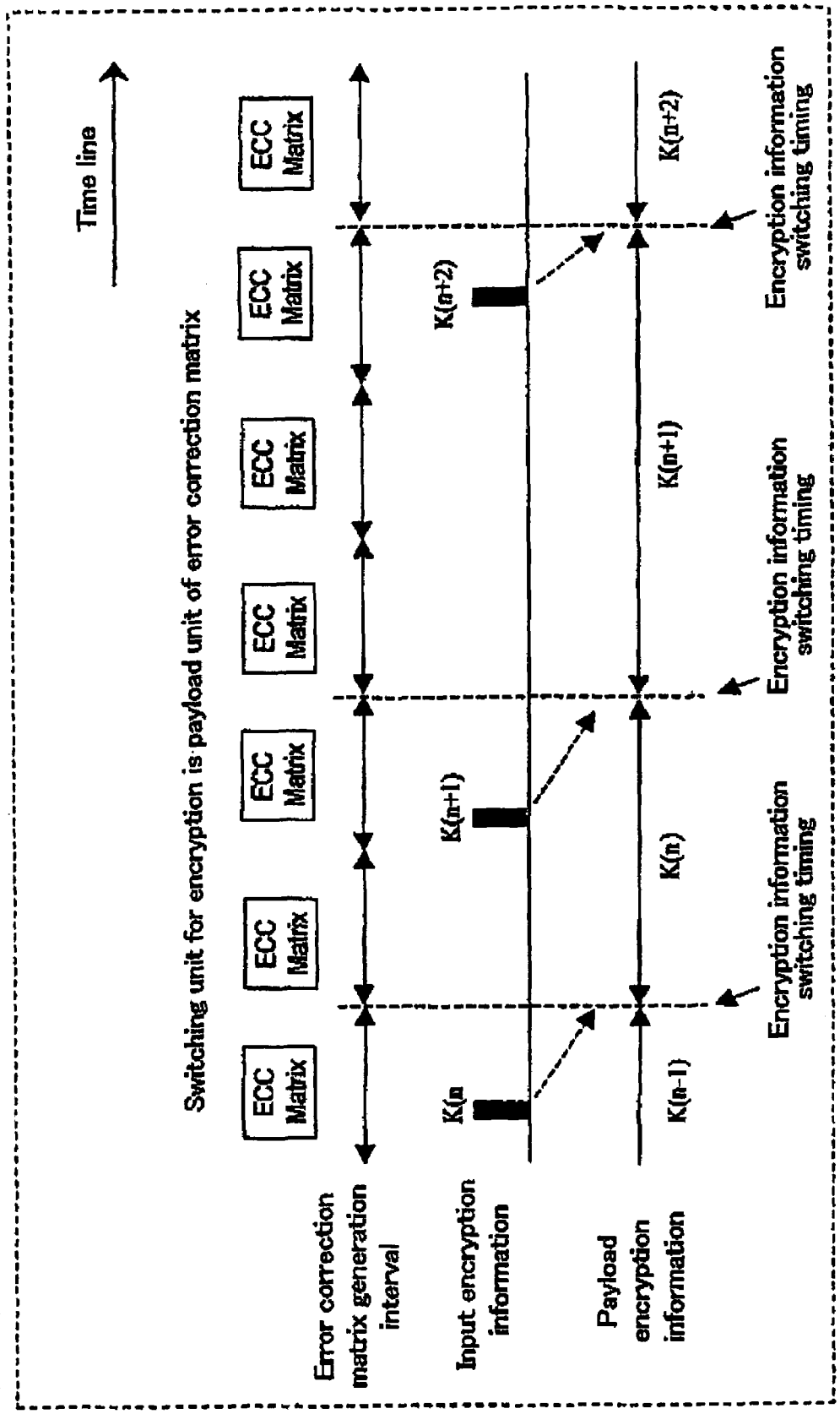
FIG. 33 is a schematic view for illustrating a switching timing for encryption.

FIG. 33 is a schematic view for illustrating a switching timing for encryption.

As shown in FIG. 33, encryption information to be input to the encryption information switching means 1221 is switched when the error correction matrix is switched.

A timing for using for encryption key exchange is a timing generated in synchronization with an endpoint or a start point of the error correction matrix.

As described above, by rendering a phase of the error correction matrix to a switching phase, it becomes possible to operate decoding of encryption smoothly while encryption strength is being increased.

The switching phase of the encryption key may be a specific value of the sequence number defined in the packet header. For example, when there is no error correction, the sequence number is an integer from 0 to 63, and a timing when the sequence number is updated from 63 to 0 may be used as the switching phase for the encryption key.

Furthermore, the encryption key to be input to the encryption information switching means 1221 may be input to the encryption information switching means 1221 while being switched at the specified timing, and the encryption key in the encryption information switching means 1221 may be switched in a specified interval.

Further, when a protocol other than UDP/IP, for example, TCI/IP is used for sending packets, the sequence number of the TCP segment included in the TCP header can also be used. The TCP protocol is defined by IETF, RFC793.

(Embodiment 12)

Hereinafter, Embodiment 12 will be described.

Figure 34:
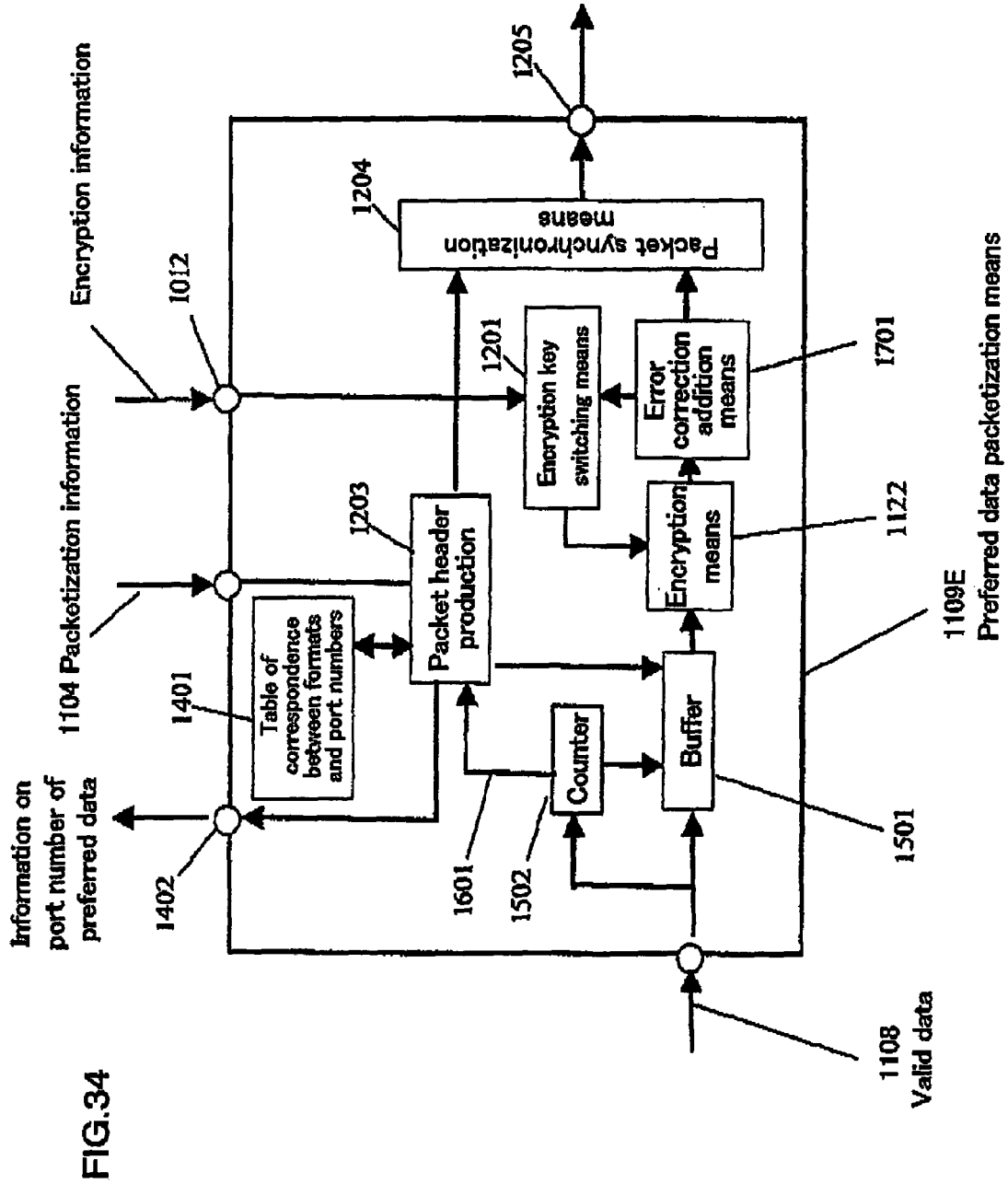
FIG. 34 is a block diagram of preferred data packetization means according to Embodiment 12 of the present invention.

FIG. 34 is a block diagram of preferred data packetization means 1109 according to Embodiment 12 of the present invention.

The preferred data packetization means 1109E has a similar structure as the preferred data packetization means 1109D described with reference to FIG. 32 except for the point that a table of correspondence between formats and port numbers 1401 is provided. Therefore, in the following description, the table of correspondence between formats and port numbers 1401 will be mainly described.

In the preferred data packetization means 1109E, the packets header production means 1203 further makes correspondence between the preferred data format information and the UDP port number in addition to the above-described function. The preferred data format information is Included in the packetization information 1104.

In the table of correspondence between formats and port numbers 1401, format information used by the preferred data is stored. From the format information in the packetization information 1104 to be input, a UDP port number is determined. The packet header production means 1203 produces UDP/IP packet by using the UDP port information.

In this way, format can be detected by only detecting the port number in the receiving apparatus. Thus, a signal process in the receiving apparatus can be readily performed. Furthermore, even when two streams are received at the same time in the receiving apparatus which can handle two lines of stream process, the format or channel can be identified by the port number.

(Embodiment 13)

Hereinafter, Embodiment 13 will be described.

Figure 35:
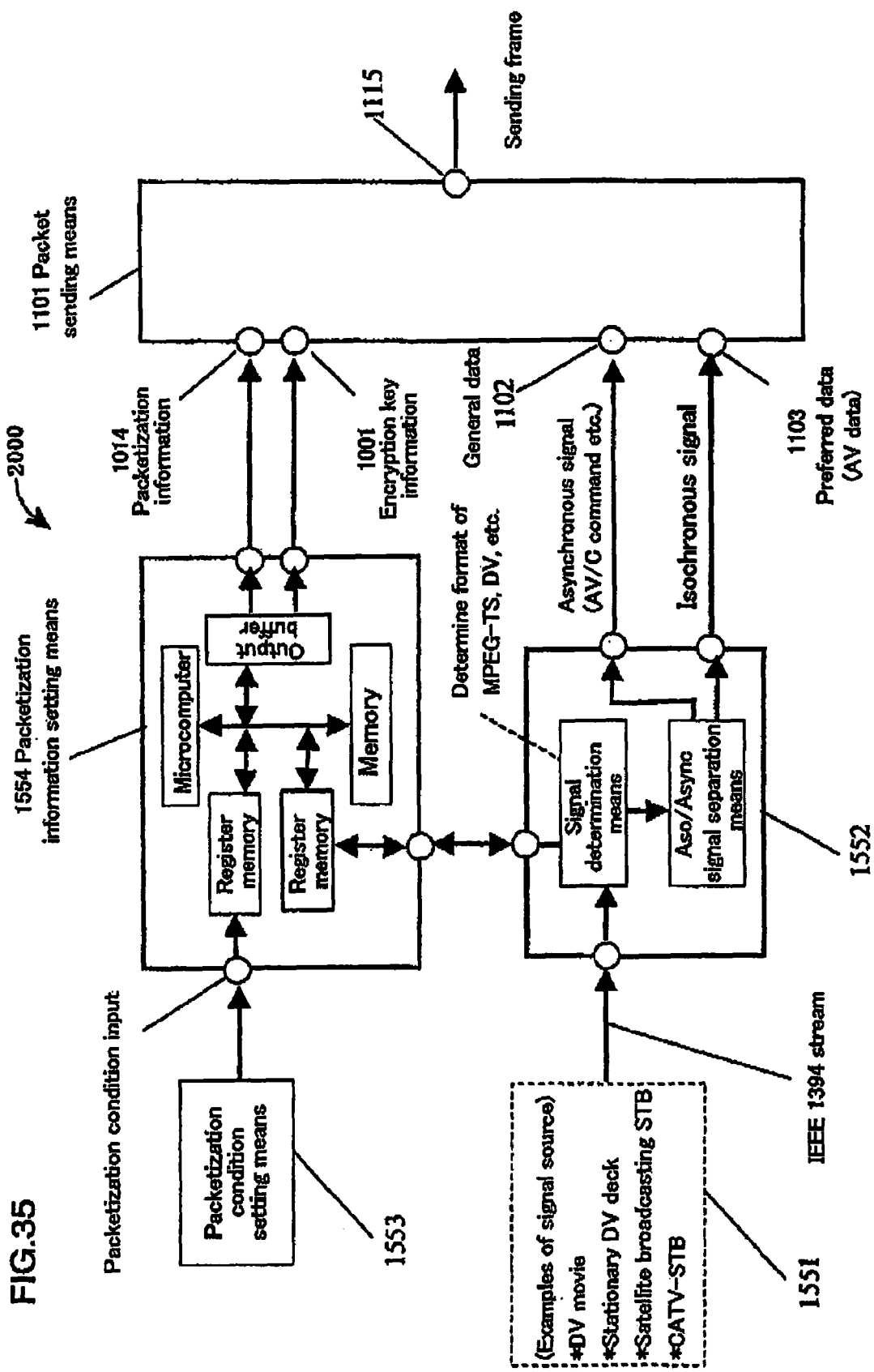
FIG. 35 is a block diagram of packets sending system which is applied to IEEE 1394 stream transmission according to Embodiment 13 of the present invention.

FIG. 35 is a block diagram of a packets sending system 2000 which is applied to IEEE 1394 stream transmission according to Embodiment 13 of the present invention. The packets sending system 2000 is included in the packets sending/receiving apparatus 401 described with reference to FIG. 4 in Embodiment 1.

In the packets sending system 2000, separation means 1552 separates the general data and the preferred data from the IEEE 1394 stream. In this example, the general data is an asynchronous signal and the preferred data is an isochronous signal.

Figure 36:
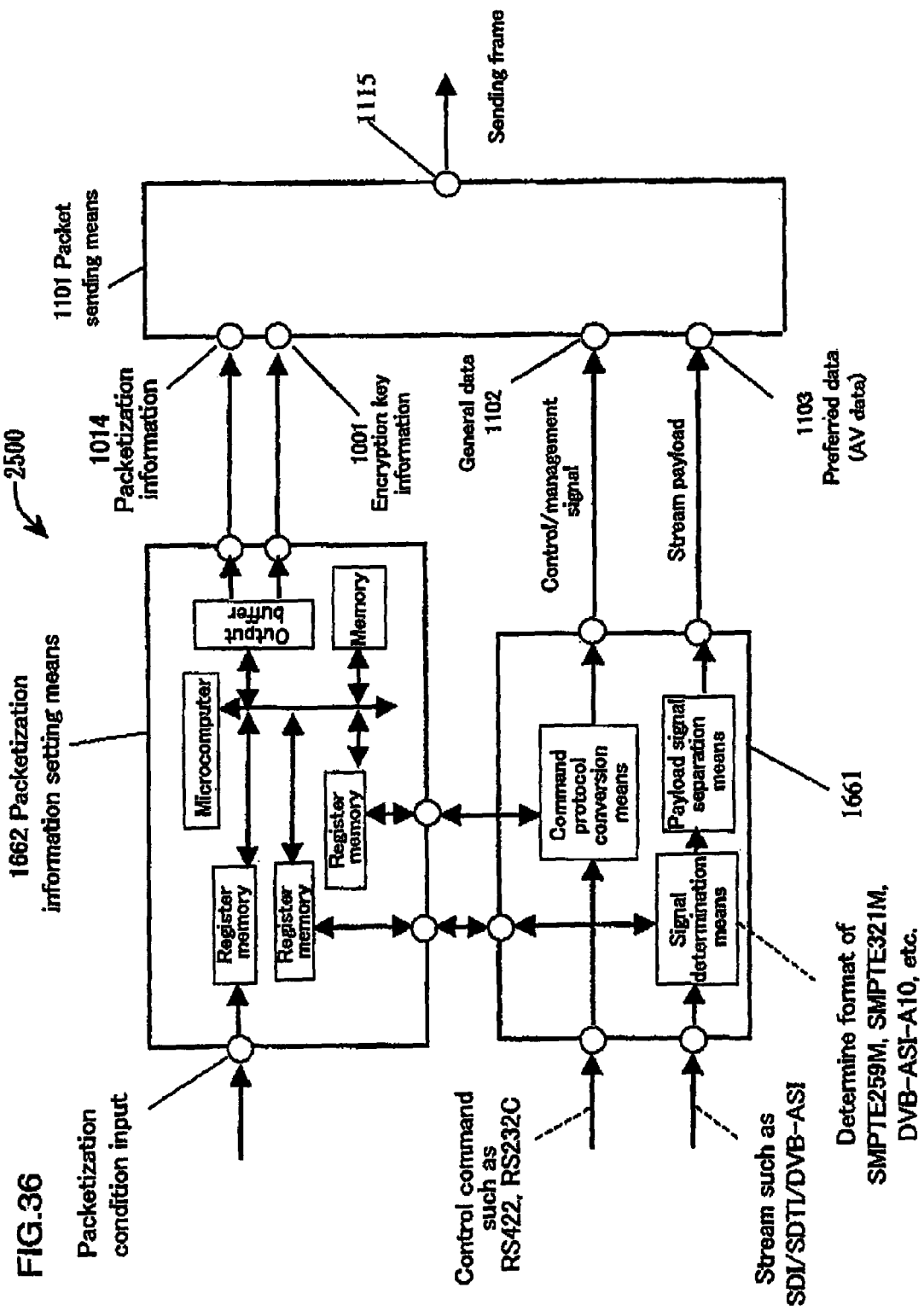
FIG. 36 is a block diagram showing packets sending system applied to a transmission of SDI/SDTI/DVB-ASI stream according to Embodiment 13 of the present invention.

FIG. 36 is a block diagram showing a packets sending system 2500 applied to a transmission of SDI/SDTI/DVS-ASI stream according to Embodiment 13 of the present invention.

In the packets sending system 2500, control and management signals input from RS232C, RRS422 and the like are used as general data, and data separated from SDI/SDTI/DVB-ASI stream is used as the preferred data.

Figure 37:
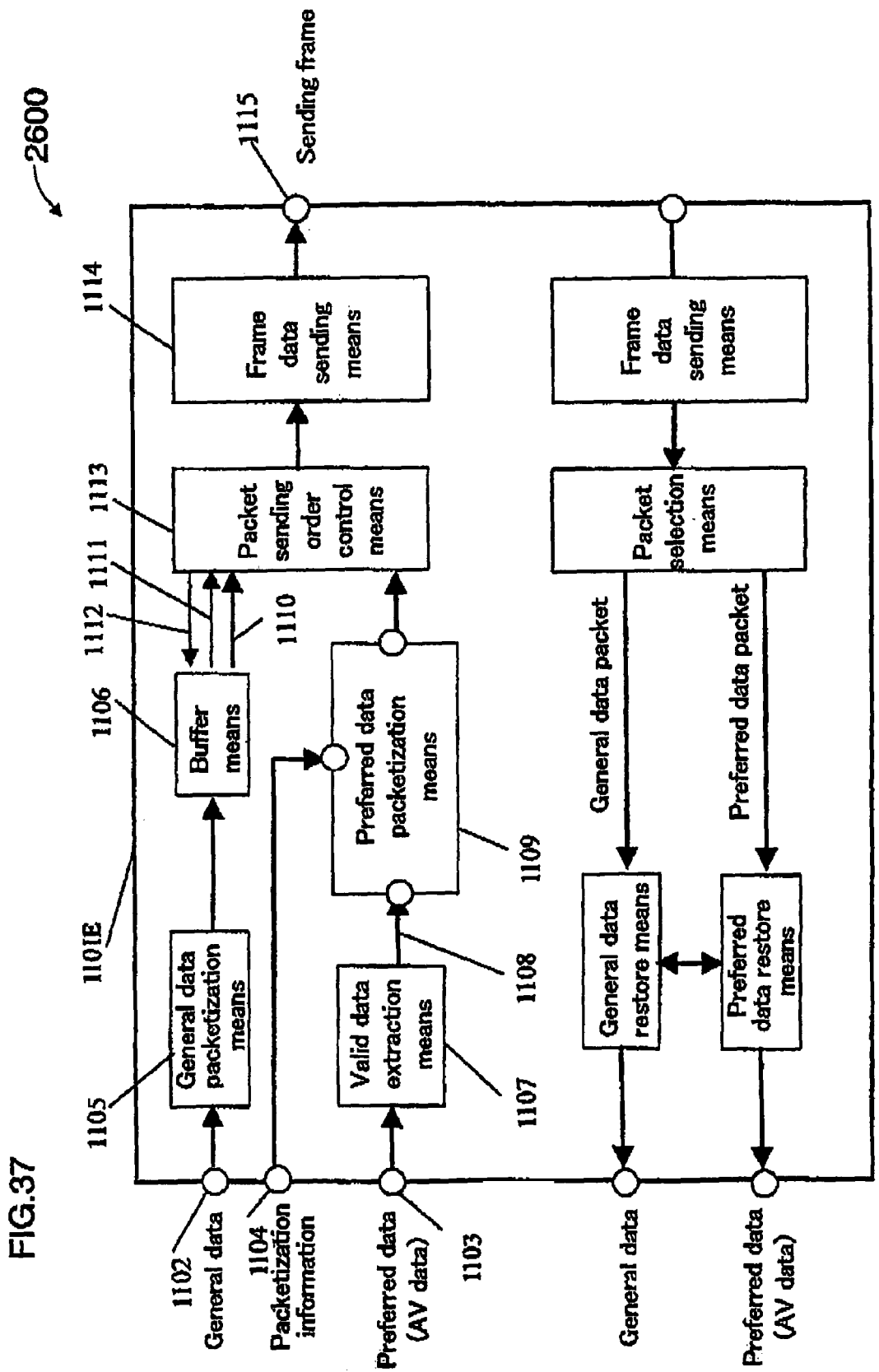
FIG. 37 is a block diagram of packets sending/receiving apparatus according to Embodiment 13.
Figure 38:
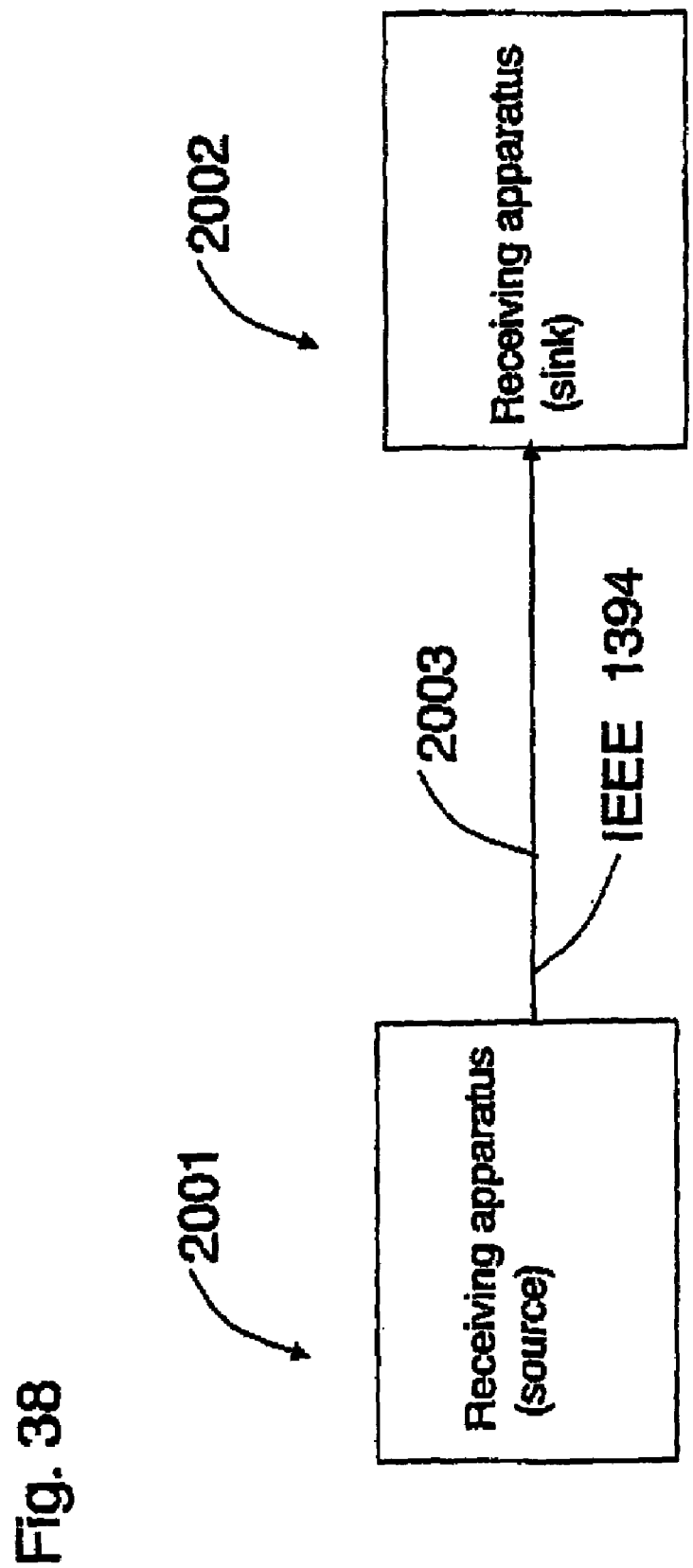
FIG. 38 is a schematic view illustrating a transmission of MPEG-TS via transmission media which conforms to IEEE 1394 standard by using the DTCP scheme.

FIG. 37 is a block diagram of a packets sending/receiving apparatus 1101E according to Embodiment 13.

To the packets sending/receiving apparatus 1101E, packets sending means 101 according to Embodiment 7 described with reference to FIG. 19 is applied.

A sending operation is similar to the operation described in above-described Embodiments 7 through 13. As a reception process, first, general data packets and priority data packets are separated from the reception frame, and general data and preferred data are respectively decoded therefrom and output.

In above-described Embodiments 7 through 13, packets are sent over a communication network where the order of the packets is not secured, the order may be secured by using the sequence number added to the packets in the receiving apparatus. Alternatively the order maybe secured in a video signal process in the following stage.

When it is not desired to perform fragmentation process for the preferred packets on the receiving, the maximum size (MTU),which is not fragmented on the communication network is previously checked on the sending side in a process at an application level, and the packets may be transmitted at a certain fragmentation size. Alternatively, in the standard of RFC, it is defined all the terminals should be capable of handling IP packets of the size of 576 bytes. Thus, in most of network equipments such as a router, fragmentation does not occur on the IP packets having the size equal to or smaller than this. Thus, it is enough if the preferred packets are produced such that the size of the IP packet is equal to or smaller than 576 bytes. When fragmentation does not occur in the preferred packets, if the received packets are fragmented, they can be all processed as general packets. When the size exceeds the maximum value of the IP packets of Ethernet™, fragmenting in the sending terminal is required. Accordingly, it is needless to say that the size should be equal to or smaller than the maximum size of the IP packets in order to prevent the preferred packets from being fragmented.

When the percentage of fragmenting in the communication network is very small, a flag of fragmenting prohibition is added to IP header of the packets of the preferred packets and transmitted. In this way, IP packets may be dropped in the situation where the router should fragment to alleviate a load of fragmenting process of the receiving terminal. In this case, very small number of packets is lost, but communication quality can be compensated by performing error correction or error retouch on the receiving end.

Further, in Embodiments 7 through 13, Ethernet™ is explained as a specific example of communication protocols. However, the present invention is not limited to this.

Also, image compression and extension is described as an example of a video signal process. However, the example where image is not compressed is not excluded from the scope of the present Invention. The example where data with an image being previously compressed with a scheme such as MPEG and the like is input is not excluded from the scope of the present invention.

Any apparatus which sends/receives real time data such as audio rather than video, or performs sending/reception preferentially is not excluded from the present invention.

In Embodiments 7 through 13, a video signal of a constant bit rate (CBR) is describe as air example. However, the preferred data is not limited to CBR.

The preferred packets are subjected to a hardware process and the general packets are subjected to a CPU process. However, the present invention is not limited to this as long as a process speed is fast enough.

The above description is provided for enabling those skilled in the art to perform the present invention or use the present invention. Various modifications of the embodiments are apparent to those skilled in the art. A comprehensive principle clarified in the present specification may be applied to other embodiments without requiring any other invention. Therefore, the present invention is not intended to be limited to the embodiments shown in the present specificaton, but intended to match the broadest scope which conforms to the principle and novel featured disclosed in the present specification.

INDUSTRIAL APPLICABILITY

According to the present invention, a packets sending/receiving apparatus includes AKE means for securing sending data, encryption means for the sending data, packets addition information production means for adding AKE information or sending control information to the encrypted data, means for extracting addition information such as the AKE information or the sending control information from reception packets, decoding means of the encrypted data, sending condition setting management means for setting appropriate packets sending condition based on a packets reception state fed back from a sending destination of the sending packets, packetization means, packets reception means, and setting management means of the reception condition.

In this way, the DTCP scheme may be implemented to an IP protocol, which is a standard protocol of the Internet. Further, it is possible to transmit packets (for example, IP packets) via a network whale protecting confidentiality and copyright of the data by encrypting an AV data stream such as MPEGTS and to decode into an original signal in the receiving apparatus.

According to one embodiment of the present invention, packets sending/receiving means classifies the sending packets into general packets and packets to be preferentially sent and inputs the general packets to first data queue means and the packets to be preferentially sent to second data queue means. Then, sending queue control means controls the sending order of the packets temporarily stored in the first data queue means and the second data queue means.

In this way, data with higher real-time property can be preferentially sent while the confidentiality and the copyright of the data is being tried to be protected. When the input stream is a plurality of streams of two channels or more, they can be supported by classifying signals regarding the respective streams into the preferred data and the general data.

According to one embodiment of the present invention, the packetization means include first packetization means and second packetization means. In this embodiment, general data such as AKE related information regarding AKE setting is input to the first packetization means. Encryption sending data produced in the encryption means and the AKE related information is input to the second packetization means in which packetization by a hardware is performed. The AKE related information is update information of copy control information and encryption key updated information. An output from the first packetization means is input to the first data queue means, and an output from the second packetization means is input to the second data queue means. When a command for preferentially outputting a signal temporarily stored in the second data queue means is output from the sending condition setting management means to the sending queue control means, the encrypted data is preferentially output.

If the second data queue means is controlled to avoid an overflow as such, real time transmission of data contents can be realized between a sending apparatus and a receiving apparatus since there is a buffer of an appropriate size in the receiving apparatus. When data is encrypted and transmitted in a real-time manner between the sending apparatus and the receiving apparatus, there is no trouble such as un-sent sending packets,: or un-received reception packets generated because the software process cannot be in time since the second packetization means is formed of a hardware. Further, since the first packetization means with a small data amount can be formed of reasonable microcomputers and the like, the cost can be reduced.

According to one embodiment of the present invention, in the packets sending/receiving means, the AKE means conforms to a process procedure defined by the DTCP scheme, and the AKE means includes encryption key production means, DTCP information production means, AKE command sending process means, AKE command reception process means, exchange key production means, encryption key change information production means, and decode key production means. The encryption key production means produces encryption key, and inputs the produced encryption key to the encryption means to set an encryption operation. AKE information production means uses copy control information input from outside and key update information to be input from the encryption key production means to produce AKE related information. The AKE command sending process moans receives the encryption key from the encryption key production means, an AKE parameter from outside, and an AKE command information from the AKE command reception process means and produces and outputs the AKE sending command. The AKE command reception process means receives the AKE getting control information from the first packetization means and outputs setting control information respectively to the AKE sending processing means, the exchange key production means, and the encryption key change information production means. The encryption key change information production means produces encryption key change information using information from the AKE command reception process means and the first packets reception means. The decoding key production means outputs a decoding key and outputs to the decoding process using the information from the exchange key production means and the encryption key change information production means.

Accordingly, it becomes possible to encrypt the AV data stream such as MPEG-TS and transmit in a real-time manner using the AKE means which conforms to the DTCP scheme. In this way, it becomes possible to try to protect the copyright of data.

According to one embodiment of the present invention, in the packets sending/receiving means, the second packetization means to which the encryption sending data produced at the encryption means and AKE related information (for example, copy control information and/or update information of the encryption key) are input includes an error correction code addition means therein. Thus, an error correction code is added.

Accordingly, it becomes possible to restore the sending data by error correction in the receiving apparatus every when a packet loss or a bit error is generated at an IP network. Further, the second packetization means and second packets reception means can be more readily formed of hardware.

According to one embodiment of the present invention, regarding transmission of AV contents using the network, data eavesdropping over the network can be prevented and data transmission with a high security can be realized. Accordingly, even when a public network such as the Internet is used for a transmission path, eavesdropping and leakage of the preferred data (AV data) to be transmitted in a real-time manner. Moreover, it becomes possible to sell and charge on AV data transmitted via the Internet and the like, and selling contents distribution of B-B, B-C with a high security becomes possible.

According to one embodiment of the present invention, when a transmission process of the AV contents with a hardware is performed, general data packets are subjected to a software process using CPU, conventionally. By adding a software, data such as management information and/or control information maybe transmitted as the general data. Since the data amount is very small compared to the amount of preferred data, reasonable microprocessors such as microcomputers can be realized and a system of a low cost can be realized. Further, since an expensive CPU and/or large-scale memory is not required for a protocol process of a high-load and high-transmission rate preferred packets, an apparatus with a high-function can be provided at a low cost in view of this point.

In one embodiment of the present invention, the preferred packets to be sent preferentially and the general packets with a lower sending priority compared to the preferred packets are multiplexed on the time line and sent. An average sending data rate of the preferred data in the preferred packets to be sent is controlled, for example, to send packets at a speed equal to or higher than the average input rate using a hardware for an exclusive use. A protocol process of data which requires real-time property such as video signal is performed by a hardware process is performed without depending on a software process by a CPU. Thus, there is no trouble that the process cannot be in time, which occurs in a software process, does not occur. Accordingly, all the preferred data packets are completely sent, and the transmission of high-quality image with secured real-time manner becomes possible.

The general data is temporarily stored in the buffer means, and intermittently transmitted while the preferred data is preferentially transmitted. In this example, when the transmission rate of the general data is 1 Mbps or lower, transmission process of the general data is possible using processors such as reasonable CPU and/or microcomputers.

Regarding the preferred data input as a stream, invalid data portion of the stream is removed and only a valid data is used to produce packets based on packetization information. In this example, when the UDP/IP is used as a communication protocol, IP address as an address, and UDP port number as a subaddress are used as a header.

Furthermore, since sending timings (sending percentage) of the preferred packets and the general packets are controlled by not a software but a hardware. Thus, it is completely controllable in clock units. All the preferred packets are completely sent, and the transmission of high-quality with the real-time property being secured becomes possible. Since the shaping is also performed accurately in clock units, communication with very high quality with a very small occurrence of packets dropping at the router in the first stage. Headers of IP (third layer) and UDP (Fourth layer are checked at the same time on the layer of the Ethernet™ frame (second layer), and the process of the preferred packet is performed with a hardware. Thus, there is not an-received frame, and the high-quality communication with the real-time property secured becomes possible.

According one embodiment of the present invention, not only the preferred data and the general data is sent, but also preferred data format information is obtained from the valid data to be used for determining a packetizing parameter with the packetizing information input from the outside. In this way, the automation of packetizing the preferred data can be performed in a unit of 80 bytes of DIF block when the preferred data is DV type, and in a unit of 188 bytes of TS packets when the preferred data is MPEG type. Thus, the structure of the sending/receiving apparatus can be made simple.

According one embodiment of the present invention, the preferred data can be restored in the receiving apparatus even when the packet loss is generated over the network by adding the error correction code to the preferred data in the preferred data packetization means in the sending apparatus.

According to one embodiment of the present invention, a transmission error protection function in the preferred data packetization means within the sending apparatus can be realized. Specifically, by adding an error correction code after the preferred data is encrypted, even when a packet lose is generated in the network, the preferred data can be restored in the receiving apparatus. Moreover, data transmission which can prevent data eavesdropping on the network and has a high security is realized. In this way, even though a public network such as Internet is used as a transmission path, eavesdropping and leakage of the preferred data (AV data) to be real-time transmitted can be prevented. Moreover, it becomes possible to sell and charge on AV data transmitted via the Internet and the like, and selling contents distribution of B-B, B-C with a high security becomes possible.

According to one embodiment of the present invention, eavesdropping and leakage of the preferred data (AV data) to be real-time transmitted can be made more difficult by switching the encryption key which performs encryption. By rendering a phase of the error correction matrix to a switching phase, it becomes possible to switching of the encryption key can be performed smoothly. In the public network such as an Internet, since an encryption parameter of the AV data to be transmitted in a real-time manner changes, eavesdropping and leakage of the contents can be strongly prevented.

According to one embodiment of the present invention, a signal process in the receiving apparatus can be made easier. Since a table which determines a combination of the formats of the preferred data and/or channel number and a port number is provided in the sending apparatus and the receiving apparatus, a format can be detected by only detecting a port number of the receiving apparatus. Thus, a signal can be readily processed in the reception apparatus. Further, when the two streams are received at the same time in the receiving apparatus in which two lines of stream processes are possible, it is possible to identify a format or channel with the port number.

According to one embodiment of the present invention, the general packets only perform a software process as in conventional art. Thus, by adding only a software, data such as management data and the control data can be transmitted a as the general data. Since these data amounts are very small compared to the preferred data amount, they can be realized with reasonable microprocessors such as microcomputers, and thus, a system with a low cost can be realized. Further, since an expensive CPU and/or large-scale memory is not required for a protocol process of a high-load and high-transmission rate preferred packet, an apparatus with a high-function can be provided at a low cost in view of this point.

The invention claimed is:

1. A packets sending/receiving apparatus for sending and receiving packets, comprising:
  authentication and key exchange means for producing an encryption key and a decoding key;
  encryption means for producing an encryption sending data by encrypting sending data using the encryption key;
  sending condition setting management means for producing sending condition setting information for setting sending condition of a sending packet using at least one of sending condition related information, sending/reception management information, receiving condition setting information;

packetization means for producing the sending packet using the encryption sending data;

receiving condition setting management means for producing receiving condition setting information for setting receiving condition of the reception packets using at least one of receiving condition related information and packets reception information;

packets reception means for receiving the reception packets, which extracts reception data included in the reception packets from the reception packets using the receiving condition setting information and produces the packets reception information from the reception packets, and outputs the packets reception information to the authentication and key exchange means or the received condition setting management means;

decoding means for decoding the reception data using the decoding key;

first queue means for temporarily storing a first packets group produced at the packetization means;

second queue means for temporarily storing a second packets group produced at the packetization means;

sending queue control means for controlling which of the first packets group stored in the first queue means and the second packets group stored in the second queue means is to be sent based on the sending condition setting information;

framing means for producing a sending frame by framing the first packet output from the first queue means and the second packets output from the second queue means; and a frame reception means for extracting the reception packets from a reception frame, wherein the sending queue control means controls the first queue means and the second queue means so as to output the second packets stored in the second queue means such that an amount of the second packets stored in the second queue means does not exceed a predetermined amount.

2. A packets sending/receiving apparatus according to claim 1, wherein the authentication and key exchange means permits authentication when location information of the packets sending/receiving apparatus, and location information of the destination of the sending packets or location information of the sending source of the reception packets match predetermined conditions.

3. A packets sending/receiving apparatus according to claim 2, wherein the sending/receiving management information includes at least one of the location information of the packets sending/receiving apparatus, and the location information of the destination of the sending packets or the location information of the sending source of the reception packets match predetermined conditions.

4. A packets sending/receiving apparatus according to claim 3, wherein the location information is information with area specified by a region code, address, postal code, or longitude and latitude.

5. A packets sending/receiving apparatus according to claim 2, wherein the authentification authentication and key exchange means includes:

storage means for temporarily storing information regarding the destination of the sending packets or sending source of the reception packets when authentication is performed between the packets sending/receiving apparatus to the destination of the sending packets or sending source of the reception packets; and verifying means for verifying the information stored in the storage means and the information regarding the destination of the sending packets or the information regarding the sending source of the reception packets when the authentication is not confirmed since the packets sending/receiving apparatus and the destination of the sending packets or sending source of the reception packets do not match the predetermined conditions, and performing authentication between the packets sending/receiving apparatus and the destination of the sending packets or sending source of the reception packets.

6. A packets sending/receiving apparatus according to claim 5, the information regarding the destination of the sending packets or the information regarding the sending address of the reception packets includes at least one of a certificate, MAC address and biometric information.

7. A packets sending/receiving apparatus according to claim 1, wherein the sending queue control means controls which of the first packets group stored in the first queue means and the second packets group stored in the second queue means is to be sent using at least one of information regarding a sending path of the first packets group or the second packets group, information regarding a bandwidth required for sending the first packets group or the second packets group, information regarding delay from sending to arrival of the sending packets, and information regarding priority of the first packets group or the second packets group.

8. A packets sending/receiving apparatus according to claim 7, wherein the sending queue control means uses one of control schemes of RSVP scheme described with IETF rfc2205, rfc2208, rfc2209, Intserv scheme described with IETF rfc2210, rfc2211, 2212, rfc2215, and Diffserv scheme described with IETF rfc2474, rfc2475, rfc2597, rfc2598.

9. A packets sending/receiving apparatus according to claim 1, wherein the sending queue control means controls the first queue means and the second queue means so as to select one of the first packets group stored in the first queue means and the second packets group stored in the second queue means is to be sent and preferentially outputs the selected packets.

10. A packets sending/receiving apparatus according to claim 1, wherein the sending queue control means controls the first queue means and the second queue means so as to average intervals between the first packets group sent from the first queue means and the second packets group sent from the second queue means.

11. A packets sending/receiving apparatus according to claim 1, wherein the receiving condition setting management means and the receiving condition setting management means detect the maximum transmission packet size in a path from a sending destination of the sending packet and a receiving address between sending and arrival of the sending frame, and produces the sending condition setting information and the receiving condition setting information using the maximum transmission packet size information.

12. A packets sending/receiving apparatus according to claim 1, wherein the framing means adds a frame header of IEEE 802.3 standard to a sending packets produced in the packetization frame.

13. A packets sending/receiving apparatus according to claim 1, wherein the framing means adds a frame header of IEEE 802.1Q standard to sending packets produced in the packetization frame.

14. A packets sending/receiving apparatus according to claim 1, wherein the packetization means converts the encryption sending data to a predetermined size and adds Internet Protocol (IP) header defined as IPv4 or IPv6 in IETF.

15. A packets sending/receiving apparatus according to claim 1, wherein the packetization means adds information indicating that it is preferred packets to a service type field of IPv4 header or a type of service (TOS) field in the service type field.

16. A packets sending/receiving apparatus according to claim 1, wherein the packetization means adds information indicating that it is preferred packets to a priority field of IPv6 header.

17. A packets sending/receiving apparatus according to claim 1, wherein the authentication and key exchange means performs predefined authentication and key exchange and updates the encryption key or decoding key to a predetermined period.

18. A packets sending/receiving apparatus according to claim 17, wherein timing information for indicating timing for the authentication and key exchange means to update the decoding key is added to the sending packets.

19. A packets sending/receiving apparatus according to claim 17, wherein the timing for the authentication and key exchange means to update the decoding key is changed for every certain amount of data when the sending packets use HTTP.

20. A packets sending/receiving apparatus according to claim 17, wherein the timing for the authentication and key exchange means to update the decoding key is updated within a predetermined period when the sending packets use RTP.

21. A packets sending/receiving apparatus according to claim 1, wherein:
the packetization means includes first packetization means and second packetization means;
the first packetization means produces a first packets group using at least one of the sending condition setting information, and the authentication and key exchange related information;
the second packetization means produces the second packets group using at least one of the sending condition setting information, authentication and key exchange related information, and the encryption sending data.

22. A packets sending/receiving apparatus according to claim 21, wherein:
the packetization means converts the encryption sending data into a predetermined size and adds an IP header defined as IPv4 or IPv6 in IETF;
the first packetization means is formed of a software, and the second packetization means is formed of a hardware.

23. A packets sending/receiving apparatus according to claim 21, further comprising:
data separation means for separating the reception data into preferred data and general data;
the encryption means encrypts the preferred data; and
the first packetization means produces a first packet using the general data.

24. A packets sending/receiving apparatus according to claim 23, wherein the first packetization means adds at least one header of RTCP, RTSP, HTTP, TCP, UDP, and IP, which are data process protocols defined in the IETF document.

25. A packets sending/receiving apparatus according to claim 23, wherein the second packetization means adds a sequence number to data, or adds at least one header of RTP, UDP, HTTP, TCP, and IP, which are data process protocols defined in the IETF document.

26. A packets sending/receiving apparatus according to claim 23, wherein the preferred data is in an uncompressed SD format signal defined by SMPTE 259M standard, an uncompressed HD format defined by SMPTE 292M standard, a transmission stream format of DV or MPEG-TS by IEEE 1394 defined by IEC 61883 standard, MPEG-TS format by DVB-ASI, MPEG-PS format, MPEG-ES format, and MPEG-PES format, or a data file format.

27. A packets sending/receiving apparatus according to claim 23, wherein the sending queue control means controls the first queue means and the second queue means such that data rate of the preferred data does not become smaller than a predetermined value.

28. A packets sending/receiving apparatus according to claim 27, wherein the sending queue control means controls the first queue means and the second queue means such that the time for the preferred data to be stored in the second queue means is always smaller than a predetermined value.

29. A packets sending/receiving apparatus according to claim 27, wherein:
the second packetization means includes a buffer means for temporarily storing data, a counter means for counting a length of the data, a packets header production means for producing a packets header of the second packets group, and packets synchronization means for synchronizing packets by combining the packets header and a payload output from the buffer; and
the packets header production means specifies a payload length of the second packets group, reads out the data stored in the buffer means, and inputs to the packets synchronization means.

30. A packets sending/receiving apparatus according to claim 27, wherein:
the second packetization means includes buffer means for temporarily storing data extracted from the preferred data, counter means for counting a length of the data, packets header production means for producing packets headers using packetization information, and packets production means for producing packets by combining the packets header and a payload; and
the counter means outputs control data for reading out data which corresponds to a payload length from the buffer means.

31. A packets sending/receiving apparatus according to claim 27, wherein:
the second packetization means includes buffer means for temporarily storing data, counter means for counting a length of the data, packets header production means for producing packets headers using packetization information, error correction addition means for adding error correction to the data, and packets synchronization means for synchronizing the packets header and the data with the error correction added; and
the counter means outputs control data for reading out data which corresponds to a payload length from the buffer means.

32. A packets sending/receiving apparatus according to claim 27, wherein, in a layer for processing a reception frame of a layer lower than layers on which the preferred data and the general data are processed, the preferred data and the general data are selected from the communication protocol header of the reception packets included in the reception frame, and a process for the preferred data and a process for the general data are independently performed.

33. A packets sending/receiving apparatus according to claim 21, wherein the second packetization means includes error correction code addition means.

34. A packets sending/receiving apparatus according to claim 33, wherein a scheme of the error correction code used in the error correction code addition means is Reed-Solomon scheme or parity scheme.

35. A packets sending/receiving apparatus according to claim 21, wherein information indicating the encryption key outputs decoding information of the encryption key from the framing means before the sending packets encrypted with the encryption key is output in the framing means.

36. A packets sending/receiving apparatus according to claim 35, wherein information indicating the encryption key is sent before the time of reception of a reception frame which corresponds to the sending frame from sending of the sending frame with respect to the time when the sending packets including the encryption sending data produced using the encryption key is sent.

37. A packets sending/receiving apparatus according to claim 21, wherein the second packetization means includes an encryption switching means, inputs the encryption key to be input to the encryption key switching means to the encryption means while switching the encryption key at a specified timing, and switches the encryption key in the encryption means in a specified interval.

38. A packets sending/receiving apparatus according to claim 37, wherein timing used for the encryption key switching is timing generated in synchronization with a predetermined sequence number in a packet header, which is an output for the packet header production means.

39. A packets sending/receiving apparatus according to claim 37, wherein the timing for the authentication and key exchange means to update the decoding key is updated for every HTTP request when the sending packets use HTTP.

40. A packets sending/receiving apparatus according to claim 37, wherein the timing for the authentication and key exchange means to update the decoding key is changed for every certain amount of data when the sending packets use HTTP.

41. A packets sending/receiving apparatus according to claim 37, wherein timing for the authentication and key exchange means to update the decoding key is updated within a predetermined period when the sending packets use RTP.

42. A packets sending/receiving apparatus according to claim 37, wherein timing used for the encryption key switching is timing generated in synchronization with an endpoint and a start point of an error correction matrix.

43. A packets sending/receiving apparatus for sending and receiving packets, comprising:
authentication and key exchange means for producing an encryption key and a decoding key;
encryption means for producing an encryption sending data by encrypting sending data using the encryption key;
sending condition setting management means for producing sending condition setting information for setting sending condition of sending packets using at least one of sending condition related information, sending/reception management information, receiving condition setting information;
packetization means for producing the sending packets using the encryption sending data;
receiving condition setting management means for producing receiving condition setting information for setting receiving condition of reception packets using at least one of receiving condition related information and packets reception information;
packets reception means for receiving the reception packets, which extracts reception data included in the reception packets from the reception packets using the receiving condition setting information and produces the packets reception information from the reception packets, and outputs the packets reception information to the authentication and key exchange means or the received condition setting management means; and
decoding means for decoding the reception data using the decoding key, wherein
the authentication and key exchange means permits authentication when location information of the packets sending/receiving apparatus, and location information of the destination of the sending packets or location information of the sending source of the reception packets match predetermined conditions, and
the authentication and key exchange means permits authentication when a propagation time of one-way or a round trip from the packets sending/receiving apparatus to the destination of the sending packets or sending source of the reception packets is shorter than a predetermined limit time between the packets sending/receiving apparatus and the destination of the sending packets or sending source of the reception packets.

44. A packets sending/receiving apparatus for sending and receiving packets, comprising:
authentication and key exchange means for producing an encryption key and a decoding key;
encryption means for producing an encryption sending data by encrypting sending data using the encryption key;
sending condition setting management means for producing sending condition setting information for setting sending condition of sending packets using at least one of sending condition related information, sending/reception management information, receiving condition setting information;
packetization means for producing the sending packets using the encryption sending data;
receiving condition setting management means for producing receiving condition setting information for setting receiving condition of reception packets using at least one of receiving condition related information and packets reception information;
packets reception means for receiving the reception packets, which extracts reception data included in the reception packets from the reception packets using the receiving condition setting information and produces the packets reception information from the reception packets, and outputs the packets reception information to the authentication and key exchange means or the received condition setting management means; and
decoding means for decoding the reception data using the decoding key, wherein
the authentication and key exchange means permits authentication when location information of the packets sending/receiving apparatus, and location information of the destination of the sending packets or location information of the sending source of the reception packets match predetermined conditions, and
the authentication and key exchange means permits authentication, in the case where there is a wireless transmission zone in a sending/reception zone between the packets sending/receiving apparatus and the destination of the sending packets or sending source of the reception packets, when it is confirmed that it is in a mode for scrambling and transmitting data in the wireless transmission zone.

45. A packets sending/receiving apparatus for sending and receiving packets, comprising:

authentication and key exchange means for producing an encryption key and a decoding key;

encryption means for producing an encryption sending data by encrypting sending data using the encryption key;

sending condition setting management means for producing sending condition setting information for setting sending condition of sending packets using at least one of sending condition related information, sending/reception management information, receiving condition setting information;

packetization means for producing the sending packet using the encryption sending data;

receiving condition setting management means for producing receiving condition setting information for setting receiving condition of the reception packets using at least one of receiving condition related information and packets reception information;

packets reception means for receiving the reception packets, which extracts reception data included in the reception packets from the reception packets using the receiving condition setting information and produces the packets reception information from the reception packets, and outputs the packets reception information to the authentication and key exchange means or the received condition setting management means; and decoding means for decoding the reception data using the decoding key, wherein the authentication and key exchange means performs predefined authentication and key exchange and updates the encryption key or decoding key in a predetermined period, and the timing for the authentication and key exchange means to update the decoding key is notified by changing a TCP port number, or UDP port number of the sending packets.

46. A packets sending/receiving apparatus for sending and receiving packets, comprising:

authentication and key exchange means for producing an encryption key and a decoding key;

encryption means for producing an encryption sending data by encrypting sending data using the encryption key;

sending condition setting management means for producing sending condition setting information for setting sending condition of the sending packets using at least one of sending condition related information, sending/ reception management information, receiving condition setting information;

packetization means for producing the sending packets using the encryption sending data;

receiving condition setting management means for producing receiving condition setting information for setting receiving condition of reception packets using at least one of receiving condition related information and packets reception information;

packets reception means for receiving the reception packets, which extracts reception data included in the reception packets from the reception packets using the receiving condition setting information and produces the packets reception information from the reception packets, and outputs the packets reception information to the authentication and key exchange means or the received condition setting management means; and decoding means for decoding the reception data using the decoding key, wherein the authentication and key exchange means performs predefined authentication and key exchange and updates the encryption key or decoding key in a predetermined period, and the timing for the authentication and key exchange means to update the decoding key is updated for every HTTP request when the sending packets uses HTTP.

47. A packets sending/receiving apparatus for sending and receiving packets, comprising:

authentication and key exchange means for producing an encryption key and a decoding key;

encryption means for producing an encryptions ending data by encrypting sending data using the encryption key;

sending condition setting management means for producing sending condition setting information for setting sending condition of the sending packets using at least one of sending condition related information, sending/ reception management information, receiving condition setting information;

packetization means for producing the sending packets using the encryption sending data;

receiving condition setting management means for producing receiving condition setting information for setting receiving condition of the reception packets using at least one of receiving condition related information and packets reception information;

packets reception means for receiving the reception packets, which extracts reception data included in the reception packets from the reception packets using the receiving condition setting information and produces the packets reception information from the reception packets, and outputs the packets reception information to the authentication and key exchange means or the received condition setting management means; and decoding means for decoding the reception data using the decoding key, wherein the authentication and key exchange means performs predefined authentication and key exchange and updates the encryption key or decoding key in a predetermined period, and copy control information of DTCP scheme in the authentication and key exchange means is transmitted by adding encryption mode information to the reception packets.

* * * * *